(12) United States Patent
Jinno et al.

(10) Patent No.: US 8,526,438 B2
(45) Date of Patent: Sep. 3, 2013

(54) BANDWIDTH VARIABLE COMMUNICATION APPARATUS AND BANDWIDTH VARIABLE COMMUNICATION METHOD

(75) Inventors: Masahiko Jinno, Yokosuka (JP); Hidehiko Takara, Yokosuka (JP); Yukio Tsukishima, Yokosuka (JP); Kozicki Bartlomiej, Yokosuka (JP); Kazushige Yonenaga, Yokosuka (JP); Toshihide Yoshimatsu, Yokosuka (JP); Takayuki Kobayashi, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 232 days.

(21) Appl. No.: 13/063,640

(22) PCT Filed: Sep. 18, 2009

(86) PCT No.: PCT/JP2009/066425
§ 371 (c)(1),
(2), (4) Date: Mar. 11, 2011

(87) PCT Pub. No.: WO2010/032844
PCT Pub. Date: Mar. 25, 2010

(65) Prior Publication Data
US 2011/0164620 A1 Jul. 7, 2011

(30) Foreign Application Priority Data
Sep. 19, 2008 (JP) .................. 2008-241773

(51) Int. Cl.
*H04L 12/28* (2006.01)
(52) U.S. Cl.
USPC .......................... 370/392; 359/246
(58) Field of Classification Search
USPC .......................... 370/392; 359/246
See application file for complete search history.

(56) References Cited

U.S. PATENT DOCUMENTS

| 6,496,289 B1 | 12/2002 | Kuroyanagi et al. |
| 6,731,876 B1 | 5/2004 | Okamoto et al. |

(Continued)

FOREIGN PATENT DOCUMENTS

| JP | 6 121354 | 4/1994 |
| JP | 11 239368 | 8/1999 |

(Continued)

OTHER PUBLICATIONS

Baxter, G. et al., "Highly Programmable Wavelength Selective Switch Based on Liquid Crystal on Silicon Switching Elements", OFC 2006, OTuF2.pdf, Total p. 3, (2006).

(Continued)

*Primary Examiner* — Wei Zhao
(74) *Attorney, Agent, or Firm* — Oblon, Spivak, McClelland, Maier & Neustadt, L.L.P.

(57) ABSTRACT

A bandwidth variable communication apparatus includes: a route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes; and a control unit including a control information transmit-receive function for transmitting and receiving control information for both or a part of the route exchange function and the bandwidth change function of the route exchange unit, and including a control function for controlling the route exchange unit based on the control information. All or a part of the input ports and the output ports are connected to other communication apparatuses via transmission routes.

30 Claims, 47 Drawing Sheets

(56) References Cited

U.S. PATENT DOCUMENTS

| | | | |
|---|---|---|---|
| 2003/0030865 A1 | 2/2003 | Yamada et al. | |
| 2003/0030877 A1 | 2/2003 | Fuse et al. | |
| 2003/0030881 A1* | 2/2003 | Xia et al. | 359/246 |
| 2004/0148461 A1* | 7/2004 | Steinmetz et al. | 711/114 |
| 2005/0271150 A1* | 12/2005 | Moore et al. | 375/259 |
| 2007/0127924 A1 | 6/2007 | Tsuritani et al. | |
| 2010/0020893 A1* | 1/2010 | Hoshino et al. | 375/267 |

FOREIGN PATENT DOCUMENTS

| | | |
|---|---|---|
| JP | 11 308279 | 11/1999 |
| JP | 2003 51792 | 2/2003 |
| JP | 2003 51810 | 2/2003 |
| JP | 2003 324473 | 11/2003 |
| JP | 2004-133285 | 4/2004 |
| JP | 2005 20572 | 1/2005 |
| JP | 2005 311722 | 11/2005 |
| JP | 2006-178454 | 7/2006 |
| JP | 2007 43646 | 2/2007 |
| JP | 2007 158667 | 6/2007 |
| JP | 2008-72201 | 3/2008 |
| JP | 2008-135950 | 6/2008 |
| JP | 2008-136011 | 6/2008 |
| JP | 2008 219253 | 9/2008 |

OTHER PUBLICATIONS

Sato, K-I et al., "Network Performance and Integrity Enhancement with Optical Path Layer Technologies", IEEE Journal of Selected Areas in Communications, vol. 12, No. 1, pp. 159-170, (Jan. 1994).

Tsukishima, Y. et al., "Demonstration of Multiple-OLSP$_s$ Control Technology for Adjusting Capacity on Photonic Network", Technical Report of IEICE, PN2003-28, vol. 103, No. 507, pp. 17-20, (2003) (with English abstract).

Kobayashi, T. et al., "Electro-Optically Multiplexed 110 Gbits/sOptical OFDM Signal Transmission Over 80 km SMF without Dispersion Compensation", Electronics Letters, vol. 44, No. 3, pp. 225-226, (Jan. 31, 2008).

Urushidani, S. "[Invited Talk] Advanced Networking Technologies in SINET3", IEICE Technical Report, NS2007-125, OCS2007-91, vol. 107, No. 443, pp. 29-34, (Jan. 2008) (with English abstract).

Urushidani, S. "[Invited Talk] Network Design and Operation of SINET3", IEICE Technical Report, ICM2008-24, pp. 1-6, (Jul. 2008) (with English abstract).

Takefusa, A. et al., "An Experiment of Co-allocating Computing and Lambda Path Resources on the Grid", pp. 1-6, (2006) (with English abstract).

Takefusha, A. et al., "An experiment of Trans-Pacific Grid Computing and Network Resource Co-allocation in Corporation with Middlewares", pp. 1-6, (2007) (with English abstract).

Yamada, K. et al., "Multi-layer Path Configuration Management System in Cooperation With GMPLS", IEICE Technical Report, ICM2008-26, pp. 13-17, (Jul. 2008) (with English abstract).

Morikura, M. et al., "Trends of IEEE 802.11 Based Wireless LAN", IEICE, Transaction on Communication B, vol. J84-B, No. 11, pp. 1918-1927, (Nov. 2001) (with partial English translation).

Sasase, I. "Orthogonal Frequency Division Multiplexing (OFDM)", pp. 1-34, (2007).

Tanaka, K. et al., "Transmission Performance of WDM/OFDM Hybrid Systems Over Fibers", IEICE, Transaction on Communiction B, vol. J89B, No. 8, pp. 1431-1440, (2006) (with partial English translation).

Farrell, A. et al., GMPLS Architecture and Applications, Morgan Kaufmann Pub., pp. 9-88, (2006).

IETF Request for Comments: 3945, pp. 1-69, (Oct. 2004).

IETF Request for Comments: 3471, pp. 1-34, (Jan. 2003).

IETF Request for Comments: 3473, pp. 1-42, (Jan. 2003).

IETF Request for Comments:4203, pp. 1-11, (Oct. 2005).

IETF Request for Comments: 4204, pp. 1-86, (Oct. 2005).

Kozicki, B. et al., "Filtering Characteristics of Highly-Spectrum Efficient Spectrum-Sliced Elastic Optical Path (SLICE) Network", JWA43.pdf, total pp. 3, (2009).

Jinno, M. et al., "Demonstration of Novel Spectrum-Efficient Elastic Optical Path Network with Per-Channel Variable Capacity of 40 Gb/s to Over 400 Gb/s", ECOC 2008, vol. 7.49-7.50, pp. 1-2, (Sep. 21-25, 2008).

"Fujitsu's Super High-Speed Network Technologies for ASIC Compliant with International Standard Interface", FIND vol. 20, No. 4, pp. 6-9, (2002) (with partial English translation).

International Search Report issued Dec. 28, 2009 in PCT/JP09/066425 filed Sep. 18, 2009.

U.S. Appl. No. 13/395,747, filed Mar. 13, 2012, Takara, et al.

Japanese Office Action issued May 15, 2012, in Patent Application No. 2010-529822.

Ivan B. Djordjevic, et al., "LDPC-Coded OFDM for Optical Communication Systems with Direct Detection", IEEE Journal of Selected Topics in Quantum Electronics, vol. 13, No. 5, Sep./Oct. 2007, pp. 1446-1454.

* cited by examiner

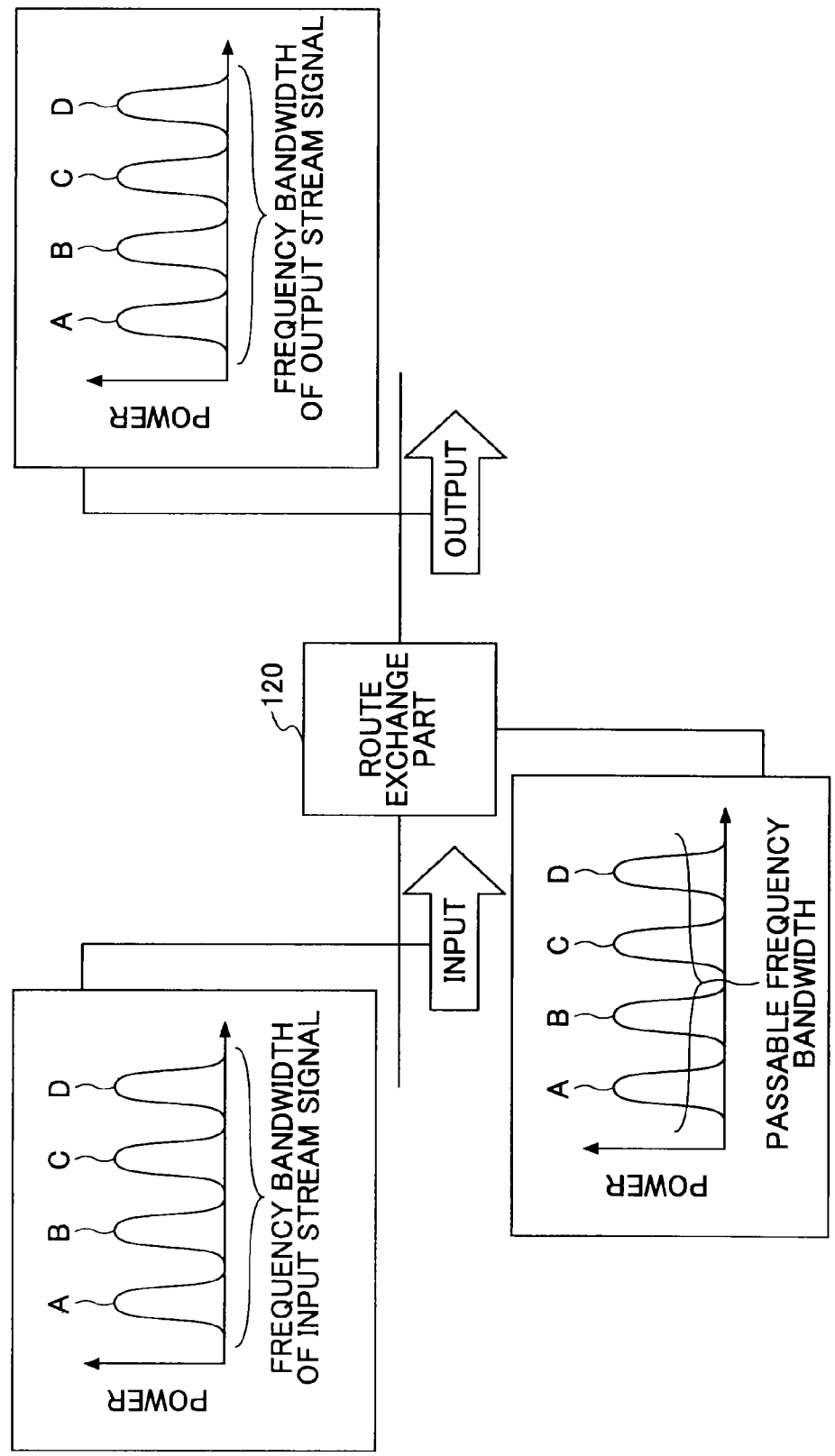

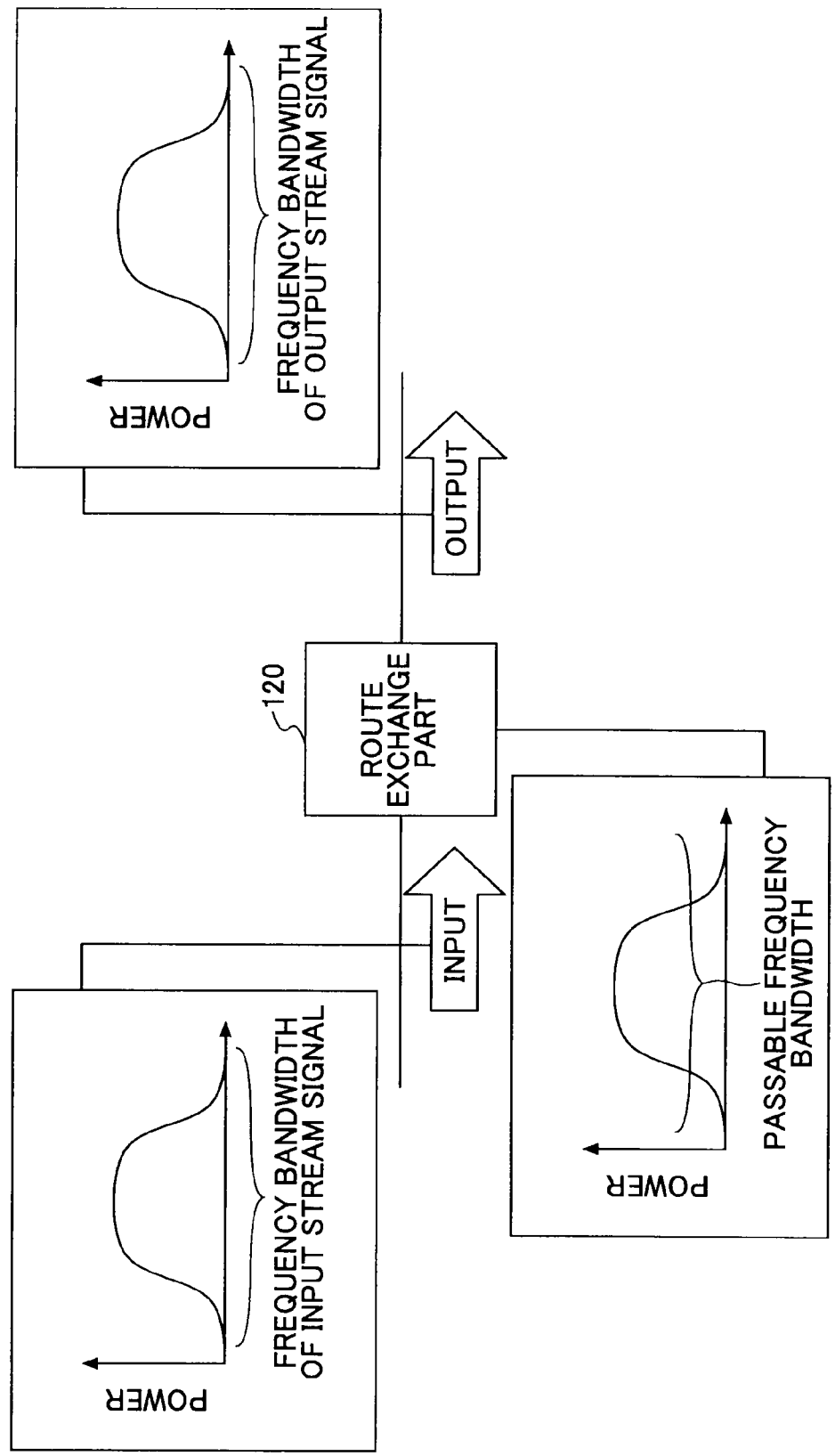

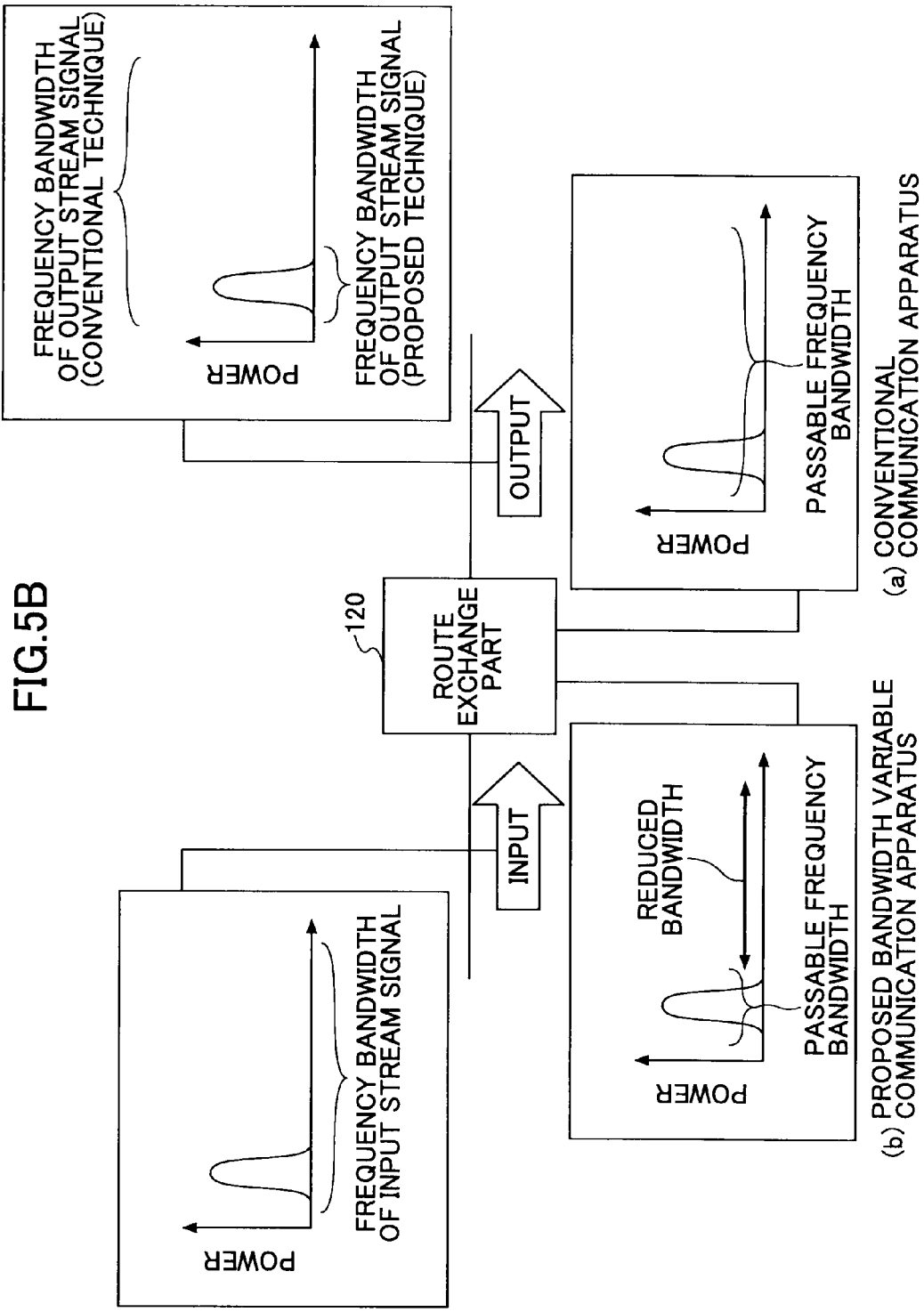

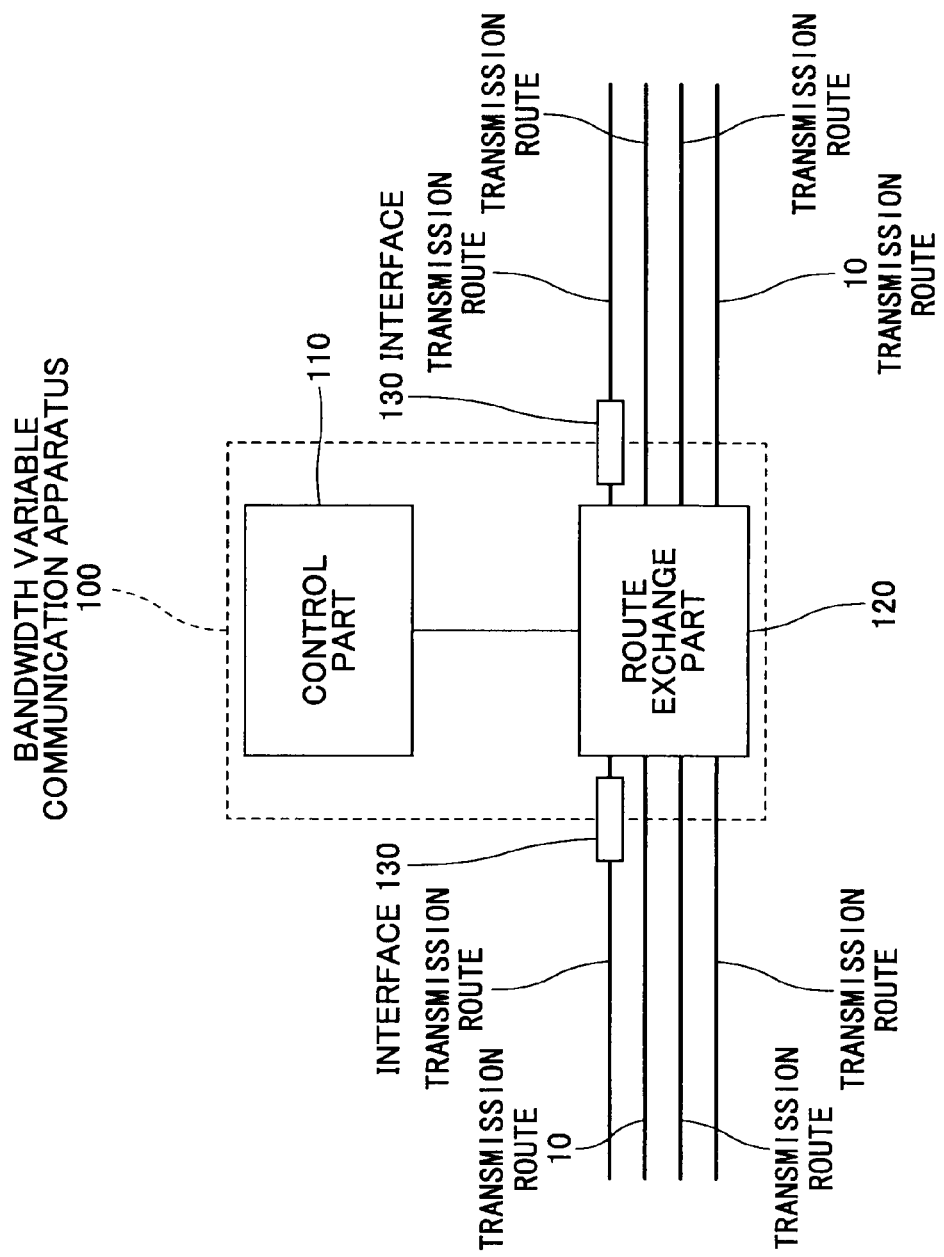

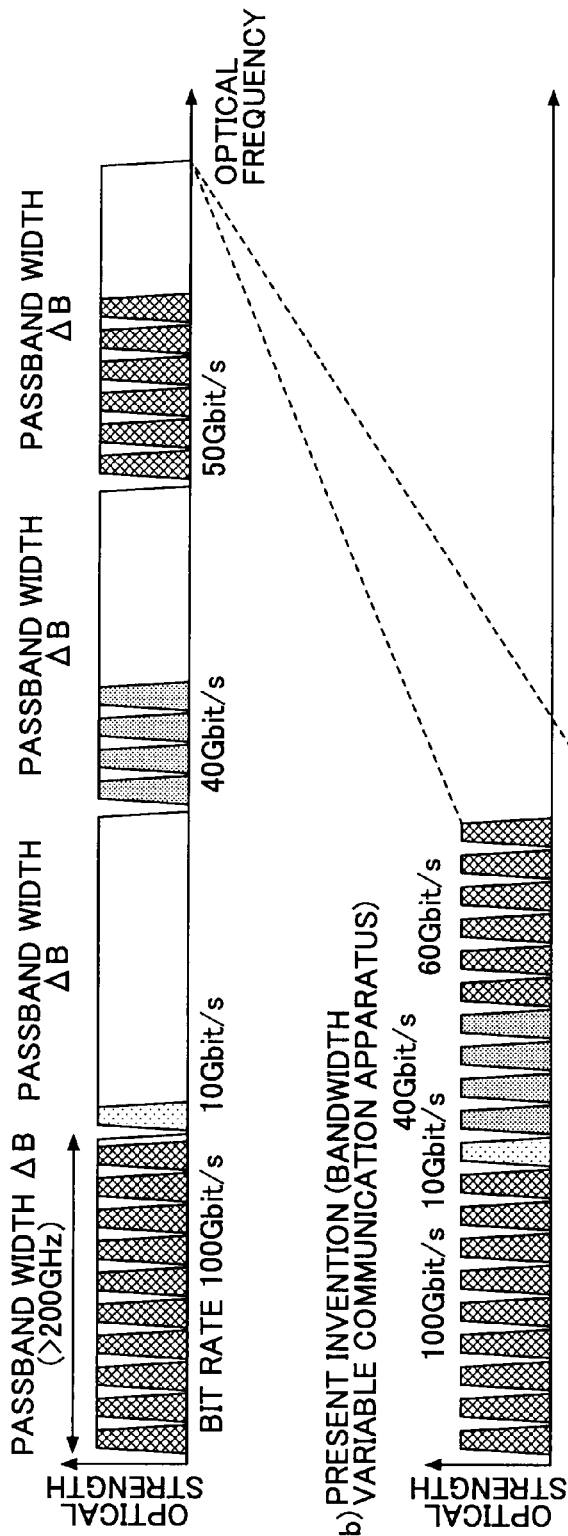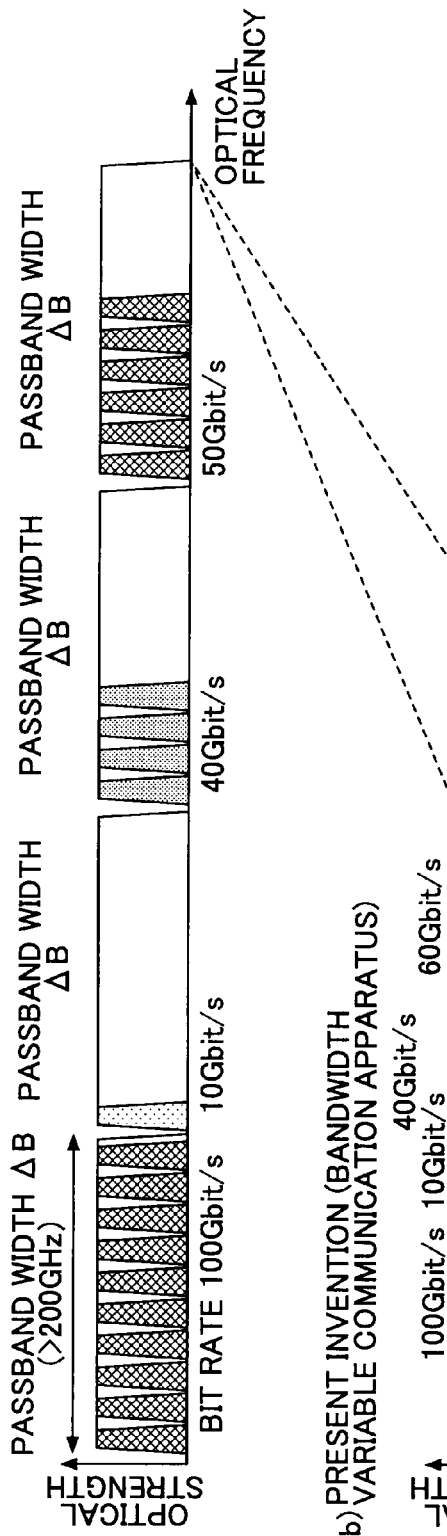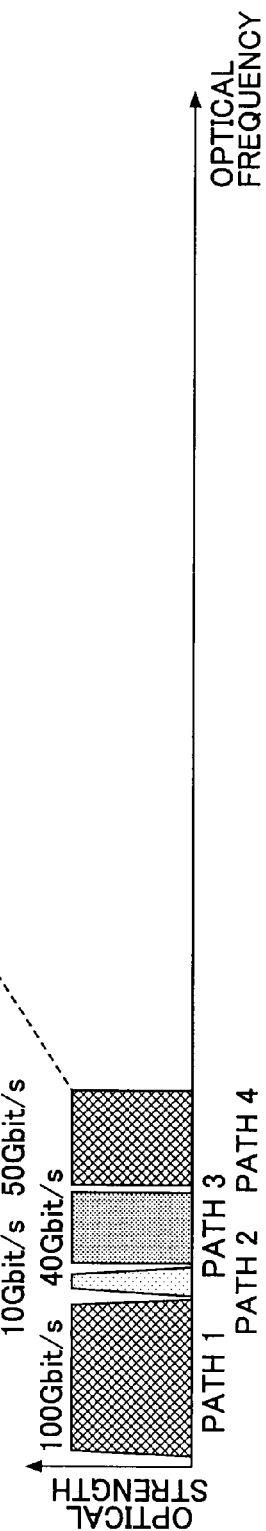
FIG.42

BANDWIDTH VARIABLE COMMUNICATION APPARATUS AND BANDWIDTH VARIABLE COMMUNICATION METHOD

TECHNICAL FIELD

The present invention relates to a bandwidth variable communication apparatus and a bandwidth variable communication method. More particularly, the present invention relates to a bandwidth variable communication apparatus that can change passable frequency bandwidth in a section from an input port to an output port through which an incoming stream signal passes, and relates to a bandwidth variable communication method as a control method for a path using the communication apparatuses.

BACKGROUND ART

The photonic network that supports current backbone networks is mainly formed by optical communication apparatuses such as wavelength multiplexing transmission apparatuses, optical add-drop apparatuses and optical cross-connect apparatuses, transmission routes such as optical fibers connecting these optical communication apparatuses, and paths such as wavelengths connecting between optical communication apparatuses via the transmission routes. Especially, research and development of the transparent type photonic network techniques is getting a lot of attention for connecting between optical communication apparatuses from end to end in the photonic network using a path without regenerative relay processing of optical signals in the relay sections.

In the following, a conventional optical communication apparatus of the transparent type photonic network is described.

The optical communication apparatus is mainly formed by an interface including transmission function and receiving function of a main signal, a wavelength multiplexing-demultiplexing unit, a route exchange unit such as an optical switch, and a control unit (refer to non-patent document 1, for example).

An optical communication apparatus in the entrance side of the path converts a main signal received from a client into an optical signal at the interface and outputs it, and the route exchange unit properly switches the destination of the output optical signal. In addition, the wavelength multiplexing-demultiplexing unit multiplexes optical signals to be transmitted to the same adjacent optical communication apparatus, and outputs the multiplexed signal to the same transmission route. In an optical communication apparatus of the exit side of the path, the wavelength multiplexing-demultiplexing unit demultiplexes the optical signals input via the transmission route into each wavelength, and the route exchange unit switches each of the demultiplexed optical signals into a proper destination interface. In addition, the interface converts the optical signal into the main signal, and transmits the main signal to a communication apparatus in the client side. In the optical communication apparatus at the relay side, the wavelength multiplexing-demultiplexing unit demultiplexes the optical signals input via the transmission route into each wavelength, and switches the route of the optical signal for each wavelength. Further, the wavelength multiplexing-demultiplexing unit multiplexes the optical signals to be transmitted to the same adjacent optical communication apparatus, and outputs the multiplexed signal to the same transmission route.

It is expected that the above-mentioned optical communication technique realizes economy of the photonic network since the technique reduces electrical processing in the interfaces of the optical communication apparatuses in the relay section so that the number of interfaces in the photonic network is reduced.

Also, research and development of path control techniques is active for dynamically changing connections between optical communication apparatuses by flexibly controlling paths. For example, a technique is realized for increasing/decreasing the number of paths connecting between two optical communication apparatuses according to traffic amount flowing in the paths (refer to non-patent document 2, patent document 1, patent document 2, patent document 3, for example).

According to the above-mentioned optical communication technique, it becomes possible that paths connecting between optical communication apparatuses share limited wavelength resources (frequency resources) in optical fibers according to bandwidth demand based on the traffic amount, so that it is expected that the wavelength resources (frequency resources) of the photonic network can be further economized.

However, the past interface cannot demultiplex and decode, for each wavelength, multiplexed main signals or optical signals in which frequency bands are overlapping. In addition, the past wavelength multiplexing-demultiplexing unit cannot demultiplex, for each wavelength, the multiplexed main signals or optical signals in which frequency bands are overlapping. Therefore, it is necessary to design and manage main signals or optical signals input and output in one transmission route such that frequency bands do not overlap. Also, past interfaces perform frequency control beforehand on main signals or optical signals to be output to the same transmission route such that frequency bands do not overlap, and output the signals to the same transmission route.

On the other hand, due to development of optical transmission techniques after 2005, it becomes possible to demultiplex and decode, for each wavelength, the main signals or optical signals in which frequency bans are overlapping (refer to non-patent document 3, for example), so that effective use of the limited wavelength resources (frequency resources) in the optical fiber is beginning to be expected.

RELATED ART DOCUMENT

[Patent document 1] Japanese Laid-Open Patent Application No. 2003-324473
[Patent document 2] Japanese Laid-Open Patent Application No. 2005-20572
[Patent document 3] Japanese Laid-Open Patent Application No. 2007-43646
[Non-patent document 1] K. Sato, et al., "Network performance and integrity enhancement with optical path layer technologies", IEEE J-SAC, Vol. 12, No. 1, pp. 159-170, 1994
[Non-patent document 2] Yukio Tsukishima, et al., "Demonstration of capacity variable optical path technique in photonic network", Technical Committee on Photonic Network, Vol. 103, No. 507 (20031211) pp. 17-22 PN2003-28
[Non-patent document 3] T. Kobayashi, et al. "Electro-optically multiplexed 110 Gbit/s optical OFDM signal transmission over 80 km SMF without dispersion compensation", Electronics Letters, vol. 44, no. 3, pp. 225-226, 2008

SUMMARY OF THE INVENTION

Problem to be Solved by the Invention

However, the route exchange unit realized by the past optical switch cannot change passable frequency bandwidth from an input port to an output port for an incoming optical signal. Optical switches using MEMS (Micro Electro Mechanical System) were mainly used so far. However, the bandwidth of the optical switch is fixed since route selection is performed by using route selection mirrors for each wavelength channel. In addition, there is a part where switching cannot be performed spatially between mirrors. Therefore, also on the wavelength axis, a region (dead zone) where switching between wavelength channels cannot be performed exists. Due to such function limitation of the optical switch, research and development of the field of the route exchange technology for optical signals in which frequency bands are overlapping were not carried out. Especially, any apparatus configuration and route control scheme for realizing the route exchange technique were not reported. At the same time, as mentioned above, efficient use of wavelength resources (frequency resources) in optical fibers were not realized.

On the other hand, regarding liquid crystal optical switch/phase modulation techniques such as Liquid Crystal On Silicon (G. Baxter, et al., "Highly programmable Wavelength Selective Switch based on Liquid Crystal on Silicon switching elements", OFC2006, OtuF2, 2006) in recent years, technical development for the liquid crystal TV market is moving forward, so that it has become possible that the route exchange unit changes passable frequency bandwidth from the input port to the output port for the incoming optical signal.

Therefore, proposals are being required for a configuration of an optical communication apparatus using the above-mentioned liquid crystal switch and the like, and a route control scheme of the optical communication apparatus.

The present invention is contrived from the viewpoint of the above-mentioned points, and an object of the present invention is to provide a technique that can realize optical switching in arbitrary frequency bandwidth, that can realize higher density than the conventional WDM (Wavelength Division Multiplexing) signal and can increase signal bandwidth according to demands by using the optical OFDM (Orthogonal Frequency Division Multiplex) signals, and that can efficiently use frequency bandwidths.

Means for Solving the Problem

A bandwidth variable communication apparatus according to an embodiment of the present invention includes:

a route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes; and a control unit including a control information transmit-receive function for transmitting and receiving control information for both or a part of the route exchange function and the bandwidth change function of the route exchange unit, and including a control function for controlling the route exchange unit based on the control information, wherein all or a part of input ports and output ports are connected to other communication apparatuses via transmission routes.

Effect of the Present Invention

According to the present invention, the optical node is provided with the bandwidth variable function that is not realized in the conventional technique. Thus, it becomes possible to realize improvement of use efficiency of optical frequency bandwidth in the optical network, improvement of use efficiency of network configuration components, and reduction of power consumption.

In addition, by using the optical OFDM scheme that is a high-density optical modulation and demodulation scheme, use efficiency of the optical frequency bandwidth can be further improved. Also, there is an effect that high optical power damage for transmission routes and optical nodes can be avoided due to reduction of signal optical power per transmission route.

BRIEF DESCRIPTION OF THE DRAWINGS

FIG. 4A is a diagram for explaining operation principle of the route exchange part (number of wavelengths variable type);

FIG. 5A is a diagram for explaining operation principle of the route exchange part (speed variable type);

FIG. 5B is a diagram for explaining operation principle of the route exchange part (speed variable type);

FIG. 6 is an example of a bandwidth variable communication apparatus in the first embodiment of the present invention;

FIG. 42 is a diagram showing optical frequency use efficiency of the conventional technique and the present invention;

EMBODIMENTS FOR CARRYING OUT THE INVENTION

In the following, embodiments of the present invention are described with reference to figures.

[Outline]

Figure 1:
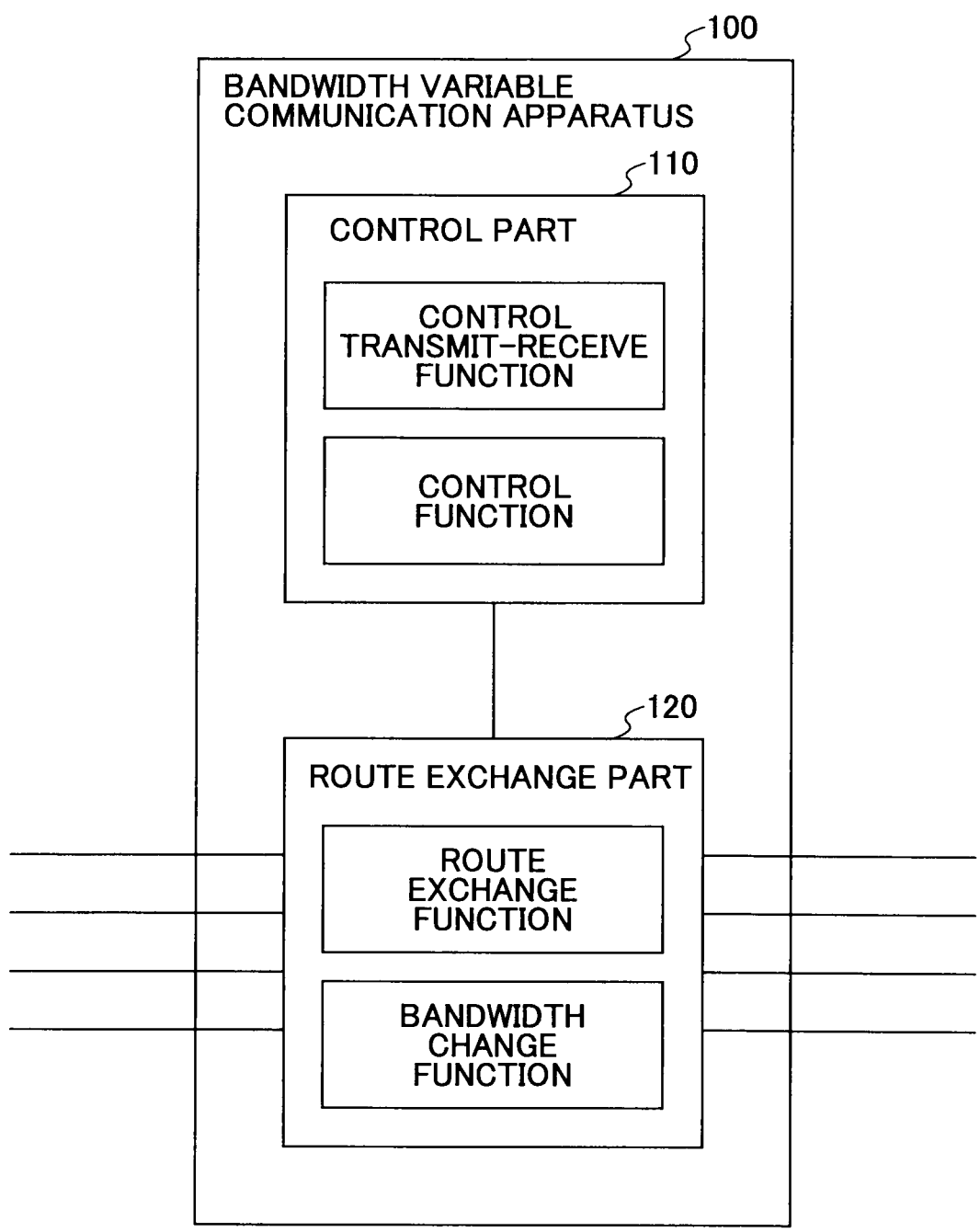
FIG. 1 is a schematic block diagram of an embodiment of the present invention.

First, an outline of an embodiment of the present invention is described with reference to FIG. 1. The bandwidth variable communication apparatus 100 of the present embodiment includes: a route exchange unit 120 including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes; and a control unit 110 including a control information transmit-receive function for transmitting and receiving control information for both or a part of the route exchange function and the bandwidth change function of the route exchange unit 120, and including a control function for controlling the route exchange unit based on the control information, wherein all or a part of input ports and output ports are connected to other communication apparatuses via transmission routes.

According to the above-mentioned configuration, it becomes possible to change passable frequency bandwidths for stream signals from the input port to the output port.

Next, embodiments of the present invention are described in more detail.

First Embodiment

<Bandwidth Variable Communication Apparatus>

Figure 2:
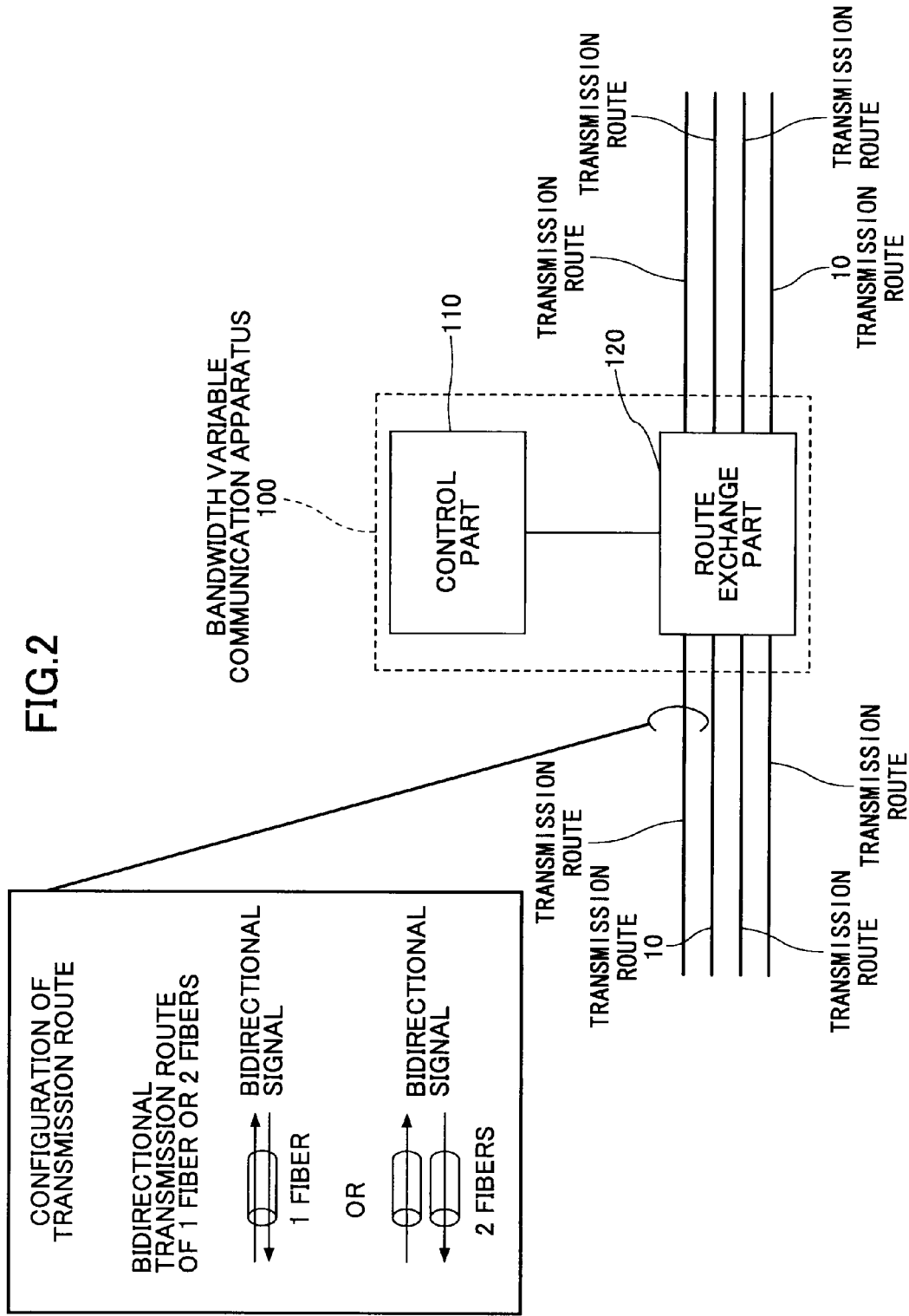
FIG. 2 is a block diagram of a bandwidth variable communication apparatus in a first embodiment of the present invention.

FIG. 2 shows a configuration of the bandwidth variable communication apparatus of the first embodiment of the present invention. The configuration shown in the figure corresponds to the configuration described in the outline. That is, the bandwidth variable communication apparatus 100 shown in FIG. 2 includes: a route exchange part 120 including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes; and a control part 110 including a control information transmit-receive function for transmitting and receiving control information for both or a part of the route exchange function and the bandwidth change function of the route exchange part 120, and including a control function for controlling the route exchange part based on the control information, wherein all or a part of input ports and output ports are connected to other communication apparatuses via transmission routes 10.

The transmission route 10 is a pair of uplink and downlink optical fibers, and the wiring is metal. But, optical fiber and the metal are not necessarily be used as the transmission route 10 and the wiring, respectively.

The control part 110 is a computer. But, the control part 110 is not necessarily be a computer, and any unit can be used as long as it has a computing processing function.

Figure 3:
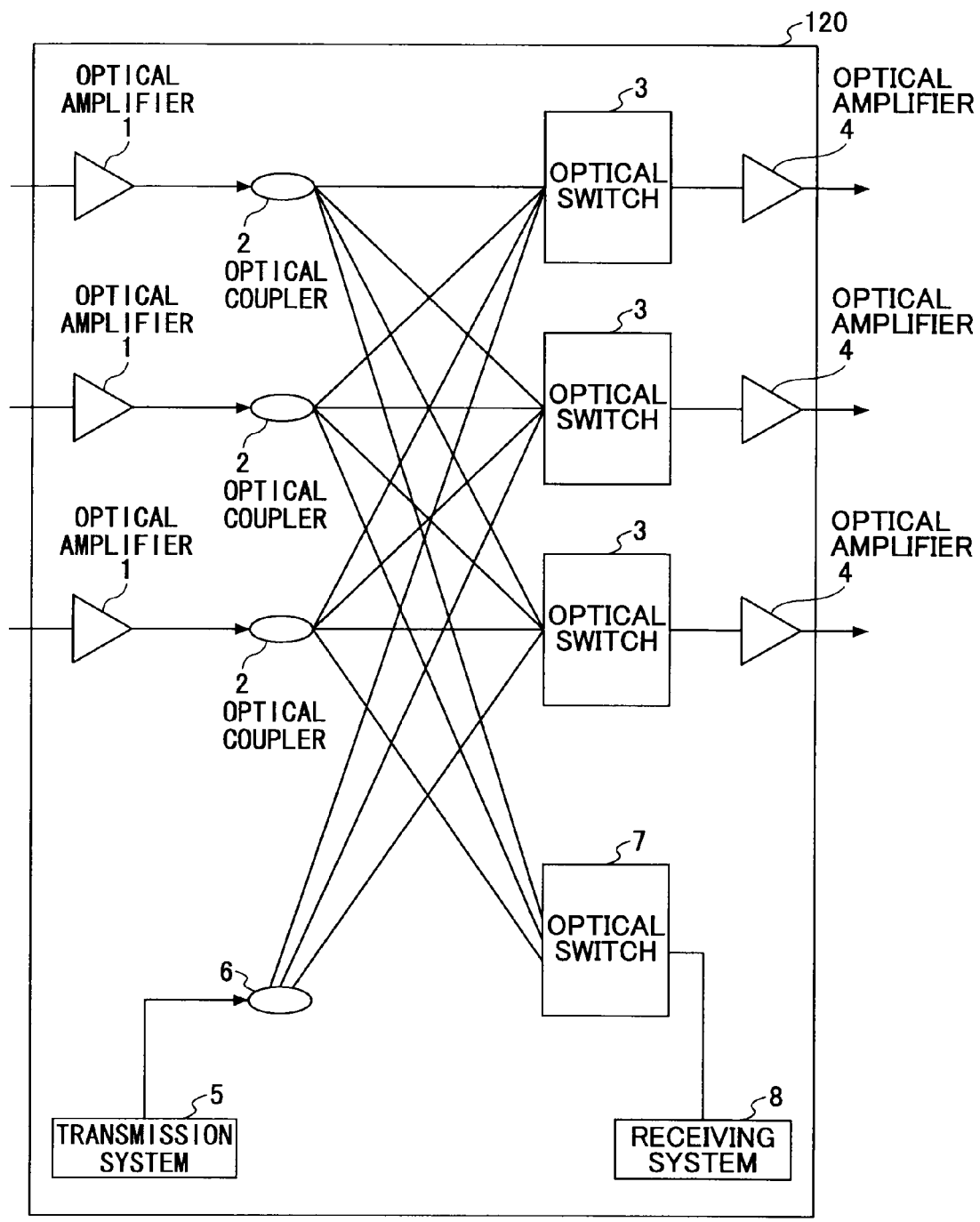
FIG. 3 is an example of a configuration of a route exchange part in the first embodiment of the present invention.

The route exchange part 120 has a configuration shown in FIG. 3. In the configuration shown in FIG. 3, an optical signal input from an input port is amplified by an optical amplifier 1, and is branched by an optical coupler 2. Then, each of branched optical signals is input into an optical switch 3, and is output from an output port via an optical amplifier 4. Also, an optical signal is added from a transmission system 5, and is branched by an optical coupler 6, and each of branched optical signals is input into an optical switch 3. A part of optical signals branched by the optical coupler 2 is dropped by an optical switch 7 toward a receiving system 8.

As the optical switch 3 shown in the figure, LCOS (Liquid Crystal On Silicon) type optical switch (document 1:G. Baxter et al. "Highly programmable Wavelength Selective Switch based on Liquid Crystal on Silicon switching elements" OFC2006, OTuF2, 2006, for example) is used.

Figure 4B:
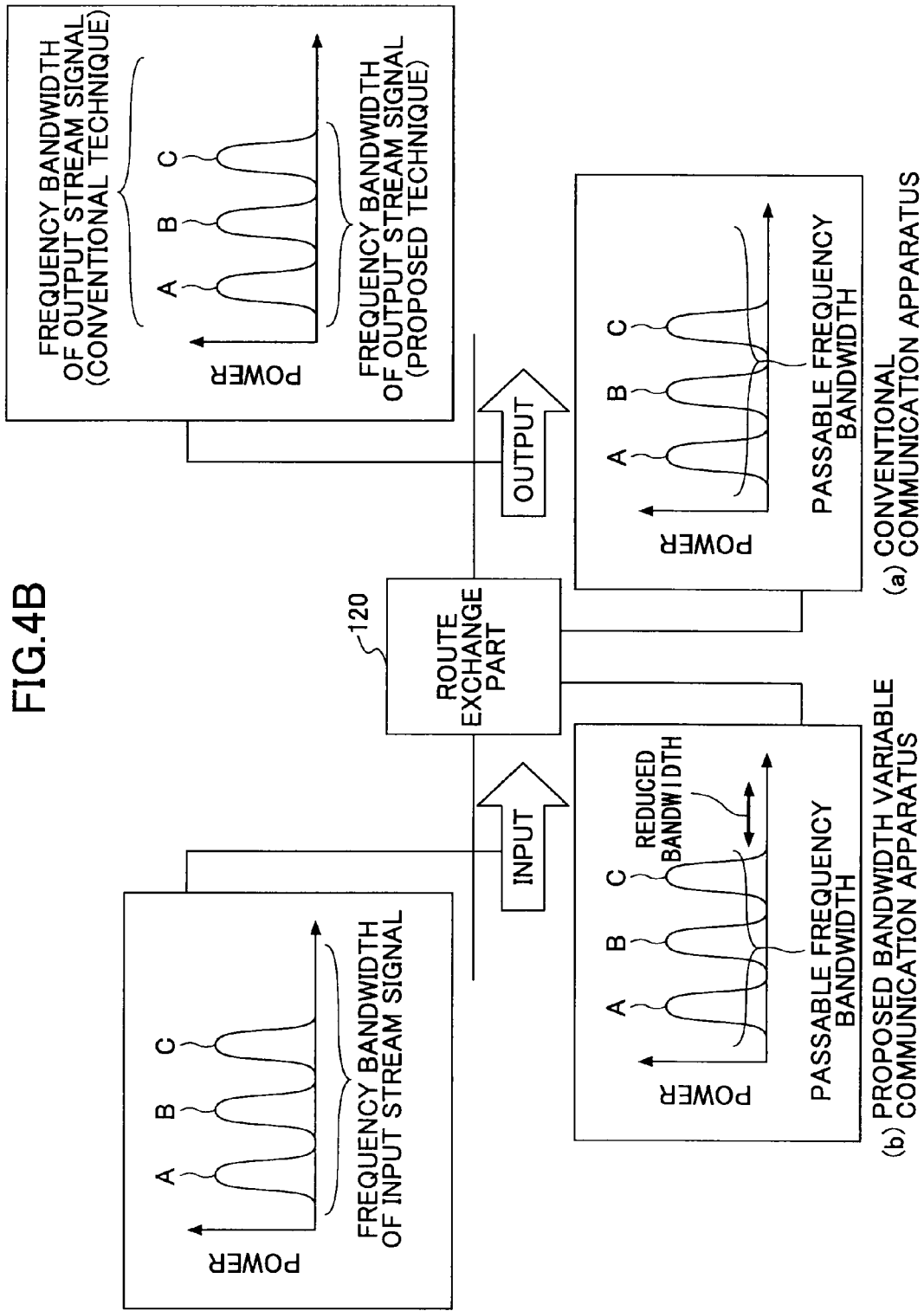
FIG. 4B is a diagram for explaining operation principle of the route exchange part (number of wavelengths variable type)

FIGS. 4A-5B show functions of the route exchange part 120. FIGS. 4A and 4B show a wavelength variable type, and FIGS. 5A and 5B show a speed variable type. FIG. 4A shows basic of relationship between frequency bandwidth of the input stream signal and passable frequency bandwidth from the input port to the output port. That is, in the case of FIG. 4A, a predetermined passable frequency bandwidth is set for a path in the route exchange part 120. Then, an optical signal of four wavelengths occupying the passable frequency bandwidth is input to the route exchange part 120, and the optical signal of the four wavelengths is output.

FIG. 4B shows a case where frequency bandwidth of the input stream signal decreases. In the conventional optical communication apparatus (FIG. 4B(a)), although the frequency bandwidth of the input stream signal decreases, the passable frequency bandwidth from the input port to the output port is not changed. Therefore, for example, an optical signal of other path cannot be assigned to a surplus bandwidth appearing due to the reduction of the frequency bandwidth of the input stream signal. Thus, waste of resources occurs.

On the other hand, the bandwidth variable communication apparatus 100 of the present embodiment adjusts voltage applied to LCOS of the route exchange part 120 so as to control switching of the input stream signal and the passable frequency bandwidth from the input port to the output port. For example, by reducing the passable frequency bandwidth from an input port to an output port, passable frequency bandwidth from another input port to another output port can be increased. Accordingly, for example, an optical signal of other path can be assigned to the reduced part of the bandwidth shown in FIG. 4B(b), and the optical signal can be output. However, the route exchange part 120 shown in FIG. 3 or the LCOS type optical switch is not necessarily used.

Also, FIGS. 5A and 5B show similar functions of FIGS. 4A and B. FIG. 5A shows basics of the speed variable case, and FIG. 5B shows difference between conventional technique and the present invention. Similarly to the case shown in FIG. 4B(b), as shown in FIG. 5B(b), when the speed of the input stream signal decreases, an optical signal of other path can be assigned to the deleted bandwidth deleted due to speed reduction, for example.

<Interface>

Next, a configuration of the bandwidth variable communication apparatus including interfaces 130 is shown in FIG. 6. This configuration corresponds to the bandwidth variable communication apparatus 100, shown in FIG. 2, that further includes interfaces in all or a part of input ports or output ports, the interface including:

a packet transmit-receive part 131 configured to transmit and receive packets with other communication apparatus connected via a transmission route;

a packet processing part 132 including a packet processing function for transmitting and receiving packets with the packet transmit-receive part 131, and a signal conversion function for performing signal conversion between a packet and a stream signal; and a stream transmit-receive part 133 configured to transmit and receive the stream signal with the route exchange part 120, the control part 110 further including:

a control information transmit-receive function for transmitting and receiving control information for all or a part of the packet transmit-receive part 131, the packet processing part 132 and the stream transmit-receive part 133 of the interface 130; and an interface control function for controlling the interface 130 based on the control information.

The interfaces are connected beyond the transmission system 5 and the receiving system 8 shown in FIG. 3, for example, and the functions are to receive a packet transmitted from a client communication apparatus such as a router and a layer 2 switch, to convert the packet into an optical layer signal format, and to transmit the signal to the route exchange part 120. Also, the functions are to convert the optical layer signal received via the route exchange part 120 into a packet, and to transmit the packet to the client communication apparatus.

Figure 7:
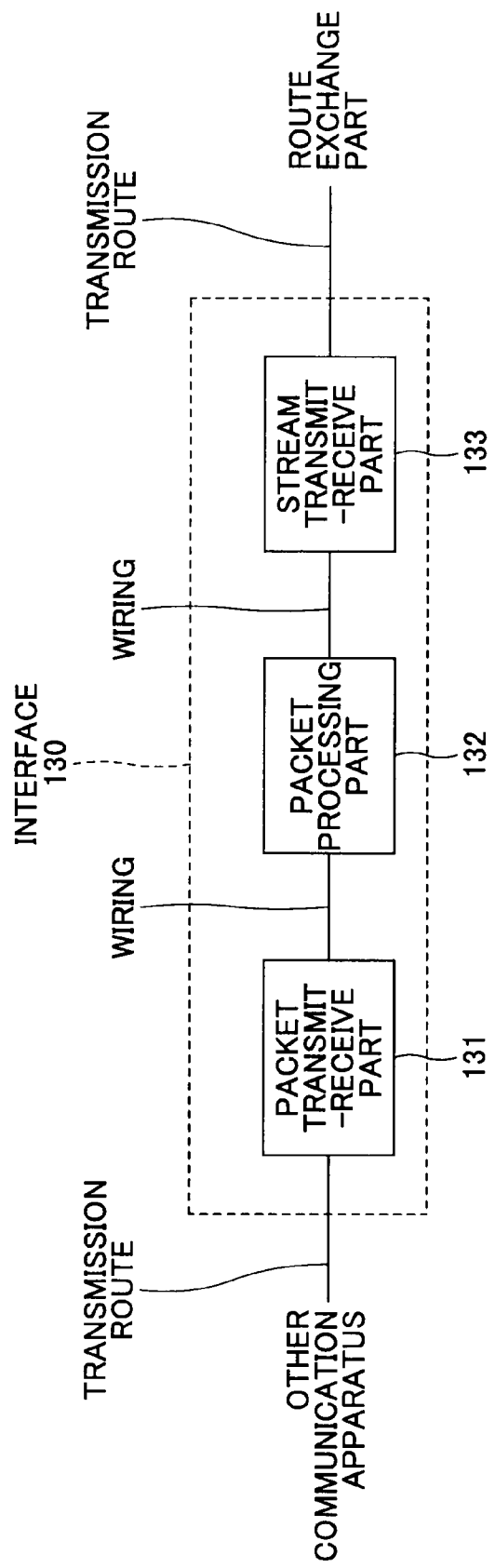
FIG. 7 is an example of a configuration of an interface in the first embodiment of the present invention.

FIG. 7 shows an example of the configuration of the interface in the first embodiment of the present invention. The interface 130 includes a packet transmit-receive part 131 connected to a client communication apparatus, a stream transmit-receive part 133 connected to an adjacent bandwidth variable communication apparatus, and a packet processing part 132 connecting the packet transmit-receive part 131 and the stream transmit-receive part 133. The packet transmit-receive part 131 and the packet processing part 132 may be integrally implemented. Also, the bandwidth variable communication apparatus 100 does not necessarily include the interface 130. In such a case, the bandwidth variable communication apparatus 100 transmits a signal transmitted from the client communication apparatus to an adjacent bandwidth variable communication apparatus as it is.

<Interface/Stream Transmit-Receive Part>

Next, an example is described in which the stream transmit-receive part 133 of the interface 130 includes an optical OFDM function (document 2:T. Kobayashi, et al., "Electro-optically multiplexed 110 Gbit/s optical OFDM signal transmission over 80 km SMF without dispersion compensation", Electronics Letters, vol. 44, no. 3, pp. 225-226, 2008). That is, the stream transmit-receive part 133 includes a device that transmits and receives an optical orthogonal frequency division multiplexing (OFDM) signal formed by a plurality of subcarriers in which frequency bands are partially overlapping.

Figure 8:
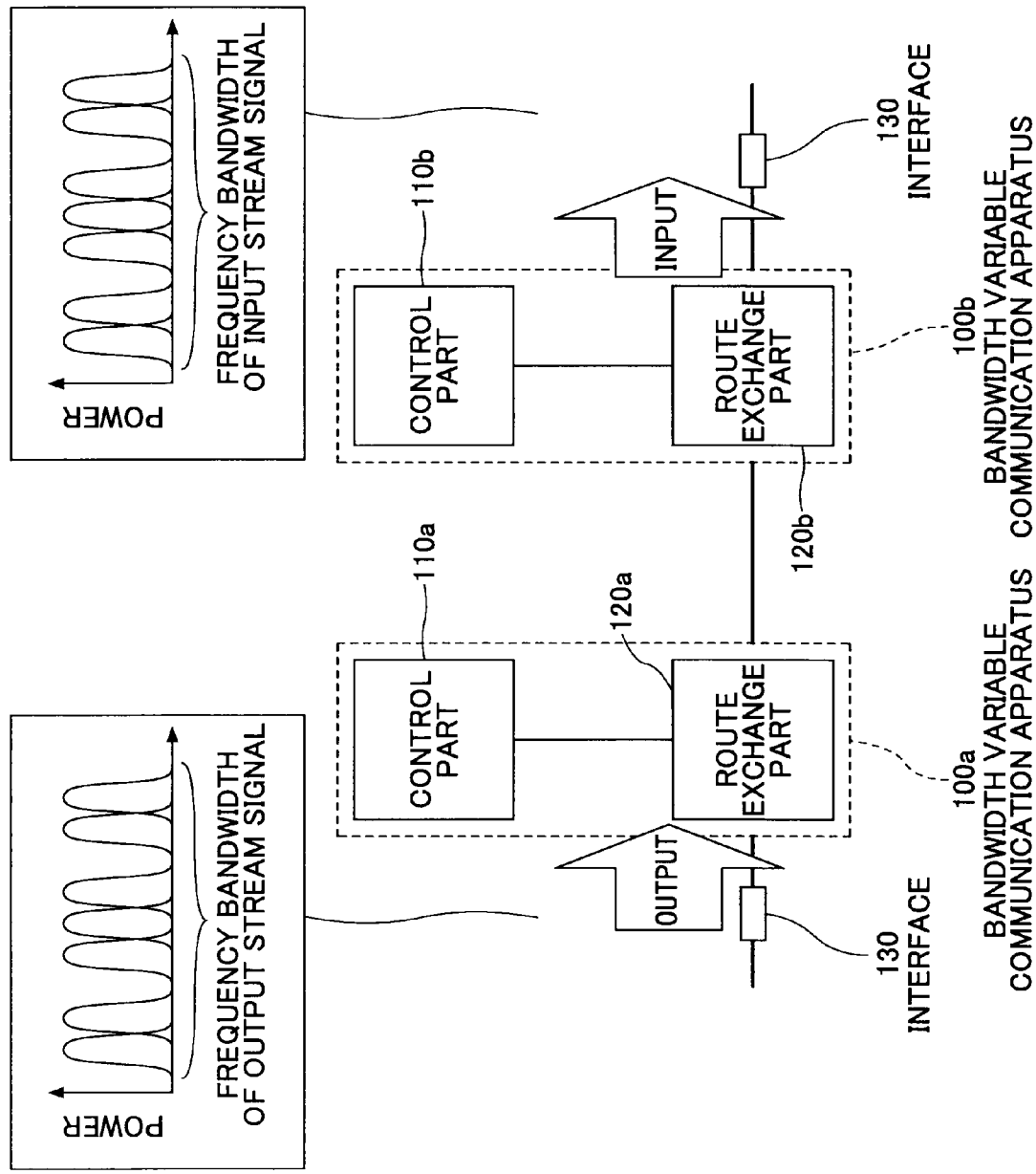
FIG. 8 is a diagram for explaining a stream transmit-receive part in the first embodiment of the present invention.

FIG. 8 is a diagram for explaining the stream transmit-receive part in the first embodiment of the present invention. When the optical OFDM is used as a modulation scheme, subcarrier spacing can be narrowed since codes between subcarriers are orthogonal. For example, when the bit rate of each subcarrier is 10 Gbit/s, multiplexing becomes possible with a spacing (equal to or greater than 10 GHz) by which subcarriers are overlapping as shown in FIG. 8. Therefore, the optical frequency use efficiency can be further increased compared to the case of the example shown in FIG. 3. However, the interface does not necessarily include the optical OFDM function.

<Interface/Packet Transmit-Receive Part, Packet Processing Part>

Next, relationship between the packet transmit-receive part and the packet processing part is described. In the bandwidth variable communication apparatus 100 in the example described here, one or more packet processing parts 132 are connected to one packet transmit-receive part 131 of the interface 130, and the packet transmit-receive part 131 including:

a distribution policy and an aggregation policy of signal processing load between the packet transmit-receive part 131 and the packet processing parts, the distribution policy and the aggregation policy being designed based on difference of signal processing capability between the packet transmit-receive part 131 and the packet processing part 132;

a function for transmitting packets to the packet processing parts based on the distribution policy; and a function for receiving packets from the packet processing parts based on the aggregation policy.

Figure 9:
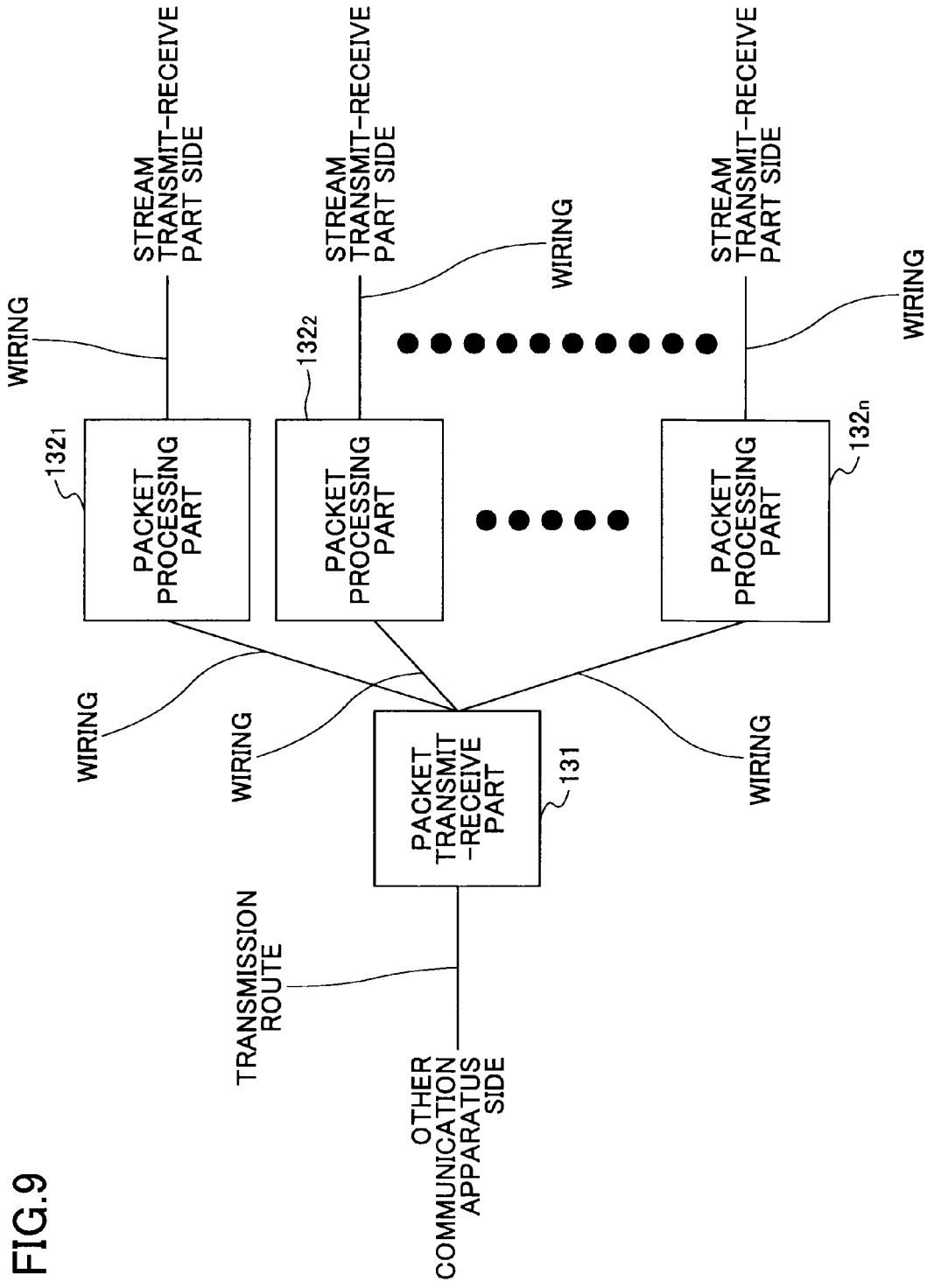
FIG. 9 is an example of a configuration of an interface in the first embodiment of the present invention.

FIG. 9 shows an example of the configuration of the interface 130. The figure shows a configuration in which one or more packet processing parts 132 are connected to one packet transmit-receive part 131. The packet transmit-receive part 131 distributes packets received from a communication apparatus in the client side to the packet processing parts $132_1$, $132_2$, ..., $132_n$, and aggregates packets transmitted from the packet processing parts 132. As to the distribution policy and the aggregation policy for the packets in this case, there are two patterns for the distribution and aggregation, which are for each traffic flow and for each packet.

Figure 10:
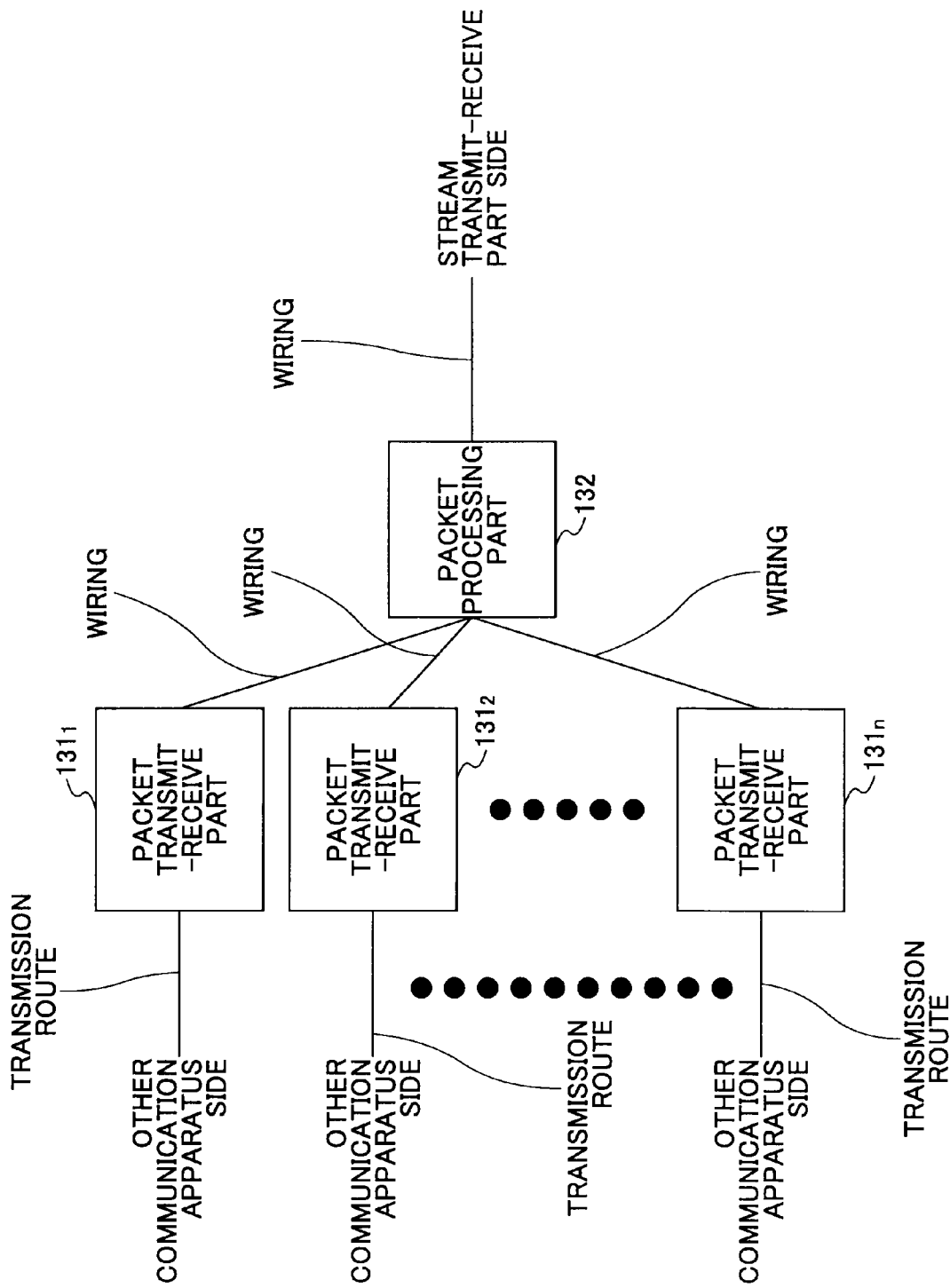
FIG. 10 is an example of a configuration of an interface in the first embodiment of the present invention.

FIG. 10 shows another example of the configuration of the interface 130 of the first embodiment of the present invention. In the bandwidth variable communication apparatus 100 in this example, one packet processing part 132 is connected to equal to or greater than two packet transmit-receive parts 131 of the interface 130, and the packet processing part including:

a distribution policy and an aggregation policy of signal processing load between the packet transmit-receive parts and the packet processing part, the distribution policy and the aggregation policy being designed based on difference of signal processing capability between the packet transmit-receive part 131 and the packet processing part 132;

a function for transmitting packets to the packet transmit-receive parts based on the distribution policy; and a function for receiving packets from the packet transmit-receive parts based on the aggregation policy.

In the example shown in FIG. 10, instead of the configuration shown in FIG. 9, one packet processing part 132 may be connected to equal to or more than two packet transmit-receive parts $131_1$, $131_2$, ..., $131_n$. As to distribution policy and aggregation policy for the packets in this case, there are two patterns for distribution and aggregation which are for each traffic flow and for each packet.

Figure 11:
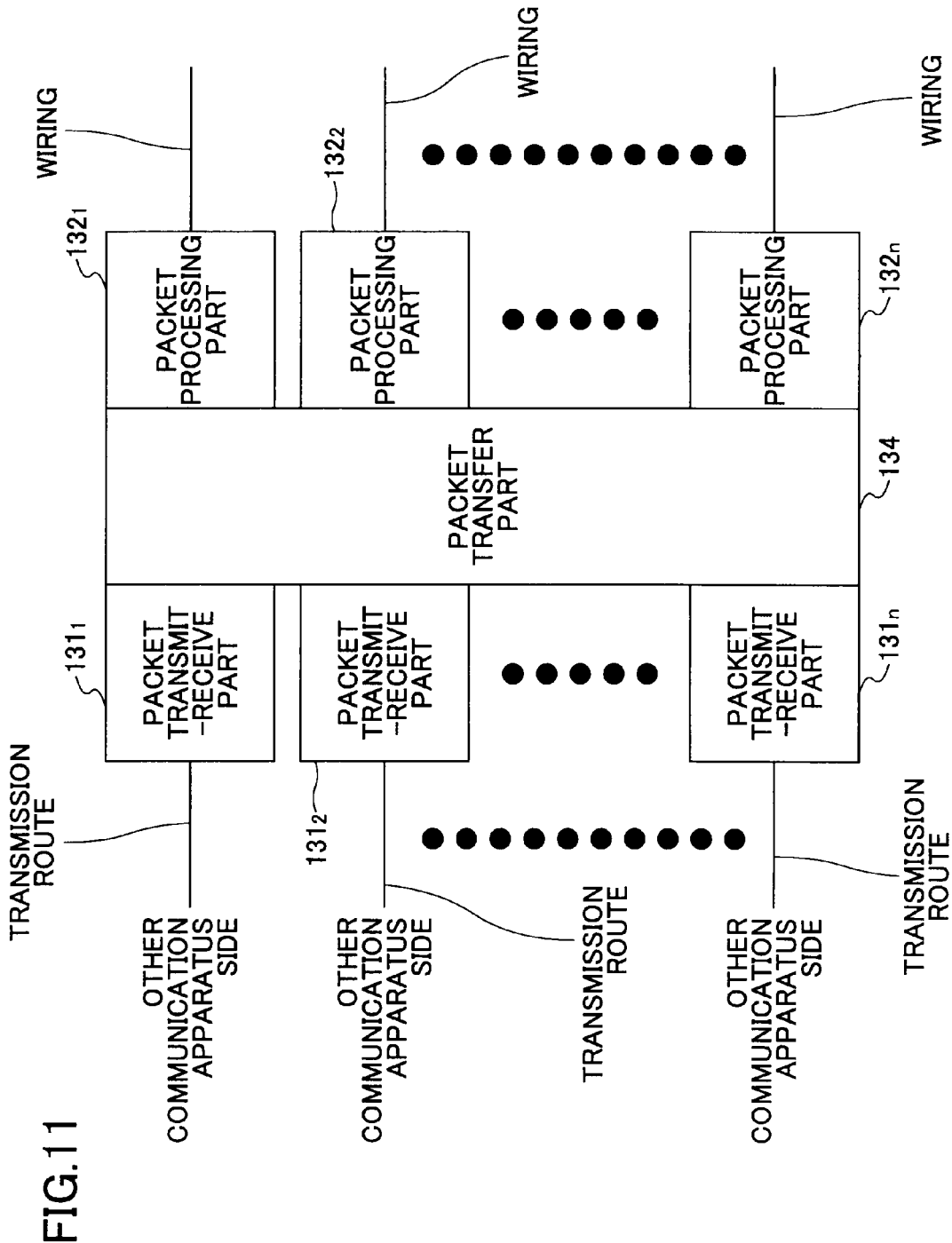
FIG. 11 is an example of a configuration of an interface or interfaces in the first embodiment of the present invention.

A configuration shown is FIG. 11 may be adopted. The bandwidth variable communication apparatus 100 in this example further includes a packet transfer part 134 configured to transfer packets exchanged between the packet transmit-receive part 131 and the packet processing part 132 of the interface 130 to a different transmit-receive part that is different from the above-mentioned packet transmit-receive part 131, or to a different packet processing part 132 that is different from the above-mentioned packet processing part 132, the control part 110 including:

a control information transmit-receive function for transmitting and receiving control information for the packet transfer part 134; and a packet transfer control function for controlling the packet transfer part 134 based on the control information.

FIG. 11 shows an example in which a packet transfer part 134 is arranged between the packet transmit-receive parts 131 and the packet processing parts 132 in one interface, or arranged between the packet transmit-receive parts 131 and the packet processing parts 132 over a plurality of interfaces. The packet transfer part 134 is a router or an Ethernet switch. The packet transfer unit 134 is a router or an Ethernet switch. However, it is only necessary that the packet transfer part 134 is a communication apparatus for performing routing or forwarding based on header information of the packet, and it may be a communication apparatus other than the router or the Ethernet switch. Exchange relationship of packets between the packet transmit-receive part 131 and the packet processing part 132 shown in FIGS. 9 and 10 is static. Thus, the connection relationship between the packet transmit-receive part 131 and the packet processing part 132 becomes inefficient due to change of the amount of exchanged packets. On the other hand, as to the configuration shown in FIG. 11, transfer of packets is controlled according to header information of packets, so that the connection relationship between the packet transmit-receive parts $131_1$, $131_2$, ..., $131_n$ and the packet processing parts $132_1$, $132_2$, ..., $132_n$ dynamically changes. As a result, the connection relationship does not become inefficient.

As the configuration of the interface 130, any one of the examples shown in FIGS. 9, 10 and 11 may be used.

Next, another example of the interface 130 is described with reference to FIG. 12. In the bandwidth variable communication apparatus 100 in this example, one or more stream transmit-receive parts 133 are connected to one packet processing part 132 of the interface 130, and the packet processing part 132 including:

a distribution policy and an aggregation policy of signal processing load between the packet processing part 132 and the stream transmit-receive parts, the distribution policy and the aggregation policy being designed based on difference of signal processing capability between the stream transmit-receive part 133 and the packet processing part 132;

a function for transmitting packets to the stream transmit-receive parts based on the distribution policy; and a function for receiving packets from the stream transmit-receive parts based on the aggregation policy.

Figure 12:
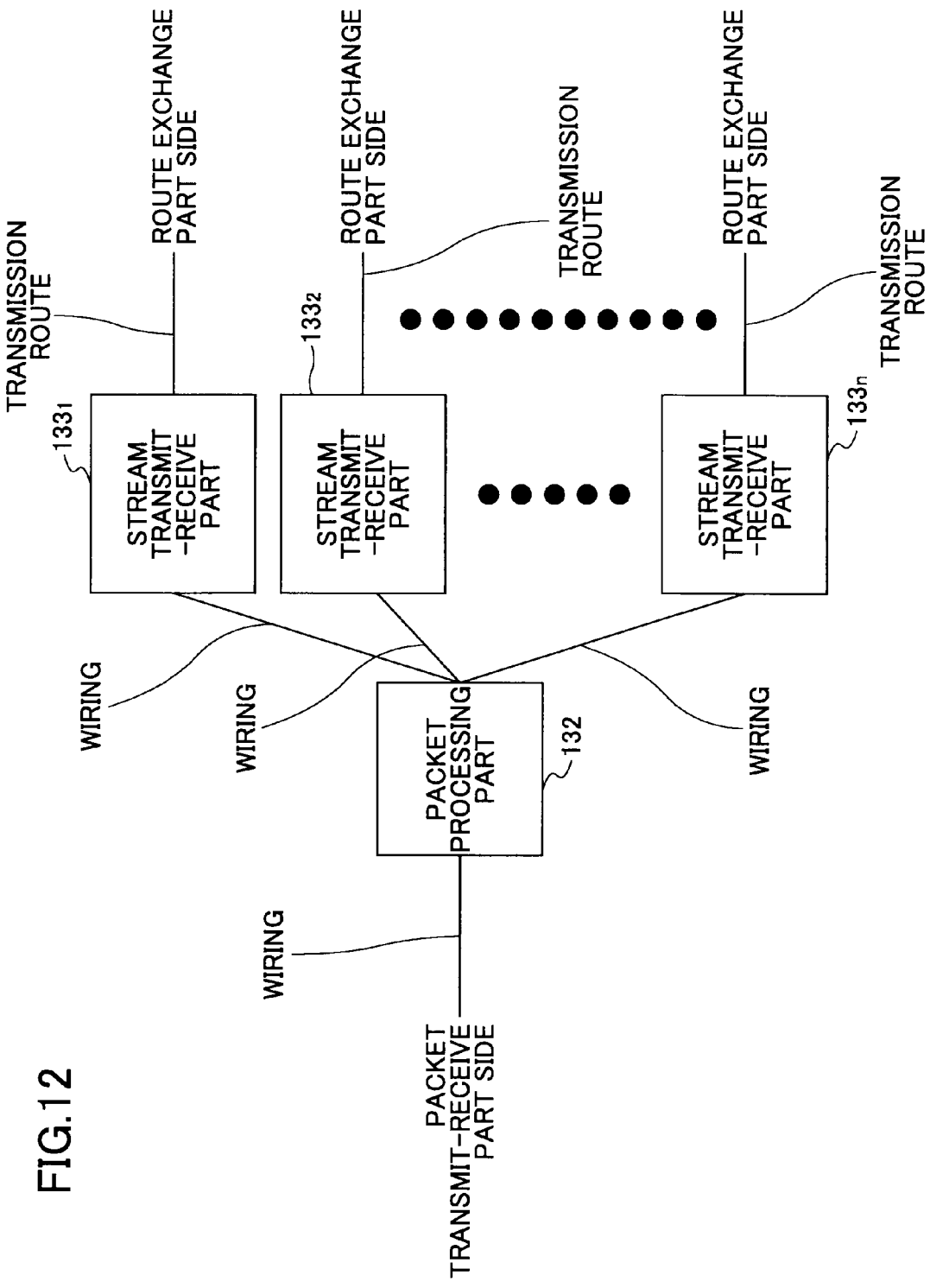
FIG. 12 is an example of a configuration of an interface in the first embodiment of the present invention.

As shown in FIG. 12, the packet processing part 132 converts packets received from the packet transmit-receive part 131 into stream signals and distributes the stream signal, and aggregates stream signals transmitted from the stream transmit-receive parts 133. As to the distribution policy and the aggregation policy for the stream signals, there are three patterns for distribution and aggregation which are for each byte, for each multi-bit, and for each bit. The number of bits for the multi-bit depends on implementation. For example, when the unit of multi-bit is eight bits, it is similar to byte unit.

Figure 13:
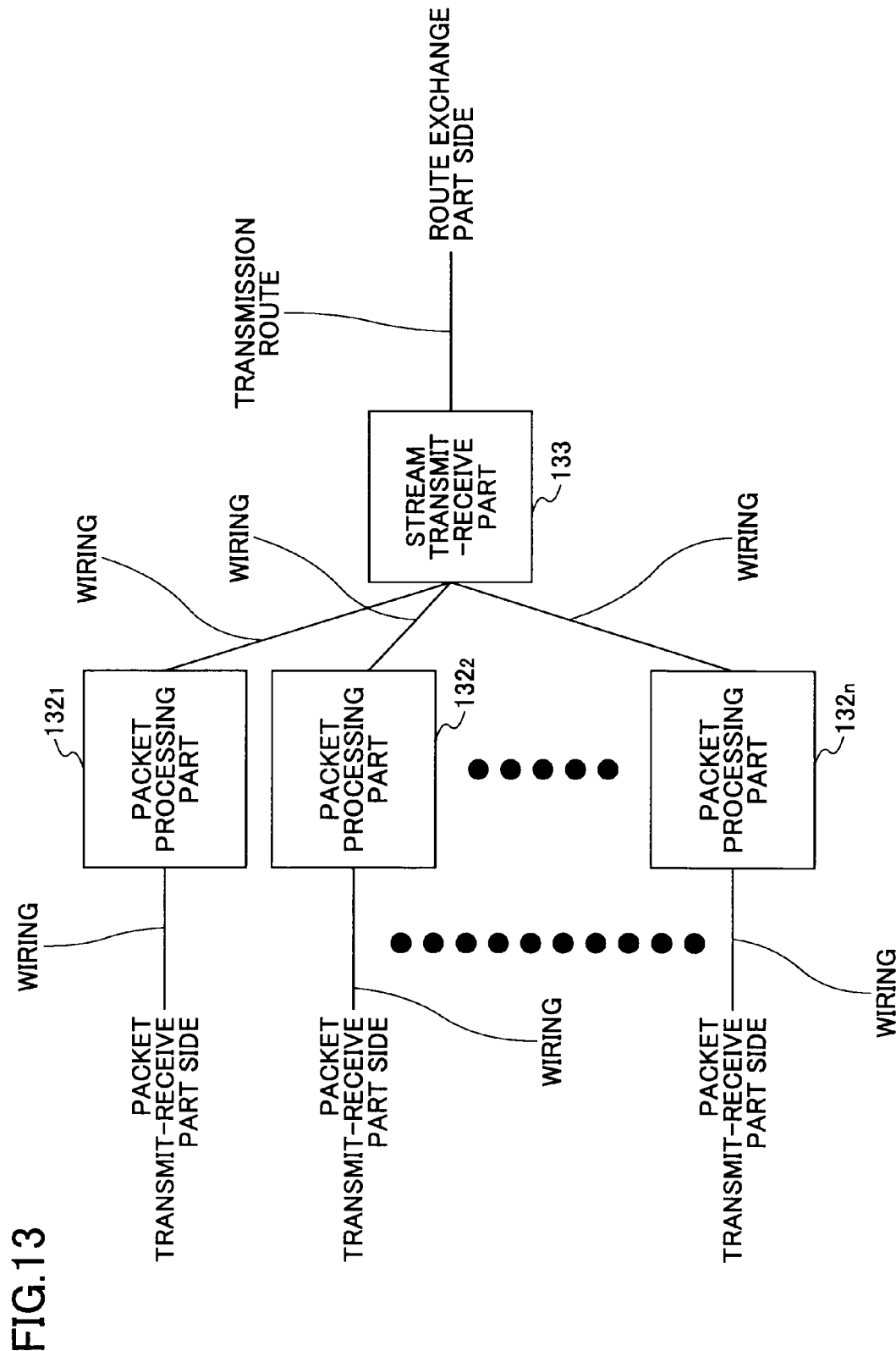
FIG. 13 is an example of a configuration of an interface in the first embodiment of the present invention.

On the other hand, a configuration shown in FIG. 13 may be used instead of the configuration of FIG. 12. In the bandwidth variable communication apparatus 100 in the example shown in FIG. 13, one stream transmit-receive part 133 is connected to equal to or greater than two packet processing parts 132 of the interface 130, and the stream transmit-receive part 133 including:

a distribution policy and an aggregation policy of signal processing load between the packet processing parts and the stream transmit-receive part, the distribution policy and the aggregation policy being designed based on difference of signal processing capability between the stream transmit-receive part 133 and the packet processing part 132;

a function for transmitting stream signals to the packet processing parts based on the distribution policy; and a function for receiving stream signals from the packet processing parts based on the aggregation policy.

That is, in the configuration of FIG. 13, one stream transmit-receive part 133 is connected to equal to or greater than two packet processing parts $132_1$, $132_2$, ..., $132_n$. As to the distribution policy and the aggregation policy, there are three patterns for distribution and aggregation which are for each byte, for each multi-bit, and for each bit.

Any configuration of those shown in FIGS. 12 and 13 may be used.

<Interface/Stream Transmit-Receive Part>

Next, an example of a configuration of the stream transmit-receive part in the first embodiment of the present embodiment is described.

Figure 14:
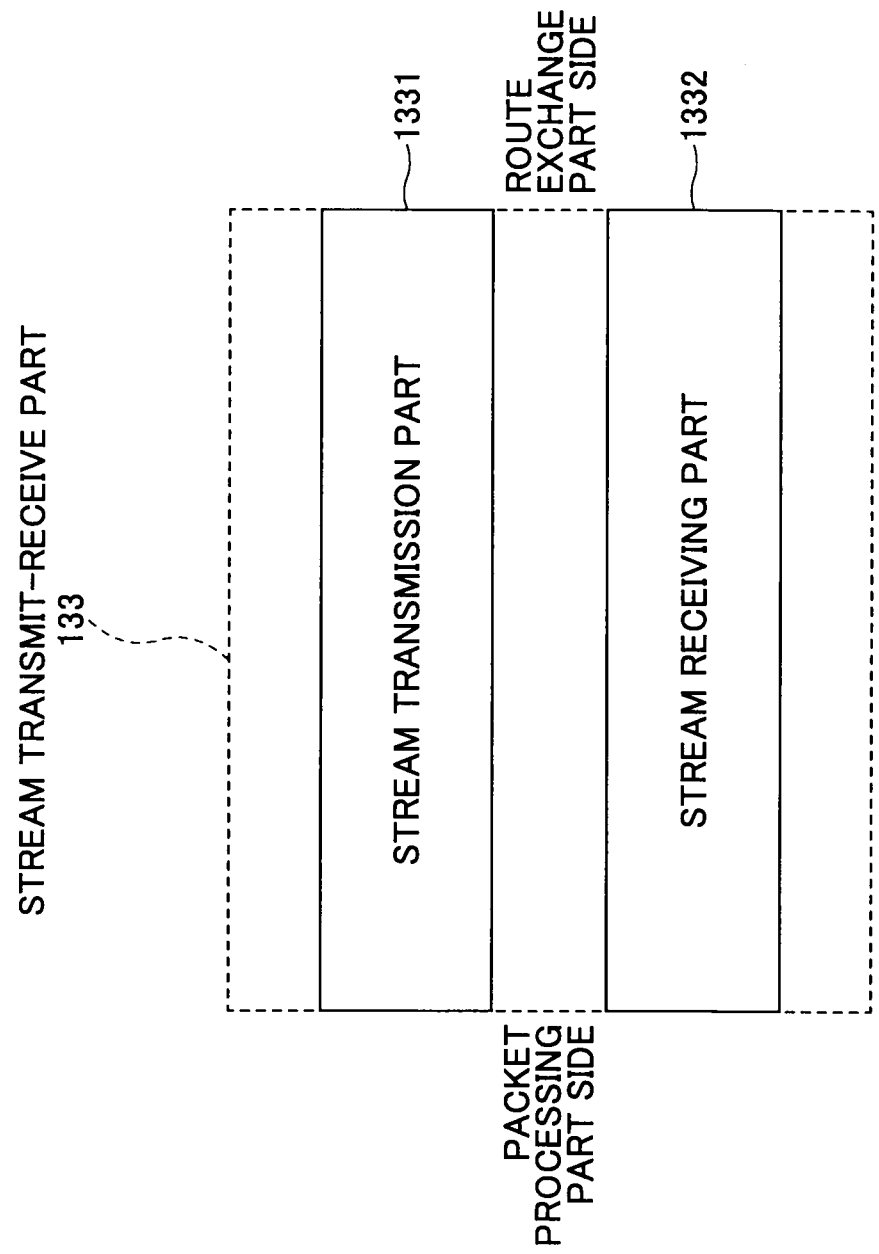
FIG. 14 is an example of a configuration of a stream transmit-receive part in the first embodiment of the present invention.

FIG. 14 shows a configuration of the stream transmit-receive part 133 in this example.

In the figure, the stream transmit-receive part 133 of the interface 130 includes a stream transmission part 1331 and a stream receiving part 1332.

Figure 15:
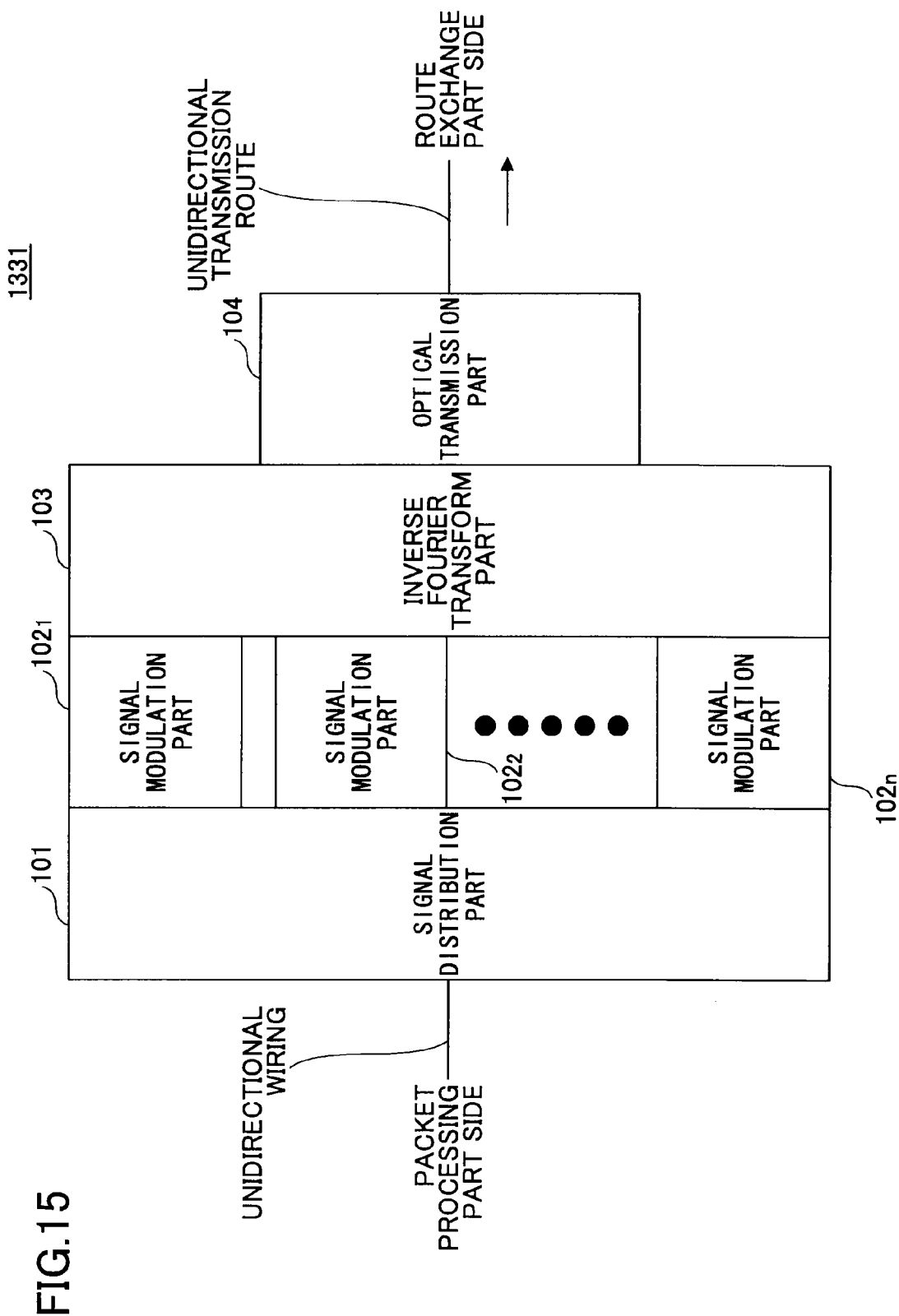
FIG. 15 is an example of a stream transmission part in the first embodiment of the present invention.

FIG. 15 shows the stream transmission part 1331 of the present embodiment. The stream transmission part 1331 shown in the figure is an example of a stream transmission part using an optical OFDM scheme. The stream transmission part 1331 includes:

a signal distribution part 101 configured to distribute a stream signal output from the packet processing part 132 to one or more substream signals;

one or more signal modulation parts $102_1, 102_2, \ldots, 102_n$ including a function for modulating each substream signal output by the signal distribution part 101;

an inverse Fourier transform part 103 including a function for collectively transforming substream signals modulated by the signal modulation parts and existing on the frequency domain from the frequency domain to the time domain, and a function for outputting the substream signals converted into the time domain as an inverse Fourier transformed stream signal; and an optical transmission part 104 configured to convert the inverse Fourier transformed signal output from the inverse Fourier transform part 103 into one or more subcarrier lights. According to this configuration, the stream signal transmitted from the packet processing part 132 can be converted to subcarrier lights of the optical OFDM scheme. As a result, the optical frequency bandwidth of the stream signal in the optical network can be narrowed, so that an optical network of high use efficiency of optical frequencies can be realized.

<Interface/Stream Transmit-Receive Part/Stream Transmission Part>

Figure 16:
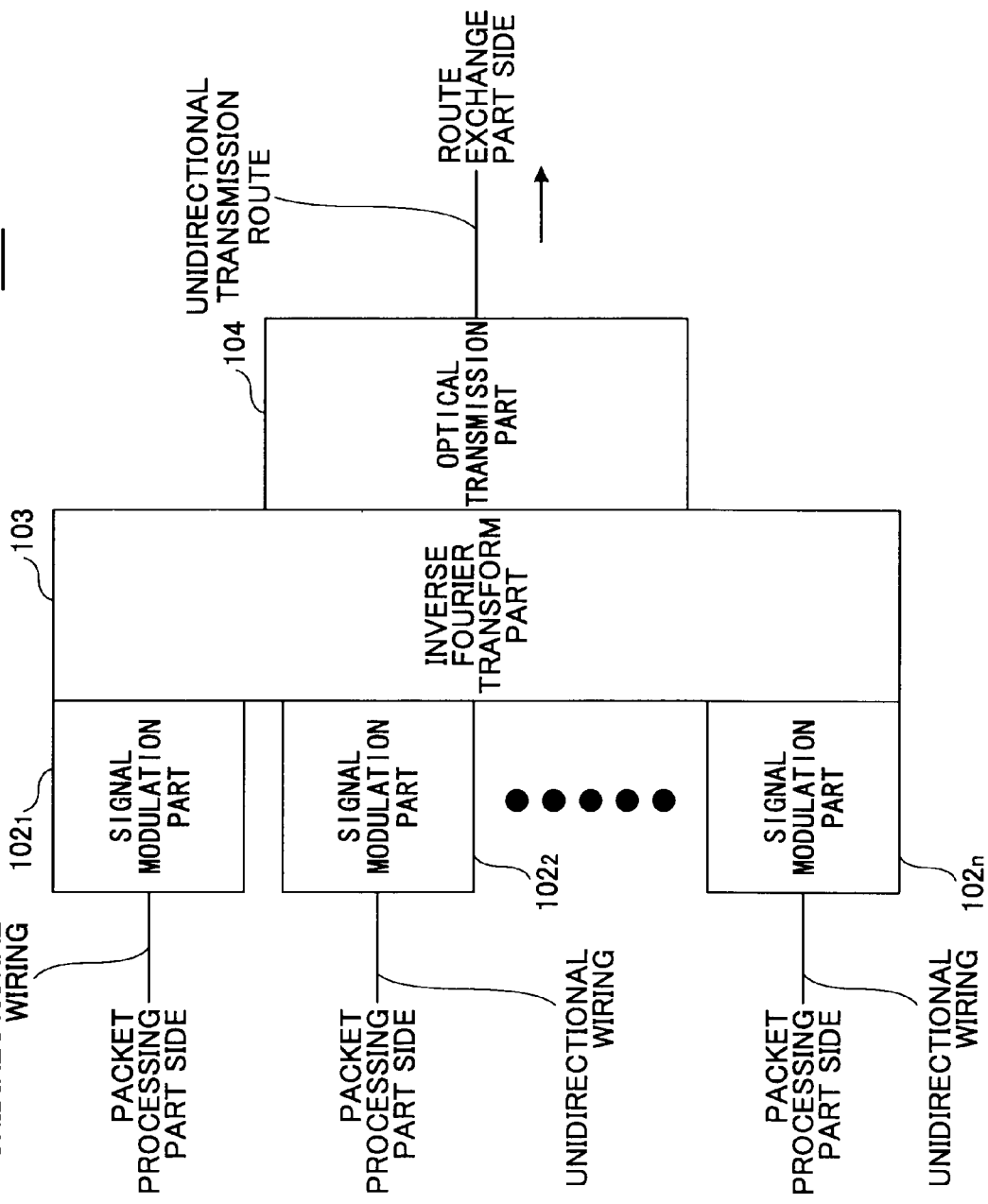
FIG. 16 is an example of a stream transmission part in the first embodiment of the present invention.

FIG. 16 shows another example of the stream transmission part in the first embodiment of the present invention.

The configuration shown in the figure is an example of the stream transmission part 1331 using the optical OFDM scheme. The stream transmission part 1331 includes:

one or more signal modulation parts $101_1, 101_2, \ldots, 101_n$ each including a function for modulating each stream signal output by the packet processing parts to generate substream signals;

an inverse Fourier transform part 103 including a function for collectively transforming substream signals modulated by the signal modulation parts 101 and existing on the frequency domain from the frequency domain to the time domain, and a function for outputting the substream signals converted into the time domain as an inverse Fourier transformed stream signal; and one or more optical transmission parts 104 configured to convert the inverse Fourier transformed signal output from the inverse Fourier transform part 103 into one or more subcarriers. According to this configuration, stream signals output from the packet processing parts 132 into subcarrier light of the optical OFDM scheme. Similarly to the example shown in FIG. 15, the optical frequency bandwidth of the stream signal in the optical network can be narrowed, so that an optical network of high use efficiency of optical frequencies can be realized.

Figure 17:
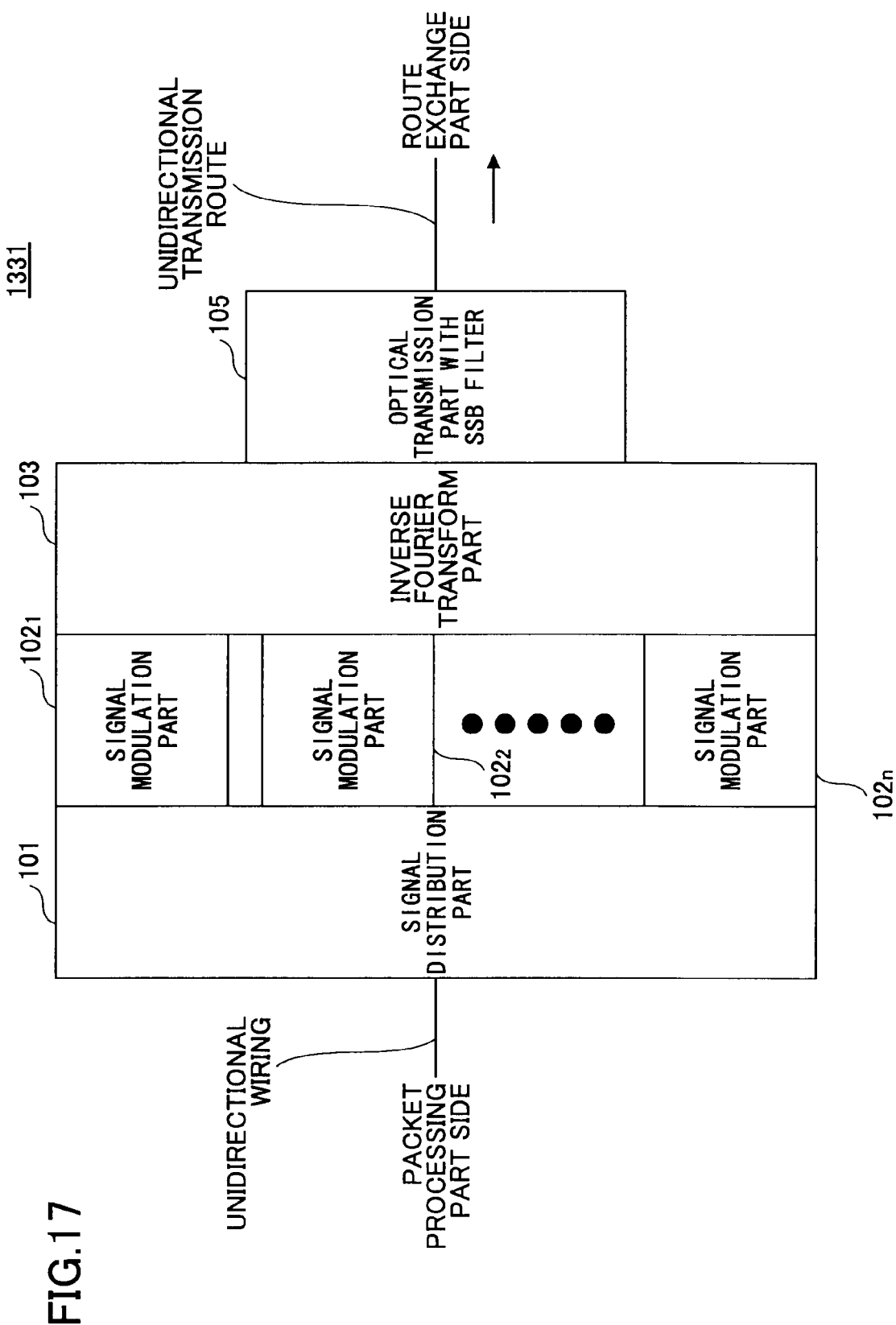
FIG. 17 is an example (1) of a stream transmission part in the first embodiment of the present invention.

FIG. 17 shows another example of the stream transmission part in the first embodiment of the present invention. The stream transmission part 1331 shown in the figure is an example using the optical OFDM scheme. This configuration is characterized in that the optical transmission part 105 deletes a part of sideband occurring in subcarriers by using single-sideband modulation, in the example shown in FIG. 15. Normally, when the optical OFDM scheme shown in FIG. 15 is used, since sidebands occur in both sides of the center carrier light frequency in the optical spectrum of the optical signal, optical frequency bandwidth which is more than twice the bit rate is necessary. In the example shown in FIG. 17, a part of the sideband occurring in subcarrier is deleted by using a SSB optical modulator or a SSB optical filter for extracting only the single sideband, so that an optical network of higher use efficiency of optical frequencies can be realized.

Figure 18:
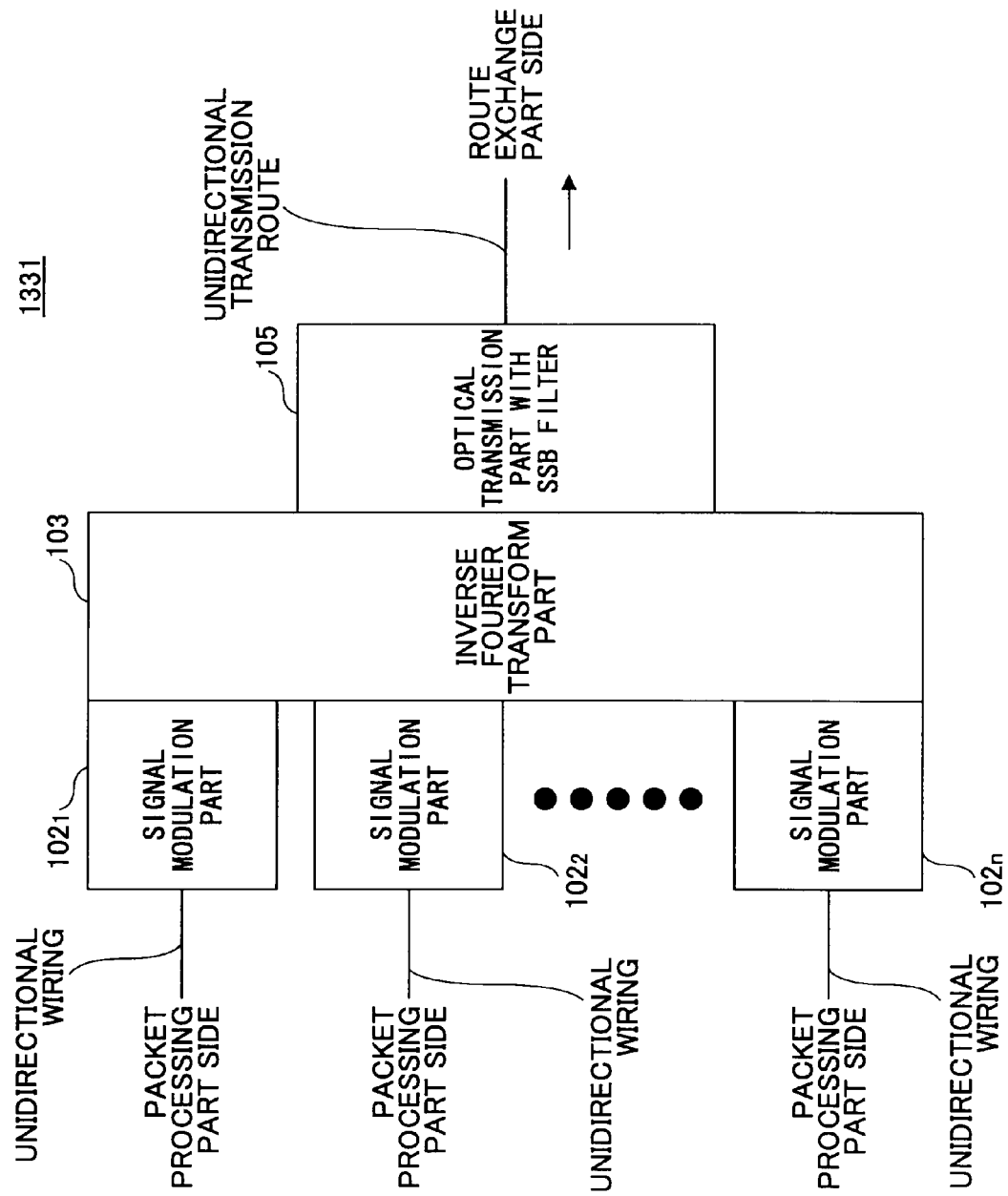
FIG. 18 is an example (2) of a stream transmission part in the first embodiment of the present invention.

FIG. 18 shows another example of the stream transmission part in the first embodiment of the present invention. The stream transmission part 1331 shown in the figure is a second example of the stream transmission part using the optical OFDM scheme. This configuration is characterized in that the optical transmission part 105 deletes a part of sideband occurring in subcarriers by using suppressed carrier single-sideband modulation, in the example shown in FIG. 16. Similarly to FIG. 17, a part of the sideband occurring in subcarriers is deleted by using a SSB optical modulator or a SSB optical filter for extracting only the single sideband, so that an optical network of higher use efficiency of optical frequencies can be realized.

Figure 19:
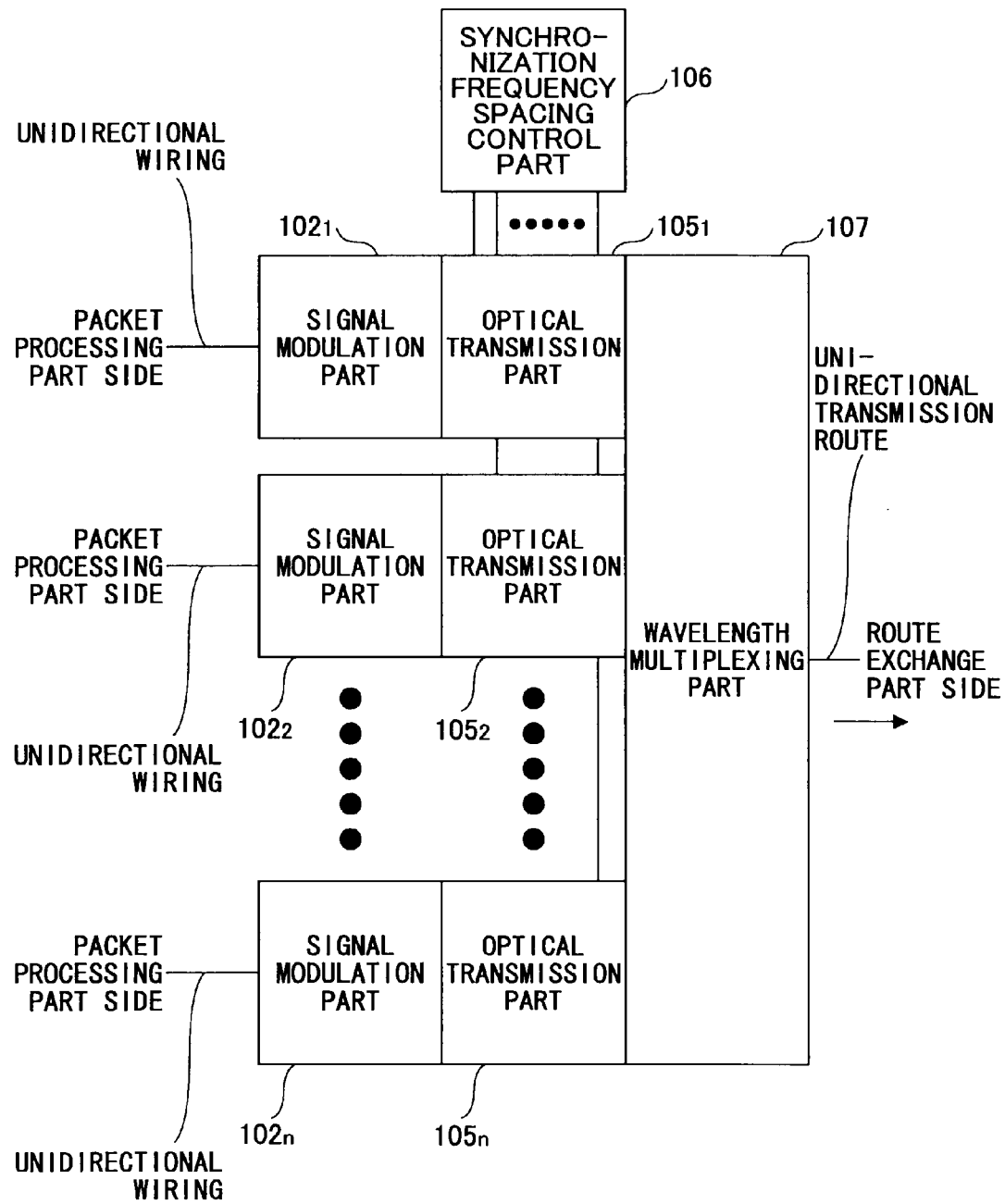
FIG. 19 is an example of a stream transmission part in the first embodiment of the present invention.

FIG. 19 shows another example of the stream transmission part in the first embodiment of the present invention. The stream transmission part 1331 shown in the figure is an example of a stream transmission part using the optical OFDM scheme. The stream transmission part includes:

signal modulation parts $102_1, 102_2, \ldots, 102_n$ including a function for modulating stream signals output by the packet processing parts 132 to generate substream signals;

one or more optical transmission parts $105_1, 105_2, \ldots, 105_n$ including a function for converting substream signals output from each signal modulation part 102 into subcarrier lights;

a synchronization frequency spacing control part 106 including a function for controlling the optical transmission parts 105 for equalizing every optical frequency spacing between subcarrier lights output from the optical transmission parts 105; and a wavelength multiplexing part 107 configured to aggregate one or more subcarriers output from the one or more optical transmission parts 105. In addition, by setting the optical frequency spacing of the subcarrier lights to be equal to or greater than the bit rate of the substream signal, the stream signal of the optical OFDM scheme is generated. In the example shown in FIG. 19, one or more stream signals output from the packet processing parts 132 are converted into subcarrier lights by individual optical transmit parts 105, then, the subcarrier lights are wavelength-multiplexed so as to generate a stream signal of the optical OFDM scheme. Also, according to this example, similarly to the example of FIG. 16, the optical frequency bandwidth of the stream signal in the optical network can be narrowed, so that an optical network of high use efficiency of optical frequencies can be realized.

Figure 20:
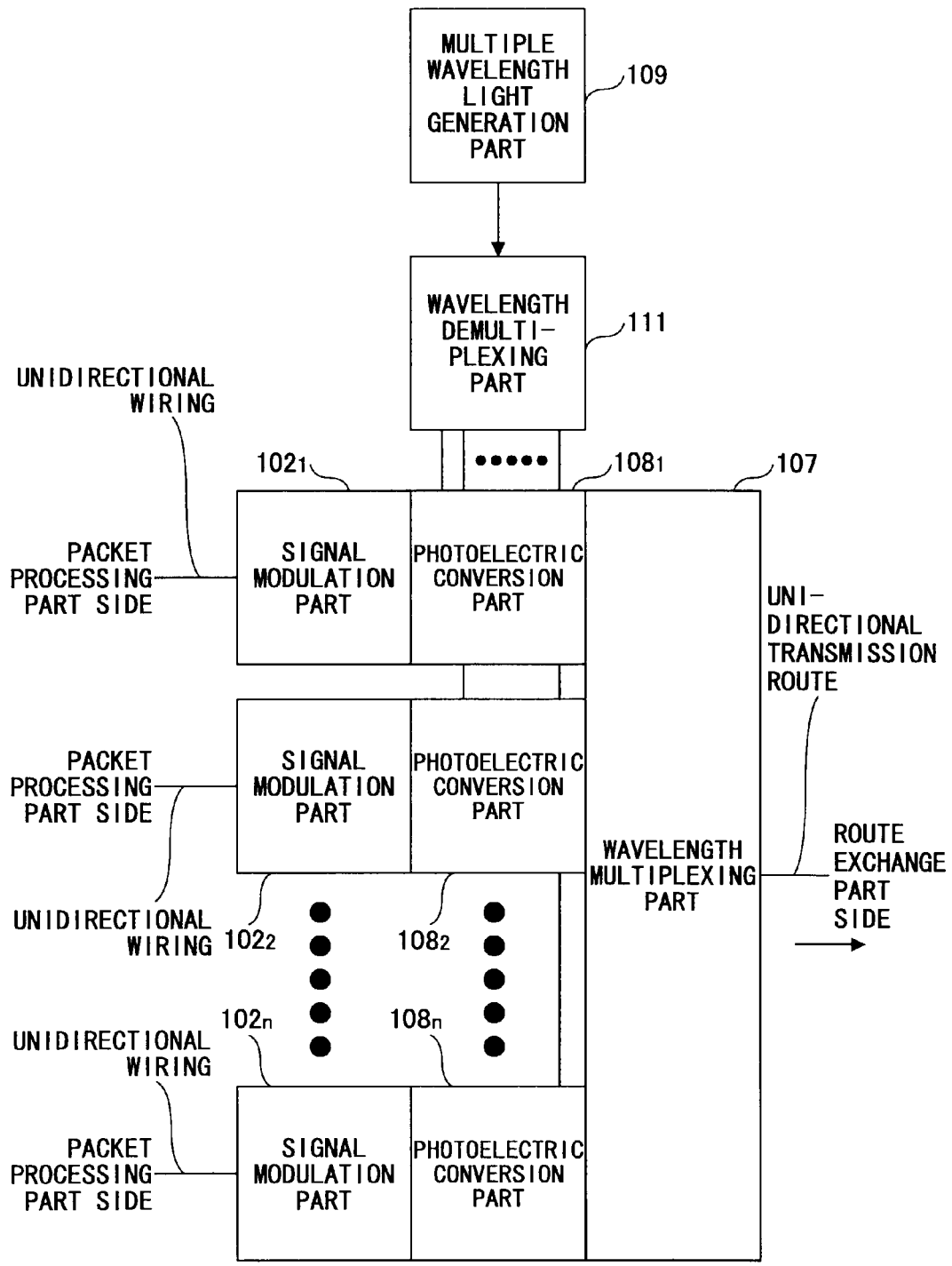
FIG. 20 is an example of a stream transmission part in the first embodiment of the present invention.

FIG. 20 shows another example of the stream transmission part in the first embodiment of the present invention. The stream transmission part 1331 shown in the figure is an example of a stream transmission part using the optical OFDM scheme. The stream transmission part 1331 includes:

signal modulation parts $102_1, 102_2, \ldots, 102_n$ including a function for modulating one or more stream signals output from the packet processing parts 132 to generate substream signals;

a multiple wavelength light generation part 109 including a function for collectively generating one or more continuous carrier lights;

a wavelength demultiplexing part 111 configured to demultiplex the one or more continuous carrier lights;

photoelectric conversion parts $108_1, 108_2, \ldots, 108_n$ including a function for modulating the continuous carrier lights by the substream signals output from the signal modulation parts $102_1, 102_2, \ldots, 102_n$ to convert the continuous carrier lights into subcarrier lights; and a wavelength multiplexing part 107 configured to wavelength-multiplex one or more subcarrier lights output from the photoelectric conversion parts to generate a stream signal of the optical OFDM scheme. In addition, by setting optical frequency spacing of the subcarrier lights generated from the multiple wavelength light generation part 109 to be equal to or greater than the bit rate of the substream signal, the stream signal of the optical OFDM signal is generated. In this example, the photoelectric conversion parts 108 respectively modulate one or more subcarrier lights generated from the multiple wavelength light generation part 109 by using one or more stream signals output from the packet processing parts 132 so as to convert into subcarrier lights, then the subcarrier lights are wavelength-multiplexed so as to generate a stream signal of the optical OFDM scheme.

In the example shown in FIG. 18, since different optical transmission parts are used, it is necessary to provide the synchronization control part for controlling the optical frequency spacing between subcarrier lights. On the other hand, in this example, since the subcarrier lights are generated by using multicarrier light, from the single light source, in which optical frequency spacing is equalized, the synchronization frequency spacing control part is unnecessary. More specifically, as the multiple wavelength light generation part 109, a combination of a CW (Continuous Wave) light source such as a semiconductor laser and an external optical modulator such as $LiNbO_3$ optical modulator and electroabsorption optical modulator can be used, and also, a combination of a pulse light source such as mode synchronization laser and nonlinear optical medium such as optical fiber can be used. Also in this example, similarly to the before-mentioned example, the optical frequency bandwidth of the stream signal in the optical network can be narrowed, so that an optical network of high use efficiency of optical frequencies can be realized.

When the external optical modulator is used, the number of subcarrier lights to be generated can be controlled by modulation degree of the external optical modulator, and when the nonlinear optical medium is used, the number of subcarrier lights to be generated can be controlled by the power of the input optical pulse. Therefore, the number of subcarrier lights to be generated can be easily controlled according to required capacity, which is applicable for efficient use of consumed power.

One of advantages of the optical OFDM scheme is high dispersion tolerance. In the optical OFDM scheme, by dividing a signal of a bit rate into subcarriers, it becomes possible to increase tolerance against transmission characteristics deterioration due to wavelength dispersion and polarization mode dispersion to tolerance corresponding to low bit rate of the subcarrier. But, difference of the dispersion value between subcarriers due to dispersion slope of a plurality of transmission routes causes a lag of transmission time between subcarriers. For absorbing the time lag, there is a method for adding a guard interval to the main signal.

Figure 21:
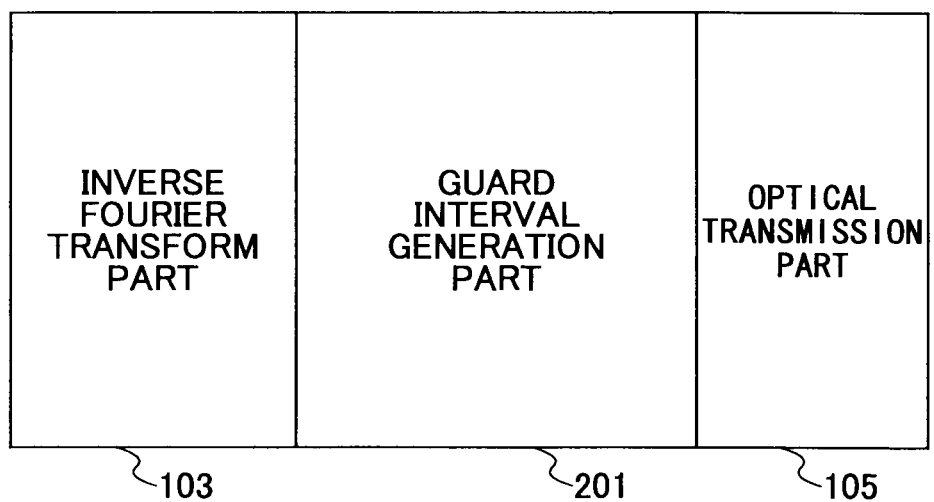
FIG. 21 is an example (1) of a guard interval generation part in the first embodiment of the present invention.
Figure 22:
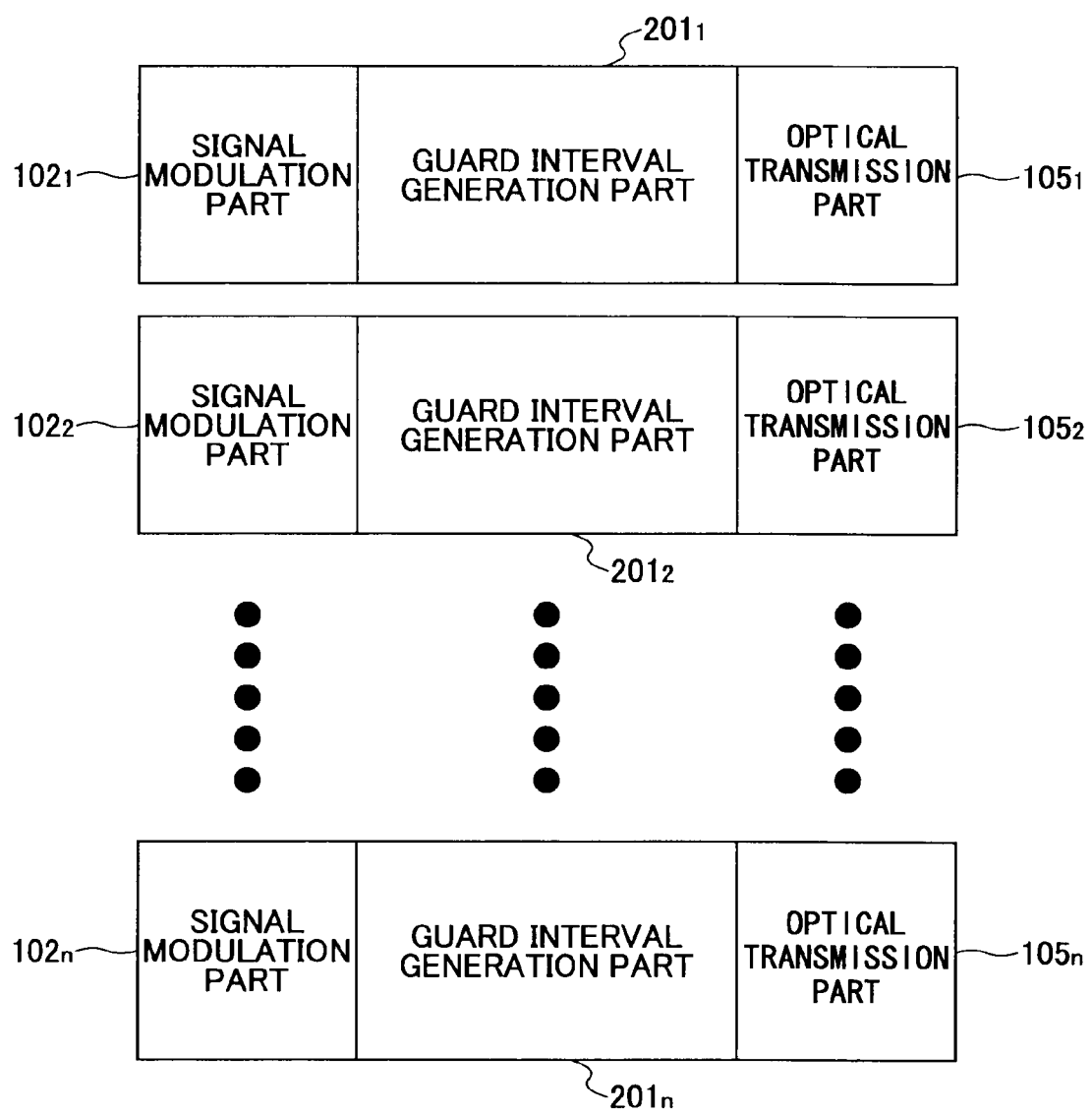
FIG. 22 is an example (2) of a guard interval generation part in the first embodiment of the present invention.
Figure 23:
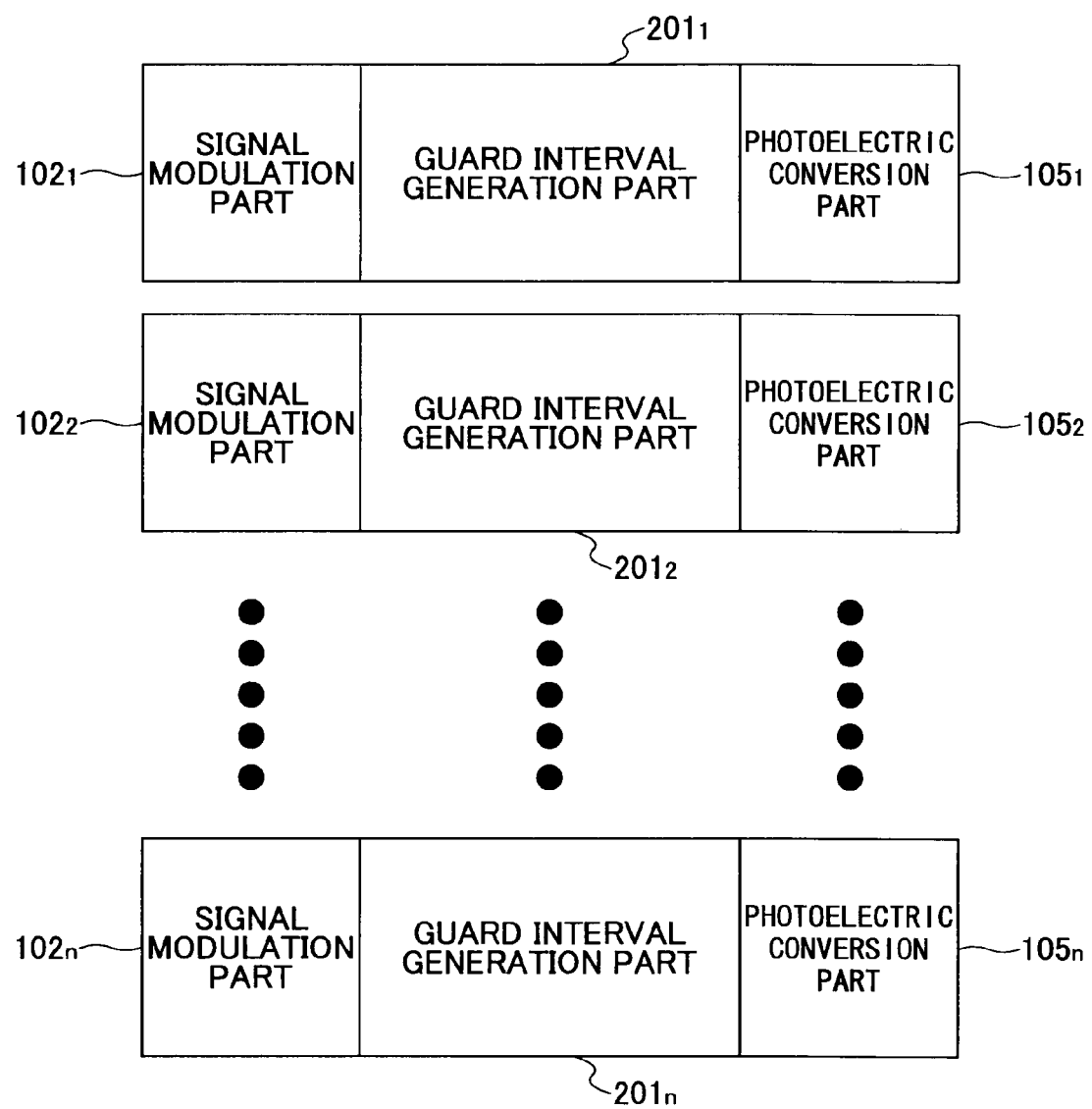
FIG. 23 is an example (3) of a guard interval generation part in the first embodiment of the present invention.

FIGS. 21, 22 and 23 shows examples of the guard interval generation part. FIG. 21 corresponds to FIG. 15, FIG. 22 corresponds to FIG. 19, and FIG. 23 corresponds to FIG. 20. The guard interval generation part 201 includes:

a function for generating a guard interval by wholly or partially repeating the inverse Fourier transformed stream signal output from the inverse Fourier transform part 103 or the substream signal output from the signal modulation part 102;

a function for combining the generated guard interval to the inverse Fourier transformed stream signal or the substream signal; and a function for transmitting the inverse Fourier transformed stream signal or the substream signal to which the guard interval is combined to the optical transmission part 105 or the photoelectric conversion part 108. In this example, by adding the guard interval, transmission time lag between subcarriers is absorbed so that tolerance against transmission characteristics deterioration due to wavelength dispersion and polarization mode dispersion can be improved.

<Interface/Stream Transmit-Receive Part/Stream Receiving Part>

Figure 24:
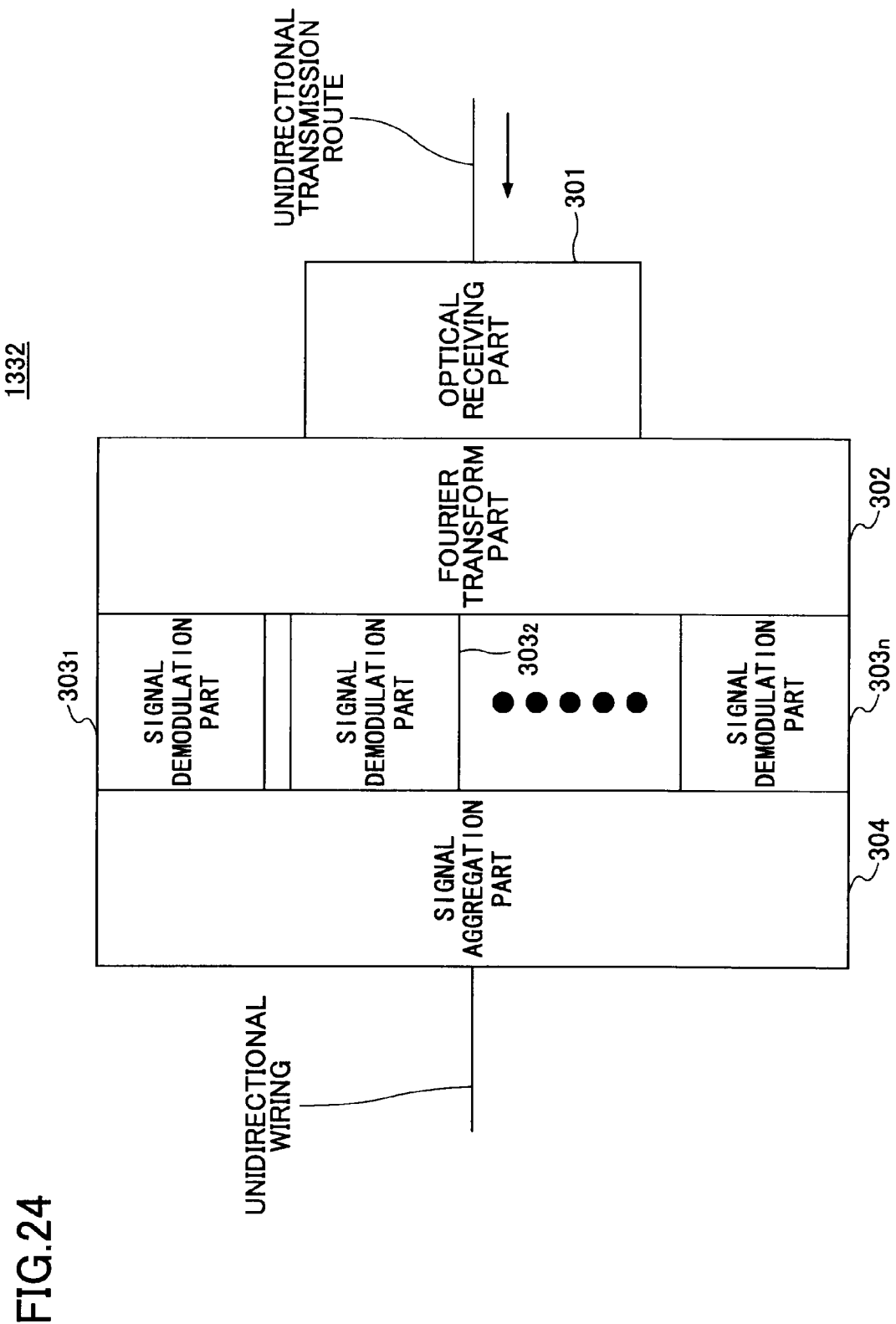
FIG. 24 is an example of a stream receiving part in the first embodiment of the present invention.

FIG. 24 shows an example of the stream receiving part of the first embodiment of the present invention.

In this example, the stream receiving part 1332 includes:

an optical receiving part 301 including a function for receiving one or more subcarriers and transforming the subcarriers to the inverse Fourier transformed stream signal;

a Fourier transform part 302 including a function for collectively transforming the inverse Fourier transformed stream signal output from the optical receiving part 301 from the time domain to the frequency domain so as to divide the signal to one or more substream signals, and a function for distributing the generated substream signals to each substream signal;

one or more signal demodulation parts $303_1, 303_2, \ldots, 303_n$ including a function for demodulating each substream signal output from the Fourier transform part 302; and a signal aggregation part 304 including a function for aggregating the substream signals output from the signal demodulation parts 303 into one stream signal and outputting it to the packet processing part 132. According to the configuration, the stream signal of the optical OFDM scheme can be converted to the electrical stream signal so that the electrical stream signal can be output to the packet processing part 132.

Figure 25:
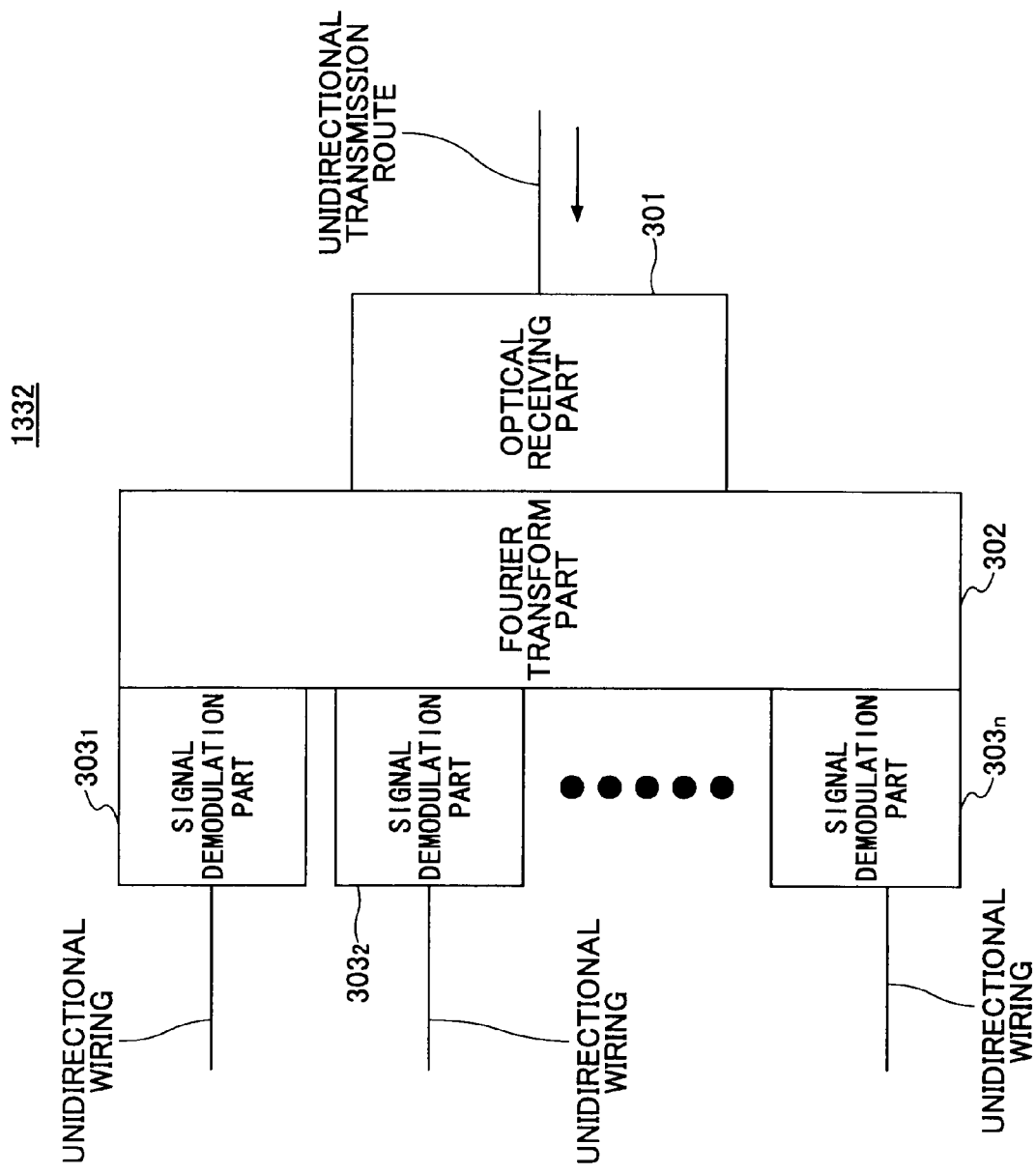
FIG. 25 is an example of a stream receiving part in the first embodiment of the present invention.

FIG. 25 shows another example of the stream receiving part of the first embodiment of the present invention.

The stream receiving part 1332 includes:

an optical receiving part 301 including a function for receiving one or more subcarriers and transforming the subcarriers to the inverse Fourier transformed stream signal;

a Fourier transform part 302 including a function for collectively transforming the inverse Fourier transformed stream signal output from the optical receiving part 301 from the time domain to the frequency domain so as to divide the signal to one or more substream signals, and a function for distributing the generated substream signals to each substream signal; and one or more signal demodulation parts $303_1, 303_2, \ldots, 303_n$ including a function for demodulating each substream signal output from the Fourier transform part 302 to generate stream signals. According to this example, similarly to the before-mentioned example, the stream signal of the optical OFDM scheme can be converted to the electrical stream signal so that the electrical stream signal can be output to the packet processing part 132.

Figure 26:
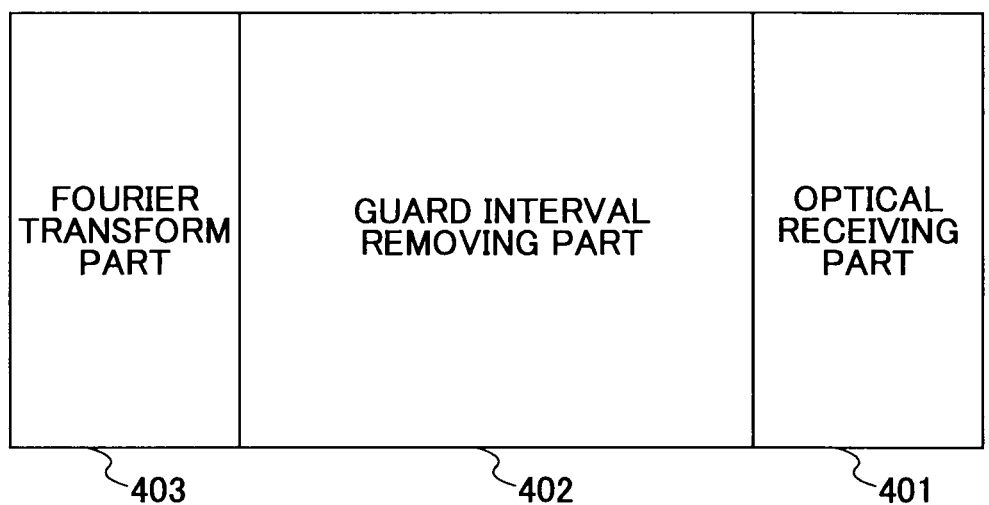
FIG. 26 is an example of a stream receiving part in the first embodiment of the present invention.

FIG. 26 shows another example of the stream receiving part of the first embodiment of the present invention.

The stream receiving part 1332 shown in the figure includes a guard interval removing part 402 that includes:

a function for removing the guard interval from the inverse Fourier transformed signal output from the optical receiving part 401 so as to extract an inverse Fourier transformed stream signal; and a function for transmitting the extracted inverse Fourier transformed stream signal to the Fourier transform part 403. According to this configuration, the stream signal of the optical OFDM scheme having the guard interval can be converted to the electrical stream signal from which the guard interval has been removed so that the electrical stream signal can be output to the packet processing part 132.

Figure 27:
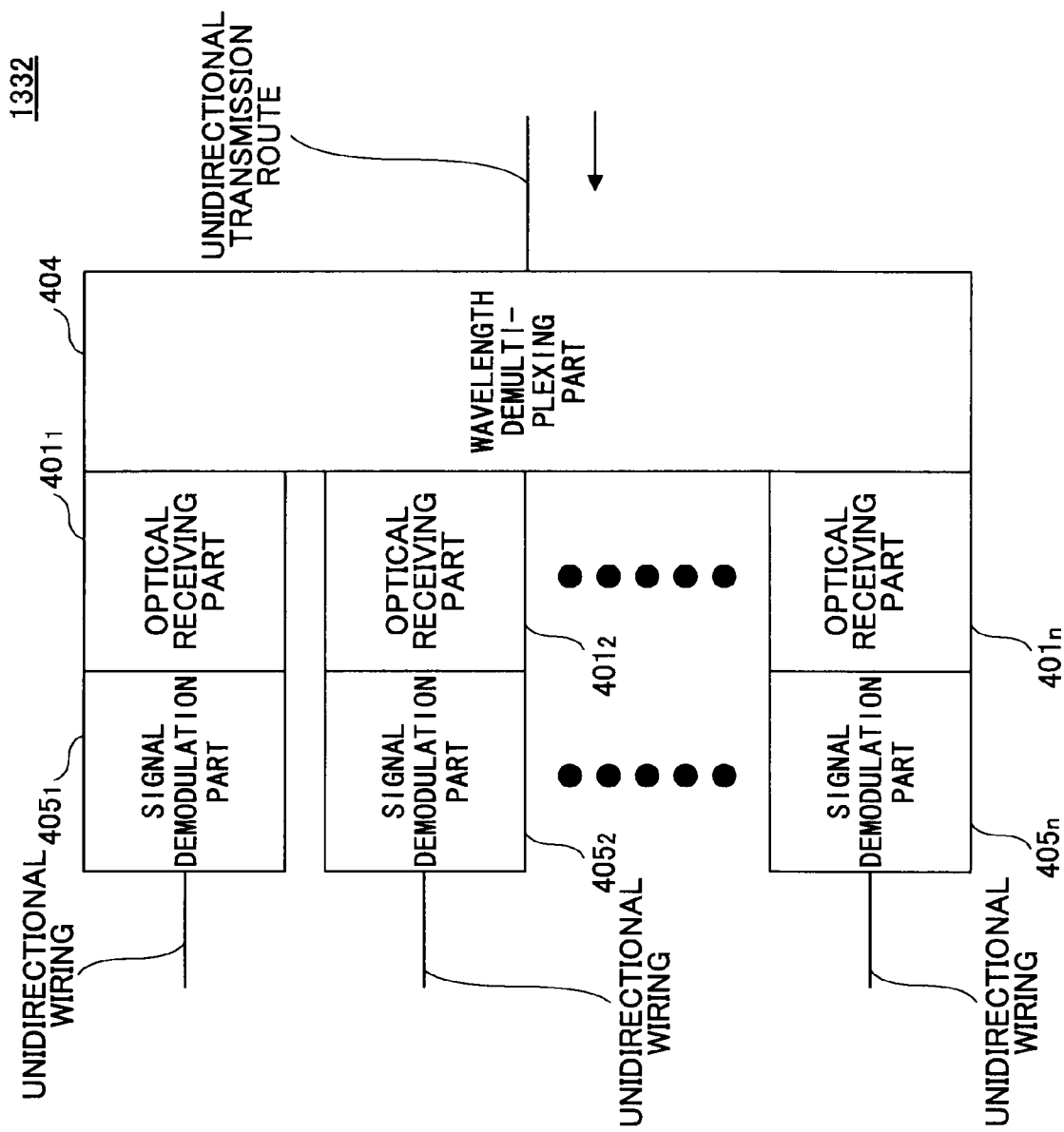
FIG. 27 is an example of a stream receiving part in the first embodiment of the present invention.

FIG. 27 shows another example of the stream receiving part of the first embodiment of the present invention.

The stream receiving part 1332 shown in the figure is an example of a receiving system of the stream signal of the optical OFDM scheme generated by wavelength-multiplexing subcarrier lights in the optical domain. The stream receiving part includes:

an optical demultiplexing part 404 including a function for demultiplexing one or more incoming subcarriers to each subcarrier;

one or more optical receiving parts $401_1, 401_2, \ldots, 401_n$ including a function for receiving respective subcarriers output from the optical demultiplexing part 404 and converting the subcarriers to substream signals; and one or more signal demodulation parts 405 including a function for demodulating substream signals output from the optical receiving parts 401. According to this configuration, the stream signal of the optical OFDM scheme generated by wavelength multiplexing the subcarrier lights in the optical domain shown in FIGS. 19 and 20 can be converted to one or more electrical stream signals so that the electrical stream signals can be output to the packet processing part 132.

Figure 28:
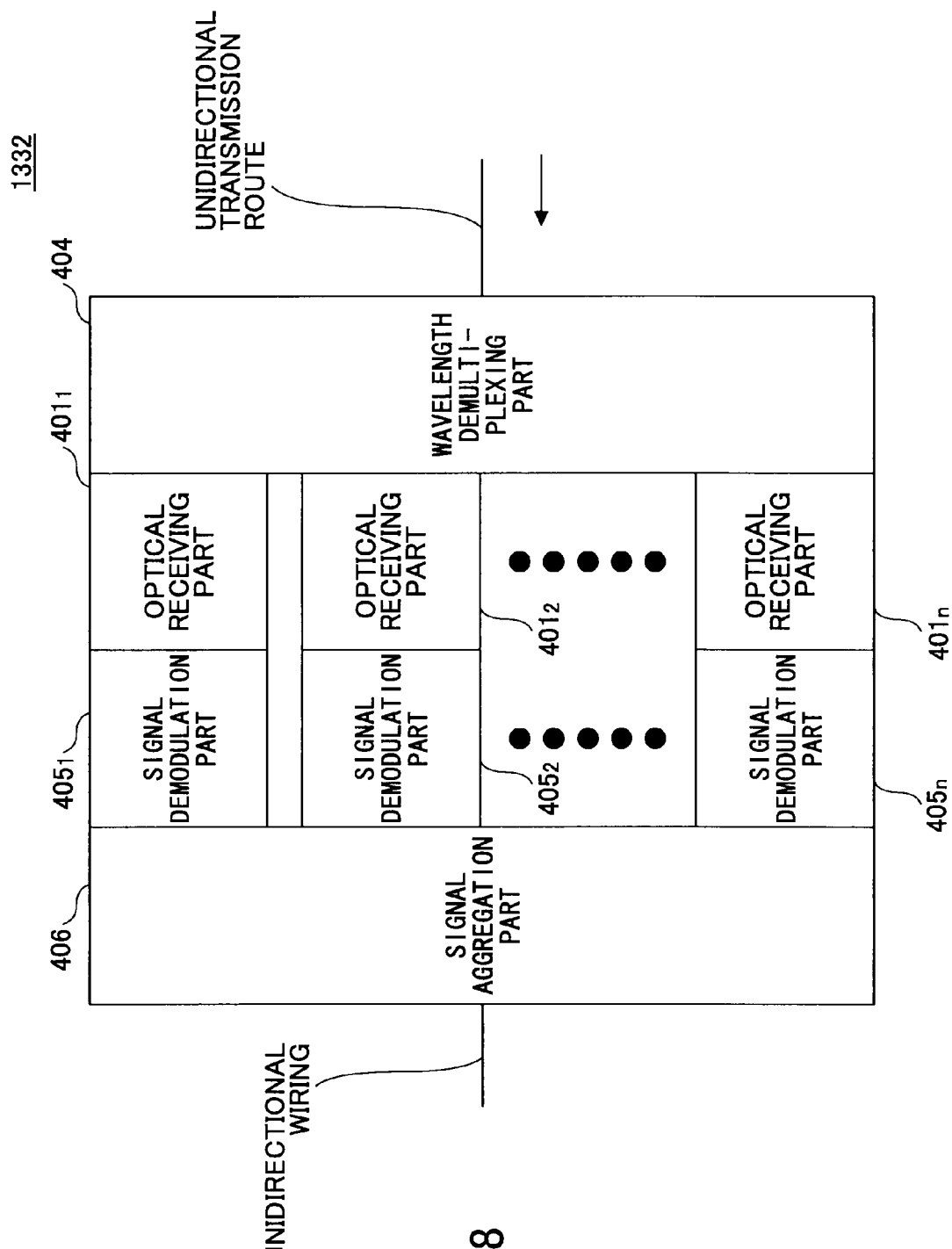
FIG. 28 is an example of a stream receiving part in the first embodiment of the present invention.

FIG. 28 shows another example of the stream receiving part of the first embodiment of the present invention.

The stream receiving part 1332 shown in the figure is an example of a receiving system of the stream signal of the optical OFDM scheme generated by wavelength-multiplexing subcarrier lights in the optical domain. The stream receiving part 1332 includes:

an optical demultiplexing part 404 including a function for demultiplexing one or more incoming subcarriers to each subcarrier;

one or more optical receiving parts $401_1, 401_2, \ldots, 401_n$ including a function for receiving respective subcarriers output from the optical demultiplexing part 404 and converting the subcarriers to substream signals;

one or more signal demodulation parts $405_1, 405_2, \ldots, 405_n$ including a function for demodulating substream signals output from the optical receiving parts 401; and a signal aggregation part 406 including a function for aggregating substream signals output from the signal demodulation parts 405 into one stream signal, and output the signal to the packet processing part 132.

According to this configuration, the stream signal of the optical OFDM scheme generated by wavelength-multiplexing the subcarrier lights in the optical domain shown in FIGS. 19 and 20 can be converted to an electrical stream signal so that the electrical stream signal can be output to the packet processing part 132. More specifically, as the optical receiving part 401, a semiconductor laser that can perform modulation can be used, and also, a combination of a CW light source such as a semiconductor laser and an external optical modulator such as the LiNbO3 optical modulator can be used. As the wavelength demodulation part 404, more specifically, an optical coupler, array waveguide grating, Mach-Zehnder interferometer, or interleave filter, or the like can be used.

For example, when the subcarrier frequency spacing is the same as the bit rate, a combination of the Mach-Zehnder interferometer and the array waveguide grating can be used. By setting the difference between the two optical routes in the Mach-Zehnder interferometer to be a half of time slot (the inverse of the bit rate), an optical OFDM signal of subcarrier frequency spacing fs can be divided into two subcarriers of frequency spacing 2fs. After that, by using an array waveguide grating of the frequency spacing 2fs, the divided subcarriers can be demultiplexed to each subcarrier. As a modulation format of each subcarrier light, intensity modulation of NRZ (Non Return to Zero) and RZ (Return to Zero) and the like, and phase modulation of PSK (Phase Shift Keying) and QPSK (Quadrature Phase Shift Keying) and the like can be used. Further, polarization multiplexing may be used in which orthogonal and polarized two optical OFDM signals are generated and multiplexed. In addition to the optical OFDM scheme, by using the multilevel modulation such as QPSK and the polarization multiplexing, the optical frequency use efficiency can be further improved. In addition, by changing the number of pieces of data to be multiplexed in the multilevel modulation, and changing the number of polarization lights in the polarization multiplexing, optical path capacity can be changed more flexibly.

The configuration of the bandwidth variable communication apparatus is realized as mentioned above.

Second Embodiment

In the present embodiment, an example of a bandwidth variable communication method using the bandwidth variable communication apparatus of the before-mentioned first embodiment is described.

Figure 29:
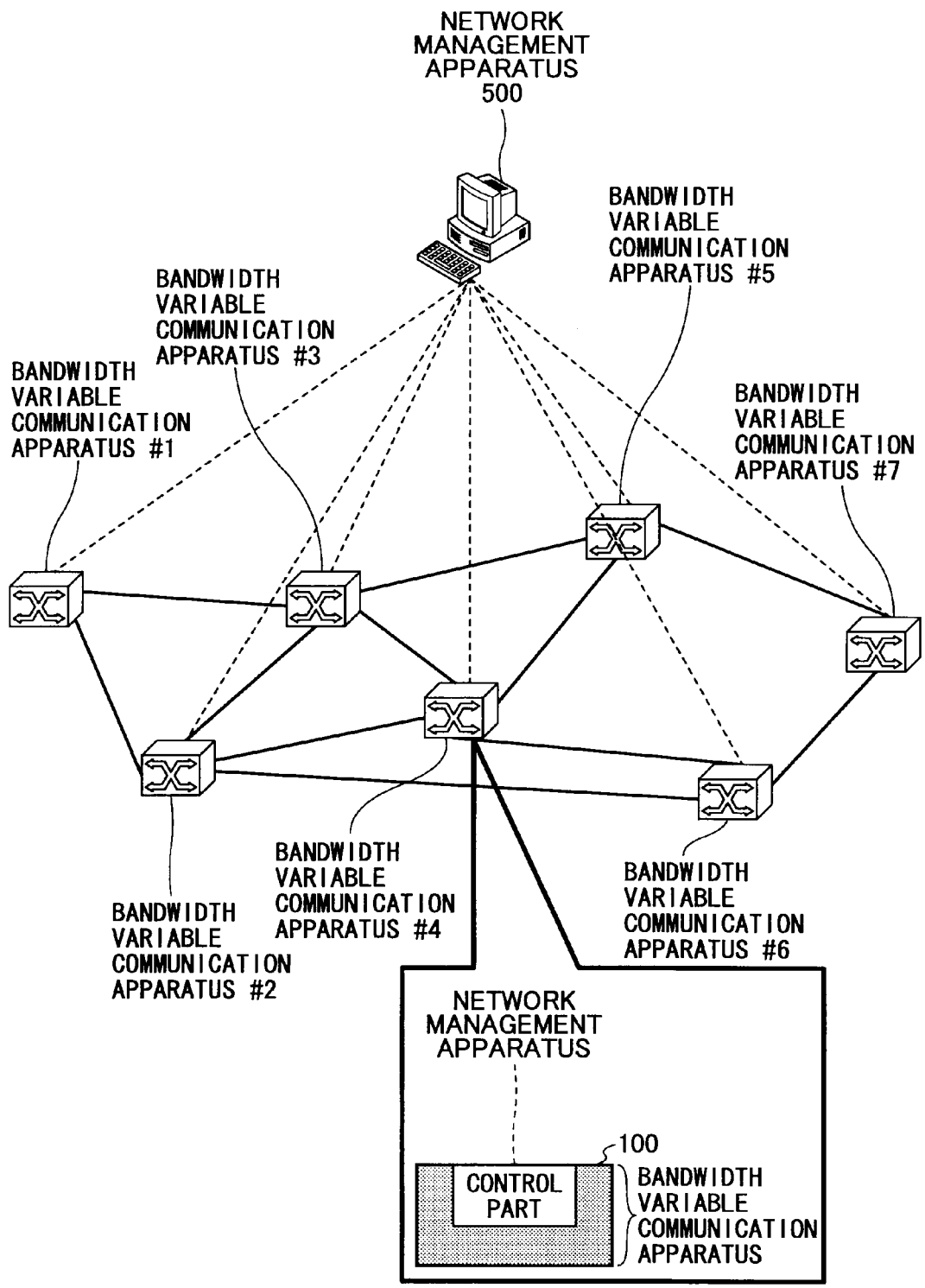
FIG. 29 is a configuration example of a network including the bandwidth variable communication apparatus and a network management apparatus in a second embodiment of the present invention.

FIG. 29 shows a network configuration example including the bandwidth variable communication apparatus and a network management apparatus according to the second embodiment of the present invention. The bandwidth variable communication apparatus 100 shown in the figure is one shown in the before-mentioned first embodiment.

The network management apparatus 500 is shown in document 3 (Shigeo Urushidani, et al., "Latest networking technology supporting SINET3 services", Vol. 107, No. 443 (20080117), pp. 29-34, NS2007-125, 2008), document 4 (Shigeo Urushidani, et al., "Network design and operation for SINET3", ICM2008-1, pp. 1-6, 2008), document 5 (Atsuko Takefusa, et al., "Core location experiment for calculation resources and optical path network resources in grid", SAC-SIS (Symposium on Advanced Computing systems and Infrastructures), 2006, document 6 (Atsuko Takefusa, et al., "Grid core location experiment between Japan and the United States for calculation/network resources by middleware collaboration", ARC164.HPC109, 2007), and document 7 (Kazuhisa Yamada, et al., "Proposal for multilayer path configuration management system collaborating with GMPLS", IEICE-ICM2008-3, 2008).

Figure 30:
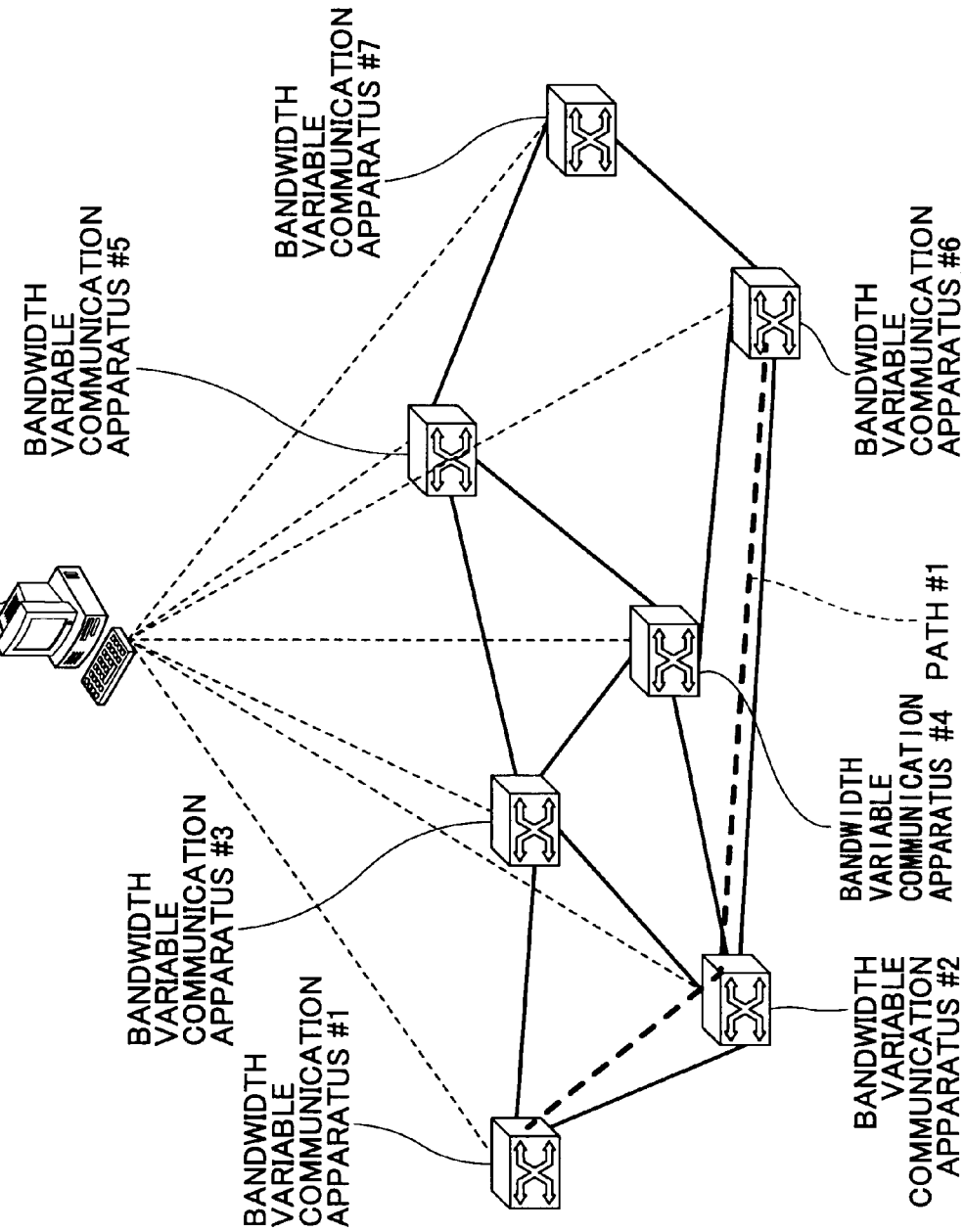
FIG. 30 is an example of a path passing through bandwidth variable communication apparatuses in the second embodiment of the present invention.

FIG. 30 shows an example of a path that passes through bandwidth variable communication apparatuses in the second embodiment of the present invention. In the following, a method for establishing a path #1 by the network management apparatus is described based on FIG. 30. Each of FIGS.

31 and 32 shows a method in which the network management apparatus establishes the path #1 in collaboration with the bandwidth variable communication apparatuses.

The bandwidth variable communication method in the present embodiment includes:

a control message exchange step in which, when the network management apparatus 500 sets up, deletes or changes a path passing through a plurality of bandwidth variable communication apparatuses, the network management apparatus 500 exchanges control information, with the control part 110 of each bandwidth variable communication apparatus on the path route, for controlling the route exchange part 120, the interface 130, or the packet transfer part 134, or all of these; and a hardware control step in which the control part 110 of the bandwidth variable communication apparatuses controls the route exchange part 120, the interface 130, or packet transfer part 134, or all of these based on the control information received in the control message exchange step. In the following, this method is described more specifically.

An operator of the network inputs a setup request of the path #1 in the network management apparatus. Examples of input parameters are interfaces of start point, end point and relay points of the path #1. An application instead of the operator may input the setup request of the path #1 in the network management apparatus. Documents 5 and 6 discloses means in which an application reserves the network bandwidth.

There are two kinds of definitions of the path. First one is a carrier for connecting between interfaces of two adjacent bandwidth variable communication apparatuses. Second one is each of subcarriers which form the carrier. But, in either case, the operation described below is not changed. In the present embodiment, the path is described as subcarriers.

The network management apparatus 500 generates control information based on the input parameters to control the bandwidth variable communication apparatuses.

Figure 31:
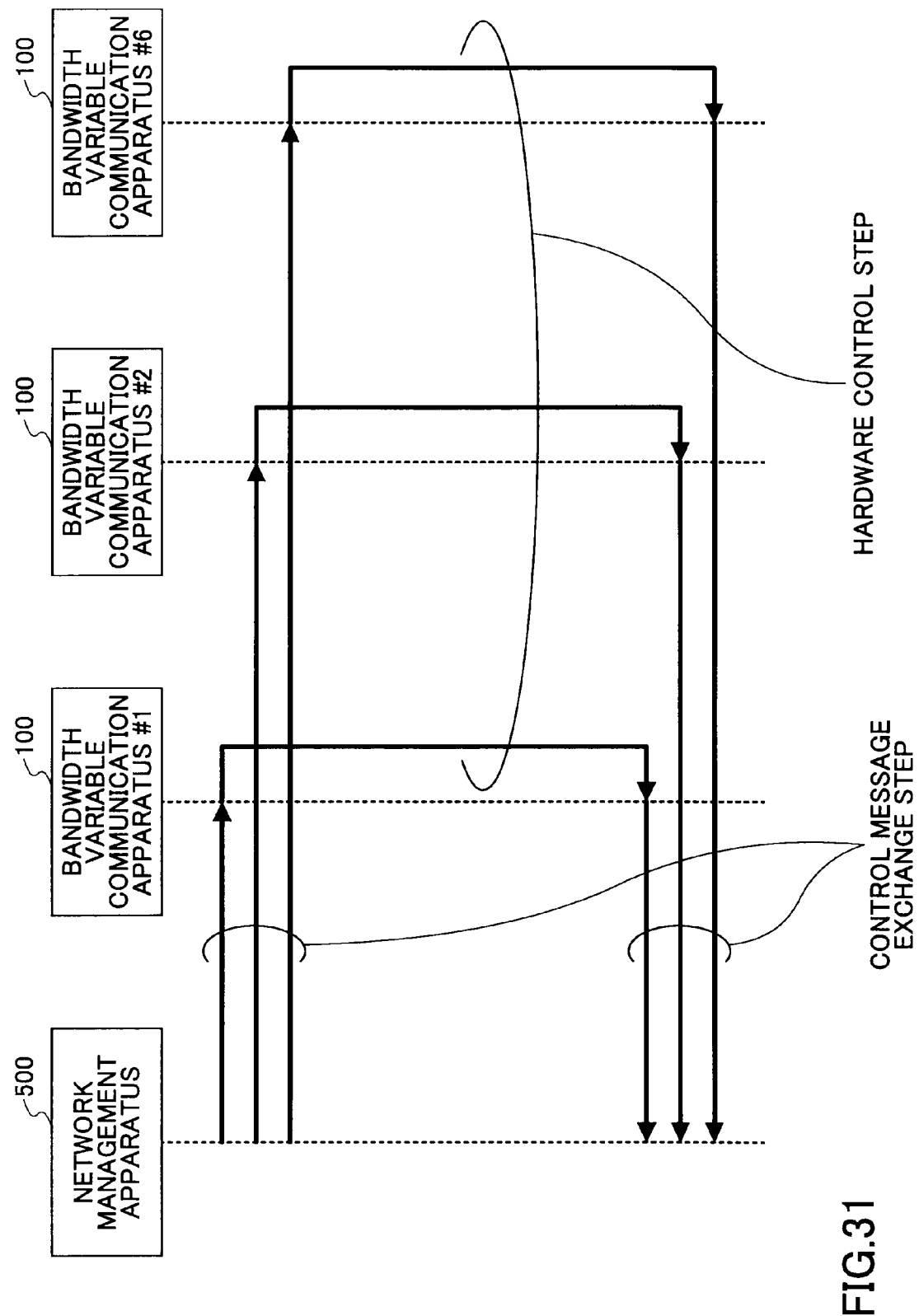
FIG. 31 is an operation sequence example (1) for an example 1 of a bandwidth variable communication method in the second embodiment of the present invention.

A control sequence of the first kind is described. As shown in FIG. 31, the network management apparatus 500 transmits control information to bandwidth variable communication apparatuses in the control message exchange step. Each bandwidth variable communication apparatus 100 returns a control result based on the control information to the network management apparatus. In the present embodiment, the network management apparatus 500 may exchange control information with each of the bandwidth variable communication apparatuses in an order, or may exchange the control information with each of the bandwidth variable communication apparatuses 100 in parallel as shown in FIG. 31.

Figure 32:
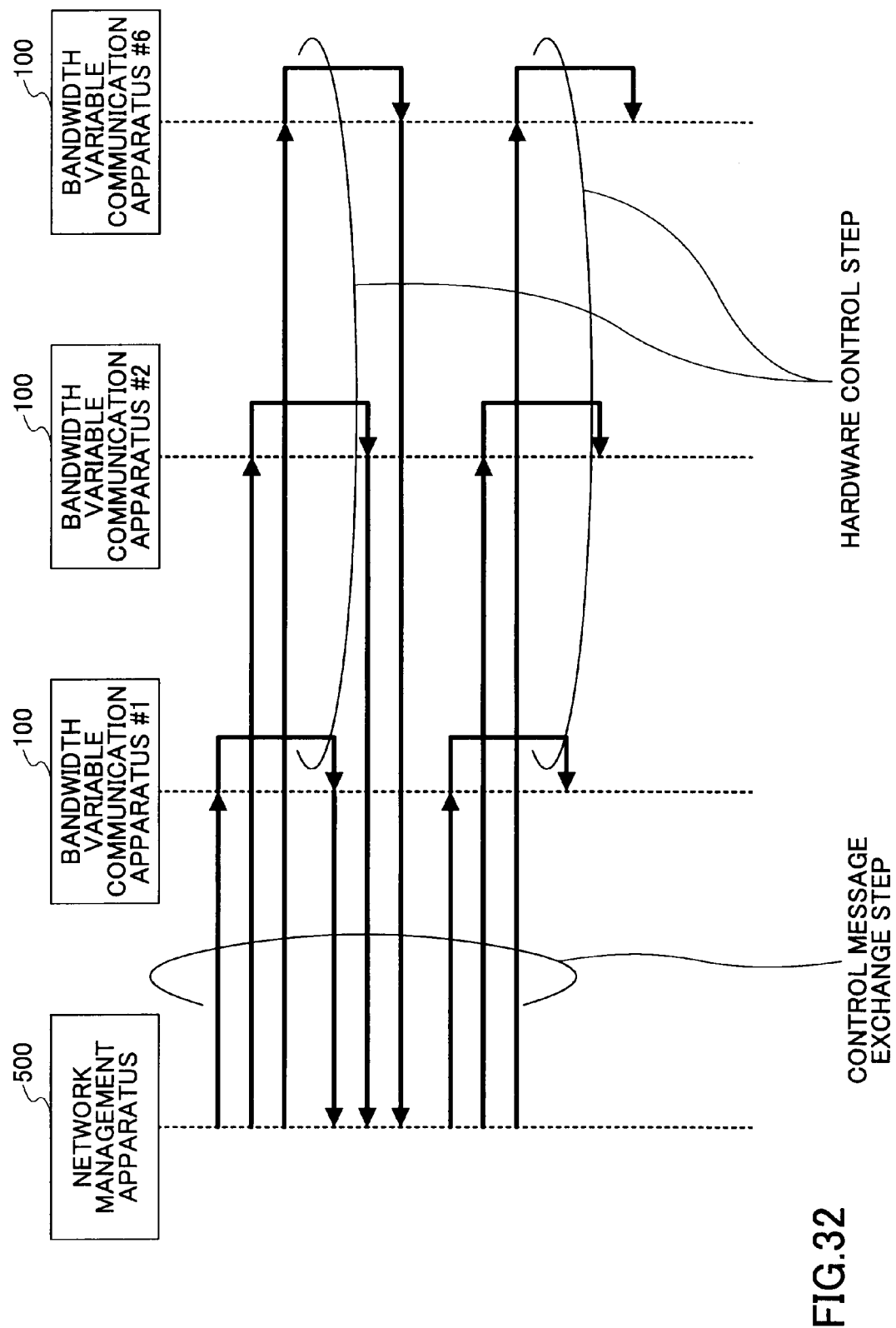
FIG. 32 is an operation sequence example (2) for an example 1 of a bandwidth variable communication method in the second embodiment of the present invention.

On the other hand, a control sequence of the second kind is described. As shown in FIG. 32, the network management apparatus 500 transmits control information to bandwidth variable communication apparatuses 100 in the control message exchange step. Each bandwidth variable communication apparatus 100 checks control availability, and returns the check result to the network management apparatus 500. Next, the network management apparatus 500 determines availability of setup of the path #1 based on the response results of the bandwidth variable communication apparatuses 100. As to the method for determining the setup availability, the network management apparatus 500 may autonomously determine the availability, or the operator who operates the network management apparatus 500 may determine the availability manually. As a result, when the network management apparatus 500 determines that the path can be set up, the network management apparatus 500 transmits a control execution request to each bandwidth variable communication apparatus. Each bandwidth variable communication apparatus 100 that receives the execution request executes control based on the control information, and responds the control result to the network management apparatus 500. In the present embodiment, the network management apparatus 500 may exchange control information with each of the bandwidth variable communication apparatuses 100 in an order, or may exchange the control information with each of the bandwidth variable communication apparatuses in parallel as shown in FIG. 31.

Exchange means for the control message between the network management apparatus 500 and each bandwidth variable communication apparatus 100 is the same as contents shown in documents 3-7 as to setup of the path between apparatuses. However, in the present embodiment, it is important to exchange new control information such as the pass bandwidth of the optical switch in the apparatus and the number of subcarriers of the signal that are not shown in the documents 3-7. Further, it is important to show relationship between passable frequency bandwidth controlled by the route exchange part 120 and occupied bandwidth of the signal in order to improve frequency use efficiency. The control message including the new control information of the present embodiment may be included in a conventional control message so that the message may be exchanged between the network management apparatus 500 and each bandwidth variable communication apparatus 100. Also, the control message including the new control information may be separated from the conventional control message, so that the message may be exchanged between the network management apparatus 500 and each bandwidth variable communication apparatus 100.

In the following, the new control information for controlling the bandwidth variable communication apparatus, and the control method are described according to the present embodiment.

Figure 33:
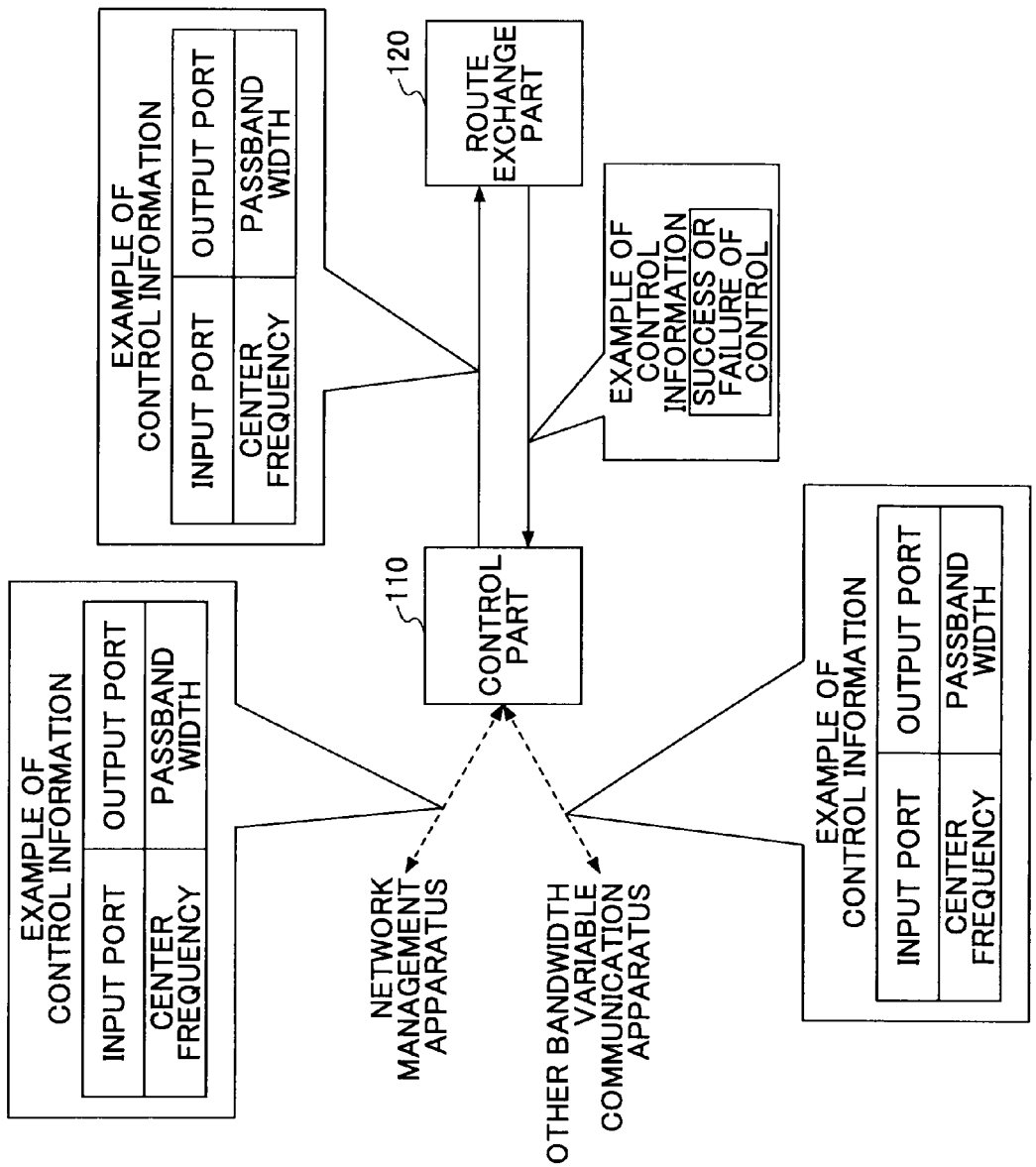
FIG. 33 is an example (1) of control information exchanged between the route exchange part and the control part in the second embodiment of the present invention.
Figure 34:
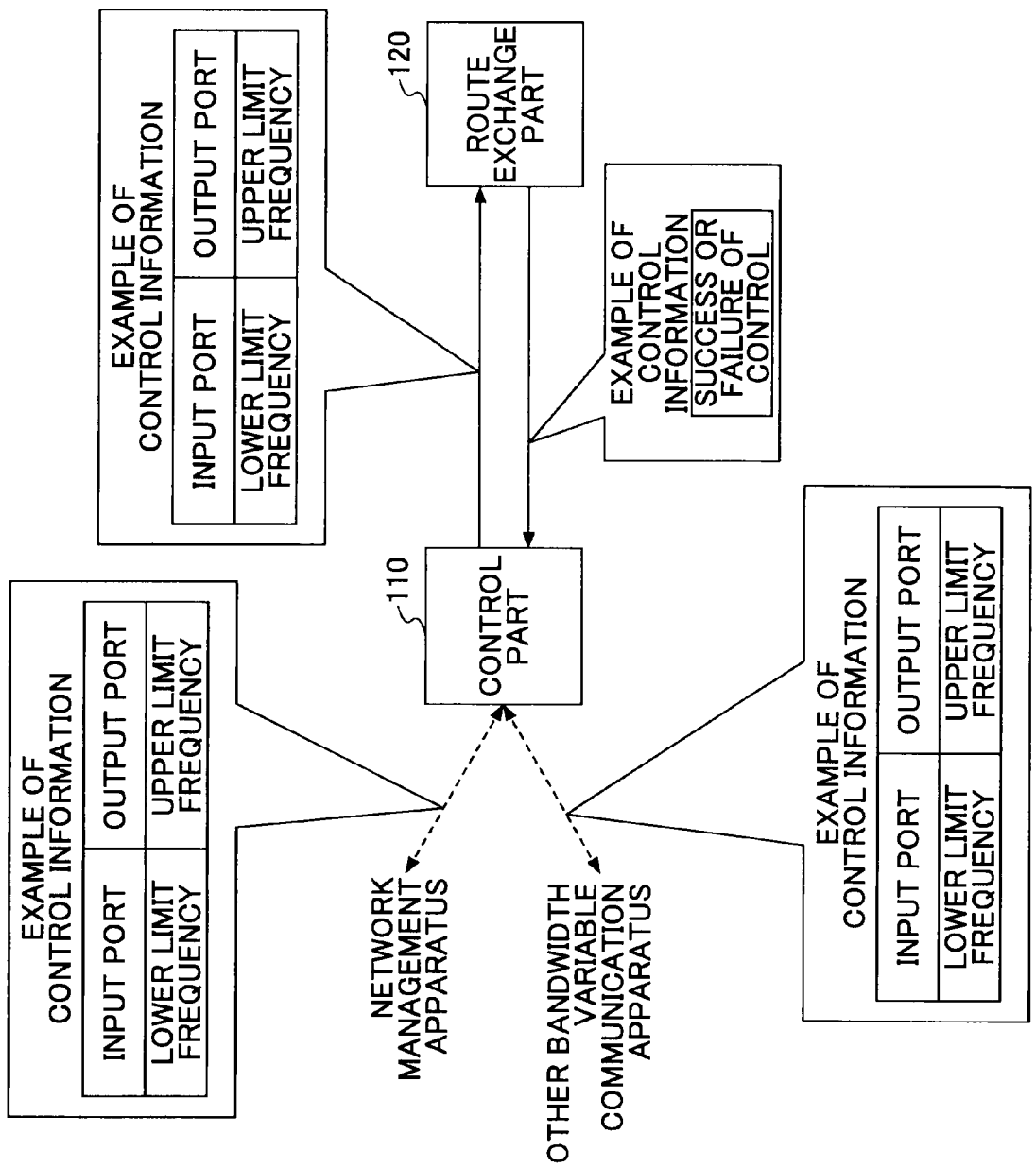
FIG. 34 is an example (2) of control information exchanged between the route exchange part and the control part in the second embodiment of the present invention.

Each of FIGS. 33 and 34 show an example of the control information to be transmitted from the network management apparatus 500 to the route exchange part 120 of the bandwidth variable communication apparatus 100. The control information includes information of an input port and an output port that are necessary information for route switching between the input port and the output port. In addition, in order to control passable frequency bandwidth between the input port and the output port, the control information includes passband width and the center frequency of the passband width shown in FIG. 33, and in the case of FIG. 34, the control information includes information of lower limit frequency and the upper limit frequency of the passband width shown in FIG. 34.

Then, in the hardware control step, the control part 110 executes change of passable frequency bandwidth from the input port to the output port in the route exchange unit 120 based on the control information received via the control message exchange step or the internal control step.

The network management apparatus 500 may control the path in collaboration with the bandwidth variable communication apparatus 100 by using information other than the message shown in FIG. 33 or 34. For example, the passable frequency bandwidth may be specified by an identification number corresponding to a frequency bandwidth on an one-to-one basis. The important point of the present embodiment is that the network management apparatus 500 specifies the passable frequency bandwidth for each bandwidth variable communication apparatus 100, and that each of the bandwidth variable communication apparatuses from the start point to the end point of the specified path controls the interface 130 and the route exchange part 120 so as to transfer, and transmit and receive the signal of the specified frequency bandwidth.

Figure 35:
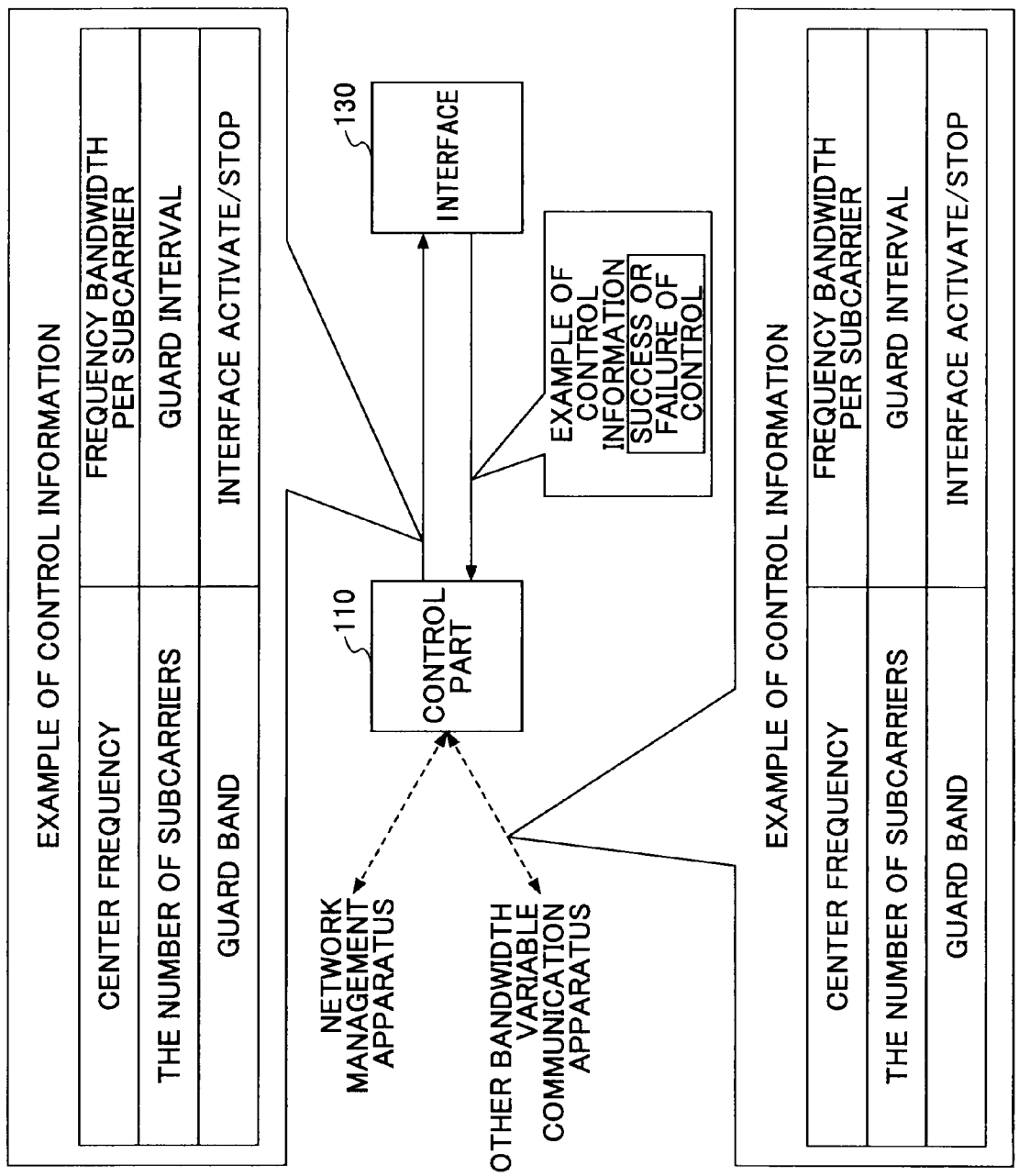
FIG. 35 is an example (1) of control information exchanged between the route exchange part and the control part in the second embodiment of the present invention.
Figure 36:
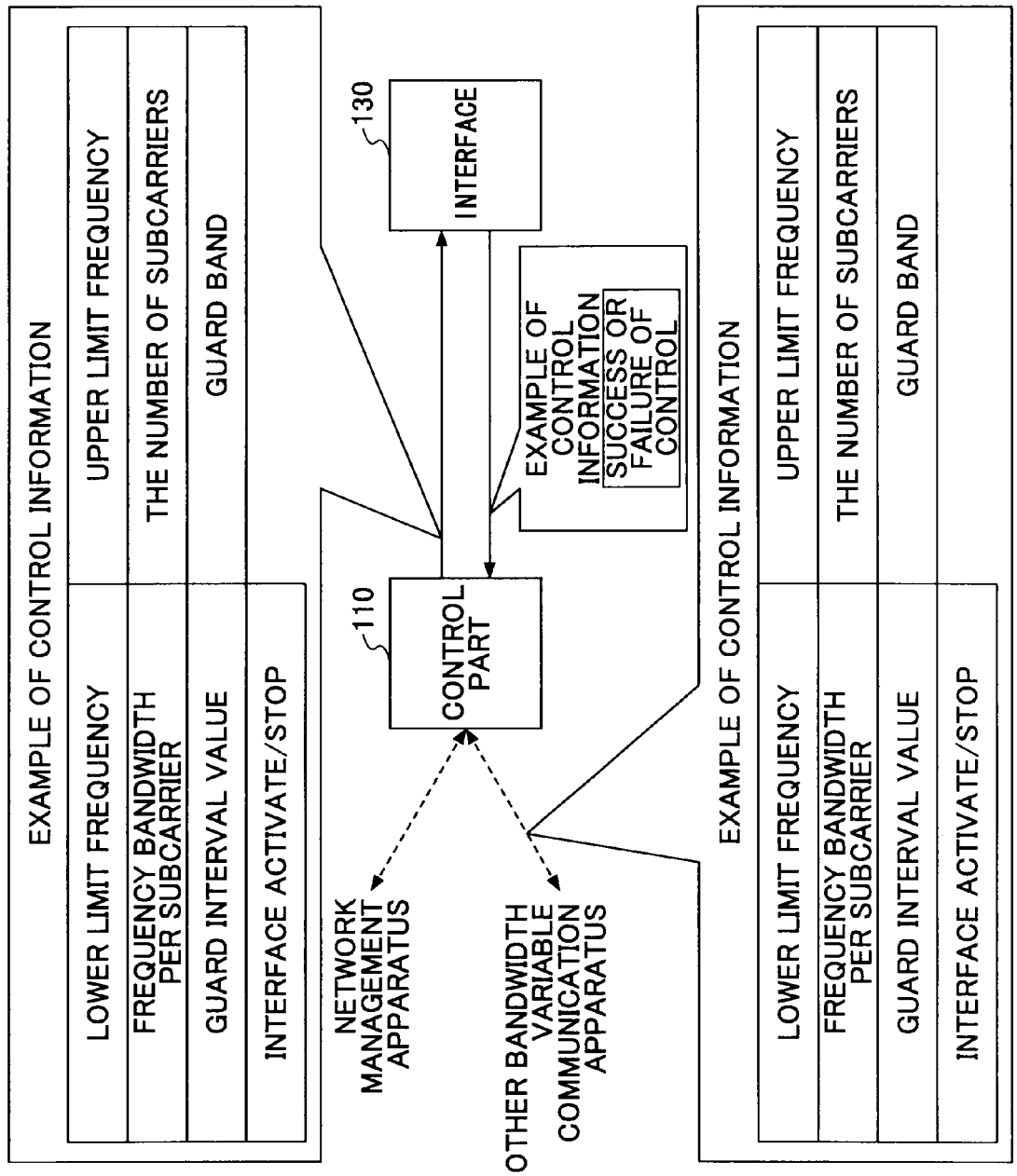
FIG. 36 is an example (2) of control information exchanged between the route exchange part and the control part in the second embodiment of the present invention.

Each of FIGS. 35 and 36 shows an example of the control information transmitted from the network management apparatus 500 to the interface of the bandwidth variable communication apparatus 100. The control information of FIG. 35 includes information or a part of information of frequency bandwidth per subcarrier, center frequency of the whole subcarriers, the number of subcarriers, time length of guard interval, frequency bandwidth of guard interval, activate or stop of the interface. On the other hand, the control information of FIG. 36 includes information or a part of information of frequency bandwidth per subcarrier, upper limit frequency and lower limit frequency of the whole subcarriers, the number of subcarriers, time length of guard interval, frequency bandwidth of guard interval, activate or stop of the interface.

In the hardware control step, the control part 110 executes activate of the interface, stop of the interface, change of frequency bandwidth of output stream signal from the interface, setting of the time length of the guard interval, or setting of optical frequency spacing (guard band) between adjacent paths, or all of these, based on the control information received via the control message exchange step or the internal control step.

The network management apparatus 500 may control the path in collaboration with the bandwidth variable communication apparatus 100 by using information other than the message shown in FIG. 35 or 36.

When the network management apparatus 500 dynamically sets up a path between bandwidth variable communication apparatuses 100, it is necessary to properly set the value of the guard interval. The guard interval exists for compensating for dispersion vale between subcarrier groups that form the path at the receiving end of the path (document 8: Masahiro Morikura, et al., "Trends of IEEE 802.11 compliant wireless LAN", IEICE B, Vol. J84-B No. 11, pp. 1918-1927, 2001; document 9: Landau, O, et al., "OFDM Guard Interval: Analysis and Observations", ICASSP 2007, Vol. 3, pp. III-93-III-96, 2007).

The document 8 and the document 9 introduce the function of the guard interval, and the document 9 introduces a designing method of the guard interval. The time length of the guard interval depends on the dispersion value, and the dispersion value depends on the distance of the path. Therefore, when the network management apparatus 500 dynamically switches the path, it is necessary to change the value of the guard interval as the path length changes. If the time length of the guard interval lacks for the dispersion value, the bandwidth variable communication apparatus at the path end cannot decode received subcarriers correctly. Therefore, it is necessary that the network management apparatus 500 sets the guard interval correctly when setting up the path.

However, the guard interval is not necessarily changed dynamically. In this case, by using sufficiently long guard interval, it becomes possible to keep the guard interval constant irrespective of the change of the path length. But, as to the method for keeping the guard interval to be constant, data occupation ratio to frequency decreases compared to the method for dynamically control the guard interval.

Next, when the network management apparatus 500 dynamically sets up a path between bandwidth variable communication apparatuses 100, it is necessary to properly set the value of the guard band. The guard band is a frequency bandwidth for spacing between subcarriers forming a path and subcarriers forming another path such that they are not overlapping on a frequency axis when they are transmitted (document 9 and document 10: Kenichirou Tanaka, et al., "Optical fiber transmission characteristics of WDM/OFDM hybrid scheme", IEICE B, Vol. J89-B, No. 8, pp. 1431-1440).

Therefore, the network management apparatus 500 needs to set the guard band correctly when setting up a path. The control target for the guard band is the frequency bandwidth of the guard band, and more particularly, that is the lower limit and the upper limit of the frequency bandwidth.

For example, control of the route exchange part 120 and the interface 130 is performed such that the following relationship is satisfied among traffic capacity, bit rate of stream signal, the number of subcarrier lights and the optical frequency spacing, guard band, and passband width of the route exchange part 120.

After a flow amount measurement part measures the traffic capacity Bt(bit/s) actually used by the client, k that satisfies $(k-1) \cdot Bs \leq Bt + k \cdot \Delta B \geq k \cdot Bs$ (k is a natural number) (1) is obtained by using a predetermined basic bit rate Bs(bit/s) per substream signal, so that the bit rate of the stream signal to be transmitted is set to be $k \cdot Bs$. In the formula, $\Delta B$ indicates increased bit rate due to codes added to the frame of the substream signal for the purpose of error correction and monitoring control and the like. By satisfying the condition of the formula (1), it becomes possible to set the smallest number of subcarriers and to set a bit rate of the stream signal of the smallest capacity that are necessary for transferring traffic capacity actually used by the client.

Figure 37:
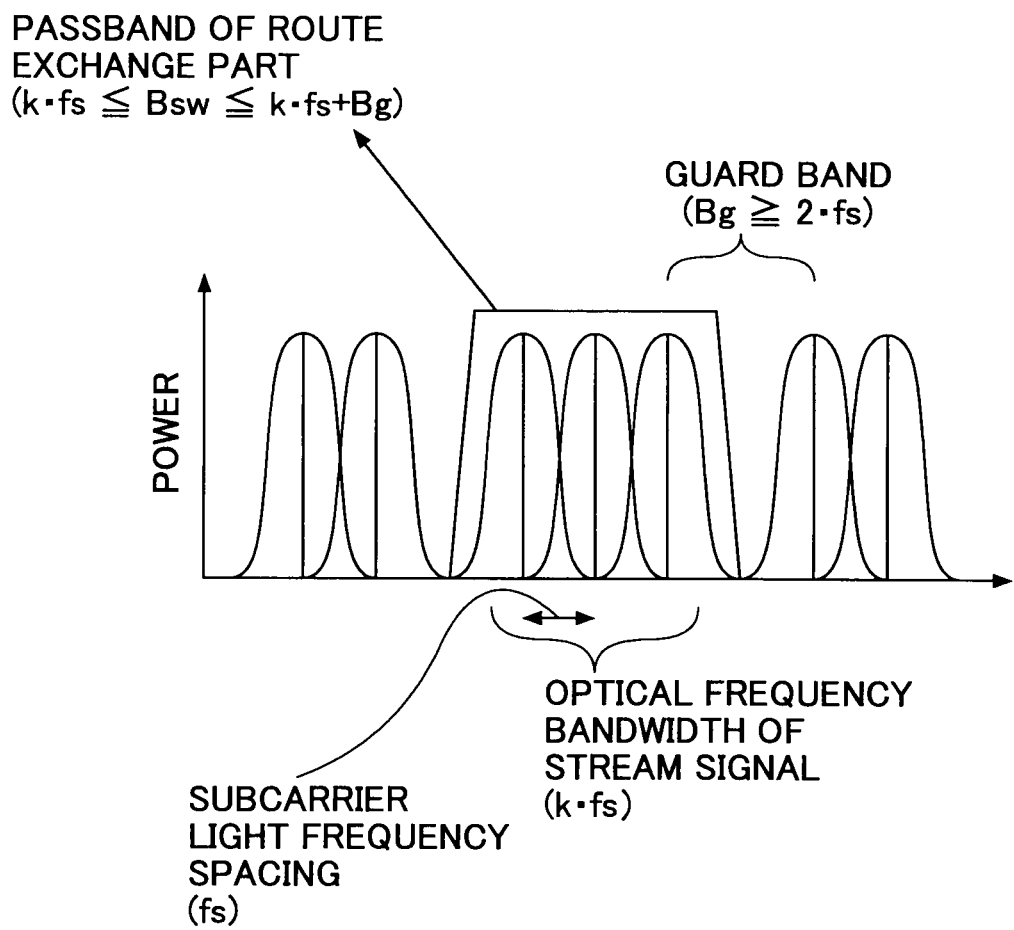
FIG. 37 is a diagram showing relationship among the optical frequency bandwidth of the stream signal, the guard band, and passband of the route exchange part in the second embodiment of the present invention.

Next, a transfer route between the transmission end and the receiving end of the stream signal is obtained such that the transfer route can use an optical frequency region $(k \cdot fs + 2 \cdot Bg)$ including k subcarrier lights (subcarrier light frequency spacing fs) for the stream signal and including two guard bands Bg (FIG. 37). The guard band Bg is set such that the interval between adjacent subcarrier lights of the optical path of the stream signal and another optical path becomes equal to or greater than twice as large as fs ($Bg \geq 2 \cdot fs$). The stream signal transmission part generates the stream signal using k subcarrier lights in a region obtained by removing a guard band Bg from the usable optical frequency region. The route exchange part 120 sets the passband width of the stream signal so as to include the k subcarrier lights and such that the passband width Bsw satisfies $k \cdot fs \leq Bsw \leq k \cdot fs + Bg$ (2).

As mentioned above, according to the present embodiment, an optical path set to be the actual traffic capacity of the client is generated at the transmission end, and the passband width of all of the bandwidth variable communication apparatuses on the route of the optical path is set according to the bandwidth of the optical path, and the guard band is set between the optical path and the adjacent optical path, so that it becomes possible to set up an optical path having very high use efficiency of optical frequencies in a network including the bandwidth variable communication apparatuses.

In addition, as described in the first embodiment, the guard interval can be added for improving tolerance against transmission deterioration due to dispersion of the transmission route (FIG. 21, FIG. 22, FIG. 23). It is necessary to set the overhead time Tgi(sec) for the guard interval to be longer than the difference $\Delta T$(sec) of propagation time between substream signals in the optical path route to be set up. First, zero dispersion wavelength $\lambda 0$, wavelength dispersion slope $\alpha$(ps/nm$^2$/km), and the length L(km) are measured beforehand for every optical fiber that becomes the transmission route of the network. Next, based on the setting conditions of the optical path obtained in the above-mentioned way, transmission time difference ΔT(sec) between substream signals in the optical path route to be used for transfer is calculated by the following equation.

$$\Delta T = 0.5\alpha \cdot L\{(\lambda 1 + k \cdot fs) - \lambda 0\}^2 - 0.5\alpha \cdot L(\lambda 1 - \lambda 0)^2 \quad (3)$$

In the equation, $\lambda 1$ is the shortest wavelength of the subcarrier. By setting the overhead time Tgi for guard interval to be longer than ΔT, effect of wavelength dispersion can be absorbed.

In the above-mentioned example, although the guard interval is set in accordance with the wavelength dispersion characteristics of the optical path route to be set in the network, the guard interval may be set to be a time longer than the difference ΔT between propagation times between substream signals in the longest optical path route as mentioned above. In this case, although the guard interval always becomes the longest, it is not necessary to change the guard interval even when the transmission route characteristics change after switching of a path to a detour route due to failure of the network, so that there is an advantage in that the failure can be quickly addressed.

According to the above-mentioned present invention, the network management apparatus controls the desired bandwidth variable communication apparatuses so as to be able to open a path that passes through the bandwidth variable communication apparatuses and has a desired frequency bandwidth.

Third Embodiment

Next, a bandwidth variable communication apparatus and a bandwidth variable communication method according to a third embodiment are described. The third embodiment is based on the first embodiment and the second embodiment. First an outline of the present embodiment is described.

In an example (shown in FIG. 40) of the bandwidth variable communication apparatus 100 in the present embodiment, the interface includes a clock adjustment part 135 configured to control clocks provided to the packet processing part 132 and the stream transmit-receive part 133, the packet processing part 132 includes a function for changing a transmit-receive speed of the stream signal being exchanged with the stream transmit-receive part 133 based on the clock provided from the clock adjustment part 135, and the stream transmit-receive part 133 includes a function for changing a transmit-receive speed of the stream signal being exchanged with the packet processing part 132 based on the clock provided from the clock adjustment part 135.

Also, the bandwidth variable communication apparatus 100 in the present embodiment includes:

a flow amount measurement part 170 configured to measure flow amount of packets input into the packet transmit-receive part 131 or the packet processing part 132 of the interface 130;

a change determination part 160 configured to determine necessity for controlling all or a part of the route exchange part 120, the interface 130 and the packet transfer part 140 by using the packet flow amount and an increase/decrease rule; and a change induction part 150 configured to exchange the control information with the control part 110 based on the determination result of the change determination part 160.

In addition, a bandwidth variable communication method (FIG. 39) in the present embodiment includes a traffic monitoring step in which the flow amount measurement part 170 of the bandwidth variable communication apparatus terminating each of existing paths on the network monitors input traffic, output traffic or both of these on the existing path in collaboration with the interface;

an increase/decrease determination step in which the change determination part 160 of the bandwidth variable communication apparatus determines to increase or decrease a path (parallel path) parallel to the existing path based on the monitoring result in the traffic monitoring step;

an increase/decrease reporting step in which the change induction part 150 of the bandwidth variable communication apparatus transmits control information, to the network management apparatus, including an increase request or a delete request of the parallel path based on the increase/decrease determination result of the increase/decrease determination step;

a control message exchange step in which the network management apparatus exchanges control information for controlling the route exchange part 120, the interface 130, or the packet transfer part 140 or all of these, with the control part 110 of each bandwidth variable communication apparatus on the route of the parallel path based on the increase request or the delete request in the increase/decrease reporting step; and a hardware control step in which the control part 110 of the bandwidth variable communication apparatuses controls the route exchange part 120, the interface 130, or the packet transfer part 140 or all of these based on the control information received in the control message exchange step.

Figure 38:
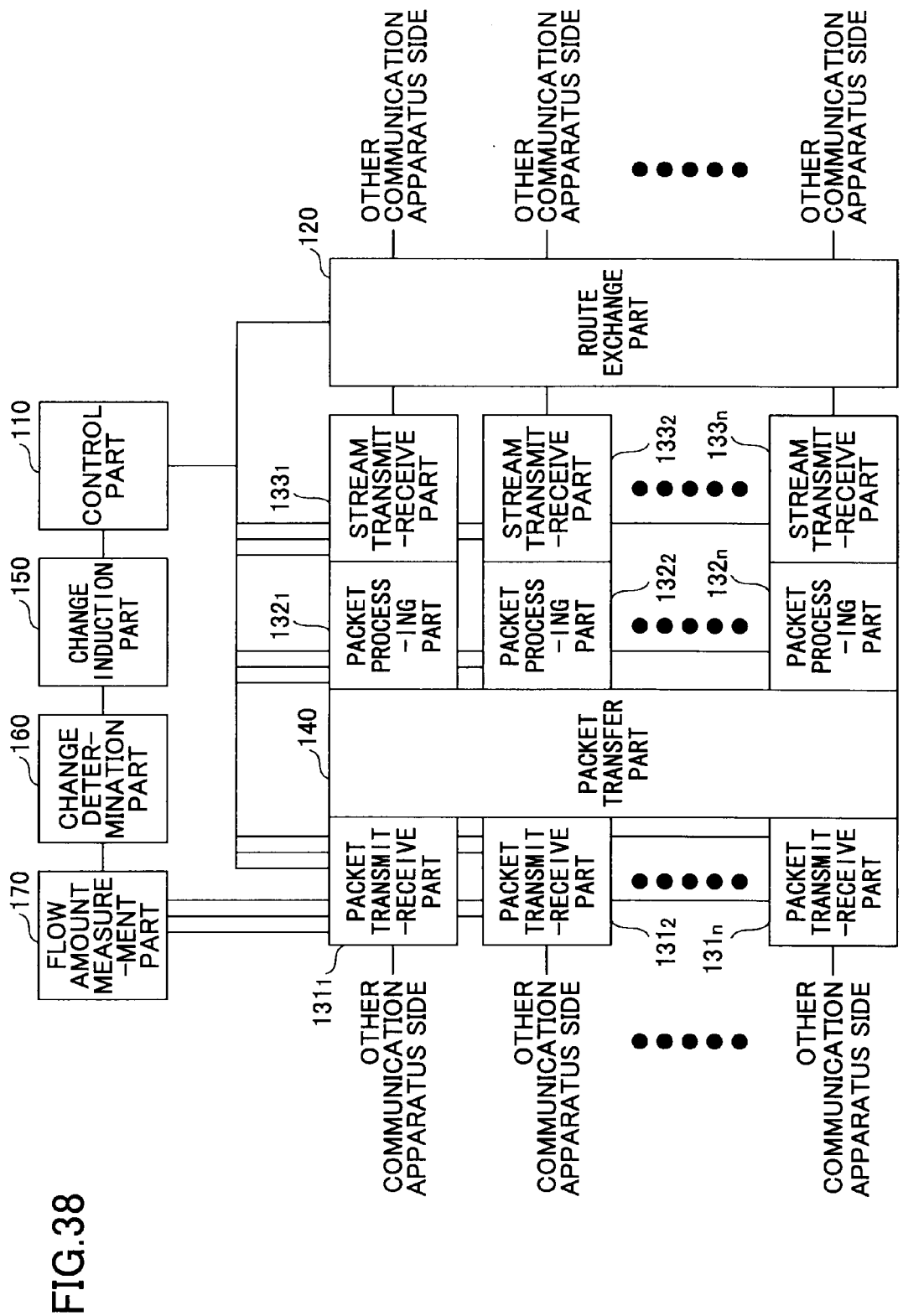
FIG. 38 is an example of a configuration of a bandwidth variable communication apparatus in a third embodiment of the present invention.

Next, the present embodiment is described in more detail. The configuration of the bandwidth variable communication apparatus 100 of the present embodiment follows the first embodiment. However, as shown in FIG. 38, the bandwidth variable communication apparatus 100 of the present embodiment includes a flow amount measurement part 170, a change determination part 160, and a change induction part 150. The flow amount measurement part 170, the change determination part 160, and the change induction part 150 may be implemented inside the control part 110, or may be implemented in each of the interfaces 130.

Figure 39:
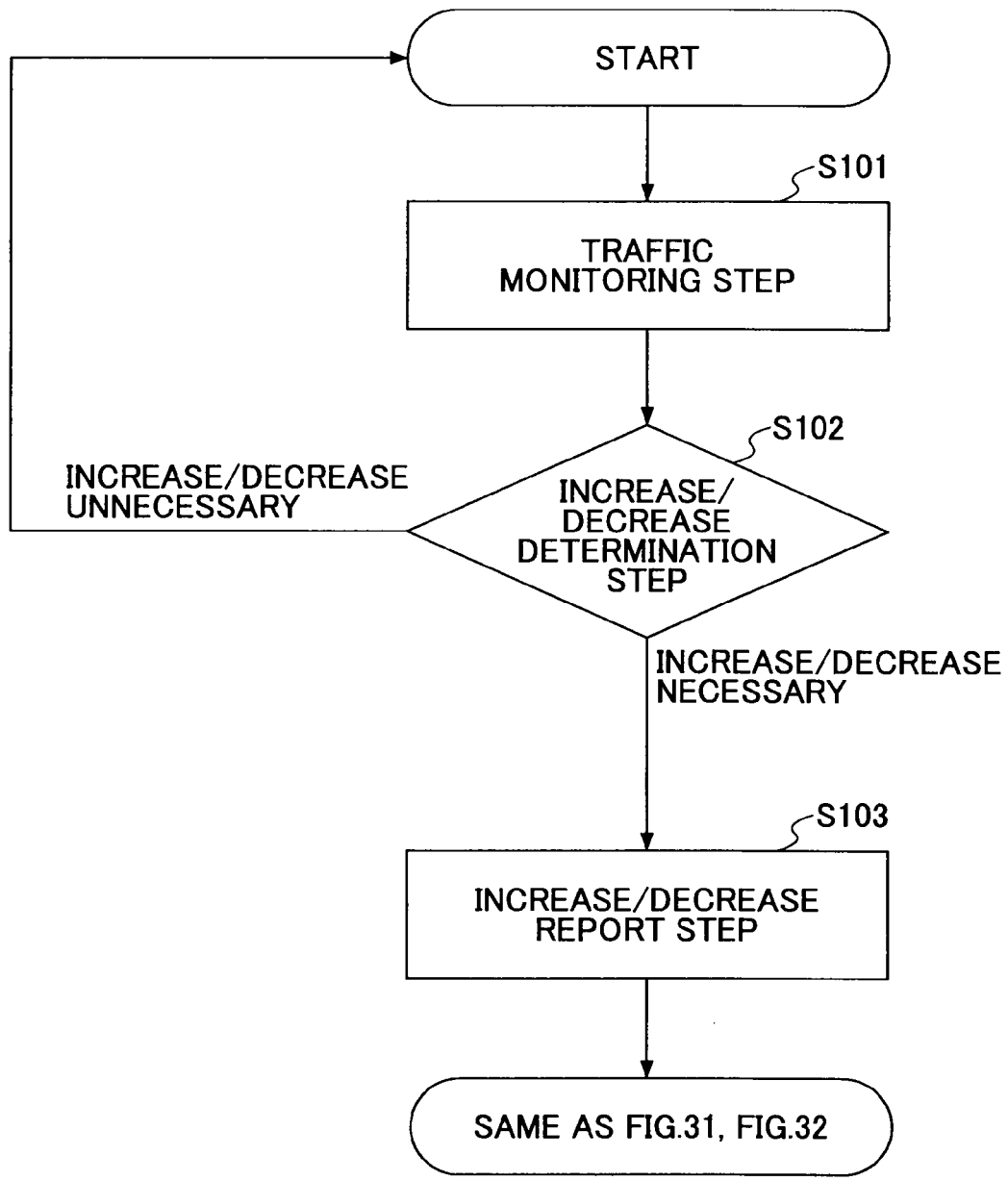
FIG. 39 is an example of a bandwidth variable communication method in the third embodiment of the present invention.

The before-mentioned non-patent document 2, patent document 1, and patent document 2 describe methods for measuring the amount of traffic input and output at the interface 130 by the flow amount measurement part 170. Further, the documents disclose the operation of the change determination part 160 for performing change determination based on the result of the flow amount measurement part 170. Similarly, the patent document 3 introduces the operation of the change determination part 160. In addition to those, the patent document 1 describes means for the change induction part 150 to report to the network management apparatus 500 based on the determination result of the change determination part 160. FIG. 39 shows an example of operation of the flow amount measurement part 170, the change determination part 160, and the change induction part 150, which are described in the non-patent document 2, the patent document 1 and the patent document 2.

The characteristic feature of the present embodiment is that the network management apparatus 500 specifies the passable frequency bandwidth for each bandwidth variable communication apparatus 100, and that each of the bandwidth variable communication apparatuses from the start point to the end point of the specified path controls the interface 130 and the route exchange part 120 so as to transfer, and transmit and receive the signal of the specified frequency bandwidth.

In the following, proposed parts of the present embodiment are described. These are the same as the proposals in the second embodiment.

Each of FIGS. 33 and 34 show an example of the control information to be transmitted from the network management apparatus 500 to the route exchange part 120 of the bandwidth variable communication apparatus 100. The control information includes information of an input port and an output port that are necessary information for route switching between the input port and the output port. In addition, in order to control passable frequency bandwidth between the input port and the output port, the control information includes passband width and the center frequency of the passband width shown in FIG. 33, and in the case of FIG. 34, the control information includes information of lower limit frequency and the upper limit frequency of the passband width shown in FIG. 34.

The network management apparatus 500 may control the path in collaboration with the bandwidth variable communication apparatus 100 by using information other than the message shown in FIG. 33 or 34. For example, the passable frequency bandwidth may be specified by an identification number corresponding to a frequency bandwidth on an one-to-one basis.

Each of FIGS. 35 and 36 shows an example of the control information transmitted from the network management apparatus 500 to the interface of the bandwidth variable communication apparatus 100. The control information of FIG. 35 includes information or a part of information of frequency bandwidth per subcarrier, center frequency of the whole subcarriers, the number of subcarriers, time length of guard interval, frequency bandwidth of guard interval, activate or stop of the interface. On the other hand, the control information of FIG. 36 includes information or a part of information of frequency bandwidth per subcarrier, upper limit frequency and lower limit frequency of the whole subcarriers, the number of subcarriers, time length of guard interval, frequency bandwidth of guard interval, activate or stop of the interface.

The network management apparatus 500 may control the path in collaboration with the bandwidth variable communication apparatus 100 by using information other than the message shown in FIG. 35 or 36.

The process flow of the control message between the network management apparatus 500 and the bandwidth variable communication apparatus 100 of the present embodiment can be the same as the process flow of the control message of claim 6 and FIG. 6 of the patent document 1. But, the process flow may be different from that.

Figure 40:
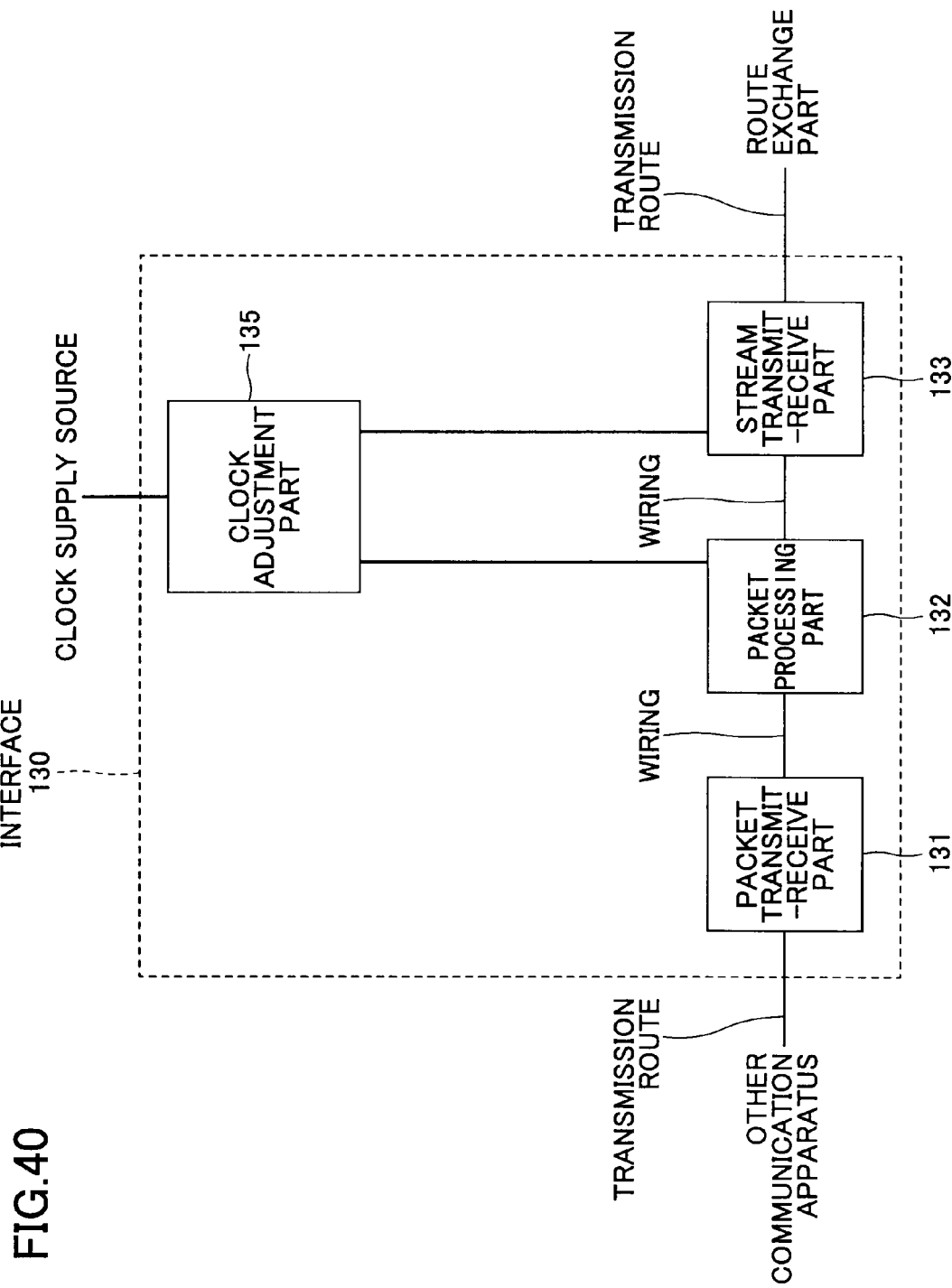
FIG. 40 is an example of a configuration of an interface in the third embodiment of the present invention.

In the present embodiment, the configuration of the interface shown in FIG. 40 can be applied. In embodiments described so far, nodes are connected using parallel paths in order that the bandwidth between the bandwidth variable communication apparatuses 100 may be variable. Then, the opposed bandwidth variable communication apparatuses increase/decrease the number of paths so as to adjust the bandwidth between the nodes. That is, it is necessary to adjust the number of stream transmit-receive parts 133 used for increasing/decreasing the number of paths between nodes, and to change the distribution policy and the aggregation policy of the path processing part according to the adjustment (non-patent document 2, patent document 1, patent document 2).

Further, for the above-mentioned reason, a plurality of packet processing parts are necessary. The reason is that the bit rate of the stream signal to be output in the conventional packet processing part is fixed, and that the bit rate does not follow effective amount of packets transmitted from the packet transmit-receive part to the packet processing part. But, by applying the configuration shown in FIG. 40, it becomes possible to increase/decrease the number of paths and frequency bandwidth between nodes by using only one packet processing part 132 without changing the distribution policy and the aggregation policy.

Figure 41:
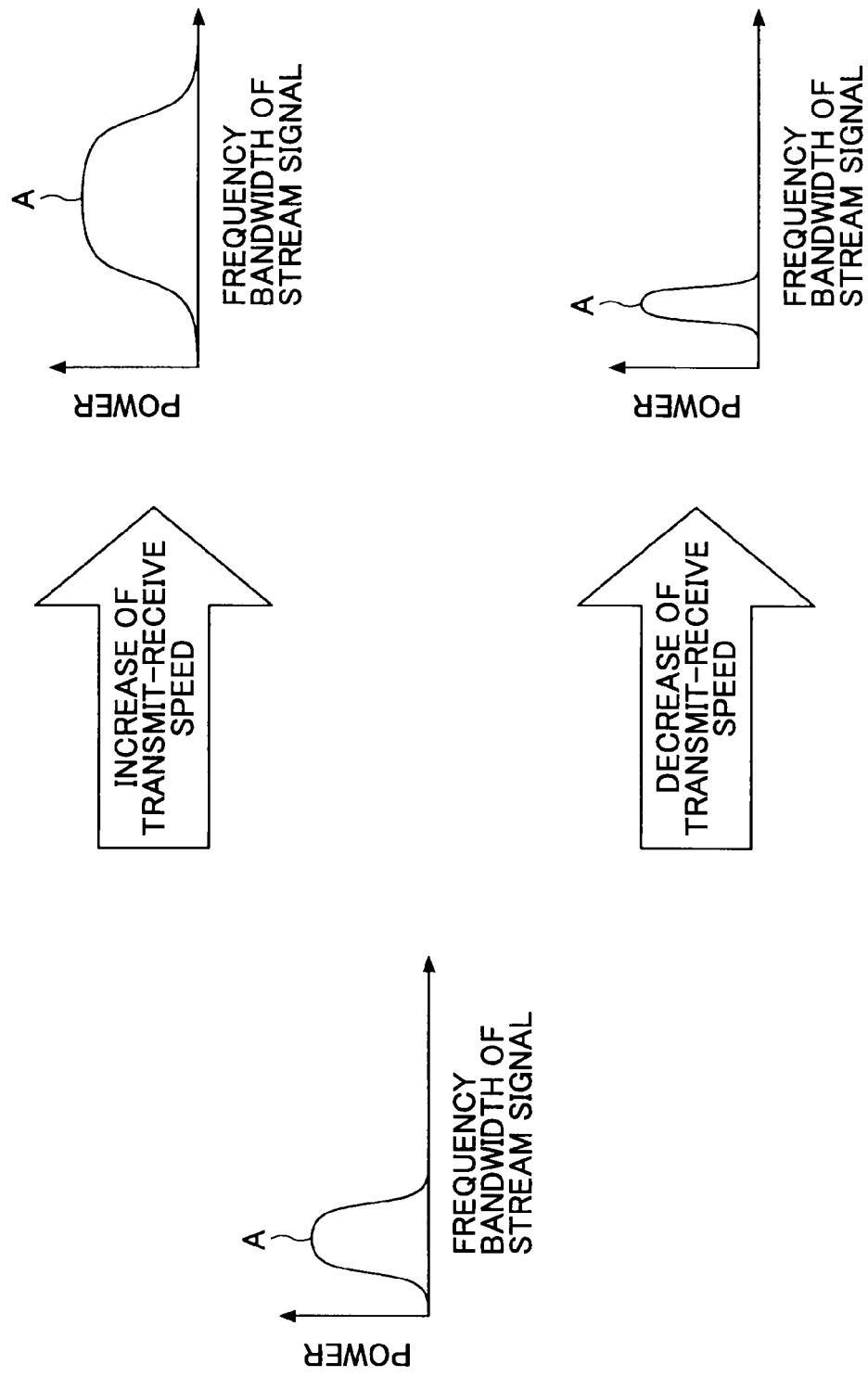
FIG. 41 is a diagram for explaining operation of the interface shown in FIG. 40 in the third embodiment of the present invention.

The realization means of the configuration shown in FIG. 40 is described as follows. A clock is input to the packet processing part 131 for transmitting the stream signal from the packet processing part 132 to the stream transmit-receive part 133. Similarly, a clock for transmitting the stream signal from the stream transmit-receive part 133 to the route exchange part 120 is input into the stream transmit-receive part 133. When increasing/decreasing the bandwidth between nodes, the clock adjustment part 135 shown in FIG. 40 may change the two types of clocks. Accordingly, the frequency resources in the optical fiber can be efficiently used. But, the configuration of FIG. 40 is not necessarily used. FIG. 41 shows operation for changing the transmit/receive speed of the stream signal by the packet processing part 132 of the interface 130, in which techniques described in the non-patent document 2 can be used. As shown in FIG. 41, the packet processing part 132 increases the transmit/receive speed of the stream signal so that the frequency bandwidth of the stream signal is widened, and the packet processing part 132 decreases the transmit/receive speed of the stream signal so that the frequency bandwidth of the stream signal is narrowed.

As to passband width, the present embodiment is similar to the before-mentioned second embodiment, and the detailed description is not given.

FIG. 42 is a diagram showing optical frequency use efficiency of the conventional technique and the present invention.

Figure 43:
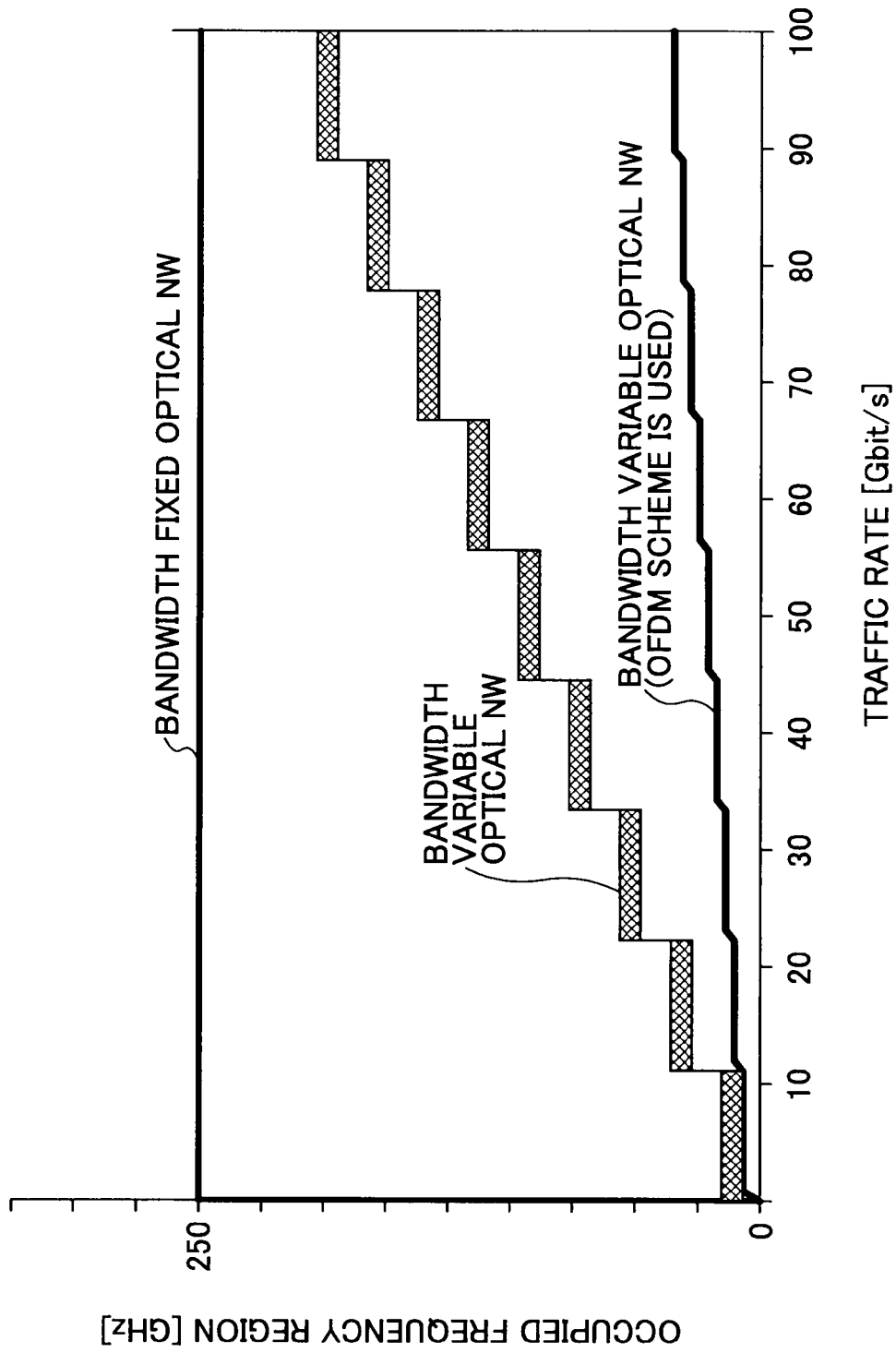
FIG. 43 is a diagram showing relationship between the traffic and the occupied frequency region.

In the conventional optical network, the passband width of a path in the route exchange part 120 is even and fixed (FIG. 42(a). In addition, it is necessary to set bandwidth in accordance with the highest bit rate in optical paths transferred in the optical network. For example, in the case of an optical network that handles optical paths of bit rates of 10 Gbit/s, 40 Gbit/s, 50 Gbit/s and 100 Gbit/s, passband width per one path is unified to be a fixed passband width that can pass an optical path of 100 Gbit/s in every optical node. As a result, there is a problem in that the optical frequency use efficiency is lowered. For example, in the case when the bit rate of the substream signal is 10 Gbit/s and the interval of the substream signals is 25 GHz, relationship between the traffic and the occupied frequency region in the conventional technique becomes one as shown in FIG. 43, in which the optical frequency use efficiency is about 40% (100 Gbit/s/250 GHz) in the region where the traffic is high, but the optical frequency use efficiency is low, that is, about 4% (10 Gbit/s/250 GHz) in the region where the traffic amount is low.

On the other hand, in the technique described in the present embodiment, the capacity of the optical path (bit rate of the stream signal) can be set in accordance with the traffic amount, and the passband width of the route exchange part can be adjusted continuously in accordance with the optical frequency region of the optical path. Thus, the occupied optical frequency region can be reduced as shown in FIG. 42(b) compared to the conventional technique. In addition, since the occupied optical frequency region can be increased according to the increase of traffic rate to be used as shown in FIG. 43, high optical frequency use efficiency can be realized irrespective of the traffic rate. For example, in the case when the bit rate of the substream signal is 10 Gbit/s and the interval of the substream signal is 25 GHz, the optical frequency use efficiency always becomes about 40% (10 Gbit/s/25 GHz).

In addition, by using the optical OFDM as the modulation scheme of the stream signal, the substream signal spacing can be narrowed since there is orthogonal relationship between the substream signals. Therefore, use efficiency of optical frequencies can be further improved compared to the above-mentioned example. For example, when the bit rate of the substream signal is 10 Gbit/s, it becomes possible to multiplex signals with the spacing of 10 GHz. Therefore, as shown in FIG. 43, the occupied frequency region can be made almost the same as the traffic amount, so that the optical frequency use efficiency close to 100% can be always realized.

As mentioned above, by using the bandwidth variable communication method of the present invention, improvement of use efficiency of the optical frequency bandwidth can be realized. In addition, since only network configuration component necessary for required bandwidth is used, it becomes possible to reduce consumed power.

In the present embodiment, in addition to the effect of the second embodiment, it becomes possible that the network management apparatus 500 and the bandwidth variable communication apparatus 100 control frequency bandwidth and the number of subcarriers between the bandwidth variable communication apparatus 100 and another bandwidth variable communication apparatus according to the input/output traffic amount.

Fourth Embodiment

Next, a bandwidth variable communication apparatus and a bandwidth variable communication method according to the fourth embodiment are described. The fourth embodiment is based on the first embodiment and the second embodiment. First, an outline of the present embodiment is described.

The bandwidth variable communication apparatus 100 in present embodiment further includes an external collaboration part 180 including: a configuration exchange function for exchanging network configuration information with other communication apparatus; a routing function for calculating and managing control information and transfer route of the stream signal based on the network configuration information; a signaling function for exchanging control information with other communication apparatus using the routing function; and an internal control function for exchanging control information with the control part 110.

The bandwidth variable communication method of the present embodiment includes:

a route information exchange step (control message exchange step) in which the external collaboration parts 180 of the bandwidth variable communication apparatuses exchange the network configuration information;

a route table management step in which the external collaboration part 180 of each bandwidth variable communication apparatus calculates control information and a transfer route of the stream signal based on the route information exchange step, and manages them in a route table;

a signaling step in which, when setting, deleting or changing a path passing through a plurality of bandwidth variable communication apparatuses, one external collaboration part 180 of the bandwidth variable communication apparatuses exchanges control information with other external collaboration part 180 of other bandwidth variable communication apparatuses on the path route by using the route table;

an internal control step in which the external collaboration part 180 of each bandwidth variable communication apparatus exchanges control information received in the signaling step with the control part 110; and a hardware control step in which the control part 110 of the bandwidth variable communication apparatuses controls the route exchange part 120, the interface 130, or the packet transfer part 140 or all of these based on the control information received in the internal control step.

Next, the present embodiment is described in more detail.

Figure 44:
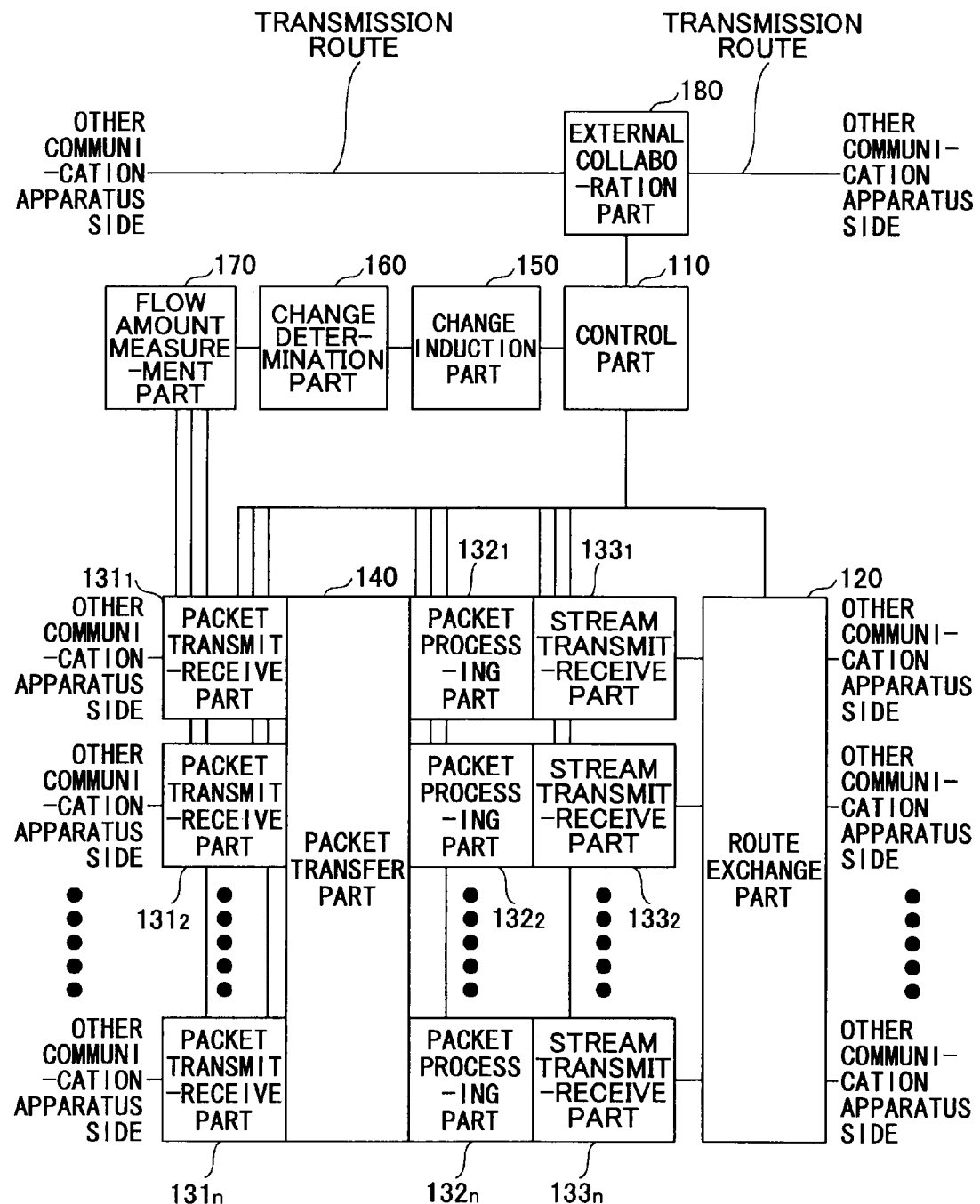
FIG. 44 is an example of a configuration of a bandwidth variable communication apparatus in a fourth embodiment of the present invention.

The configuration of the bandwidth variable communication apparatus follows the first embodiment. But, as shown in FIG. 44, the external collaboration part 180 is provided. In the present embodiment, the external collaboration part 180 and the control part 110 may be integrated. But, the flow amount measurement part 170, the change determination part 160 and the change induction part 150 is not necessarily provided.

The external collaboration part 180 of the present embodiment includes a GMPLS function, and the external collaboration part 180 is introduced as GMPLS function in document 11: Adrian Farrell et al., "Gmpls: Architecture And Applications", Morgan Kaufmann Pub, pp. 9-88, 2005 Dec. 20, document 12: IETF RFC 3945, document 13: IETF RFC 3471, document 14:IETF RFC 3473, document 15: IETF RFC 4203, document 16: IETF RFC4204.

The documents 11 and 12 introduce configurations of networks to which GMPLS is applied. As shown in FIG. 29, the network to which GMPLS is applied includes a data plane for transferring the main signal and a control plane for transferring a control signal for controlling the bandwidth variable communication apparatus. Documents 11, 13 and 14 introduce signaling messages of GMPLS for path control, and a method for exchanging the signaling message on the control plane.

Figure 45:
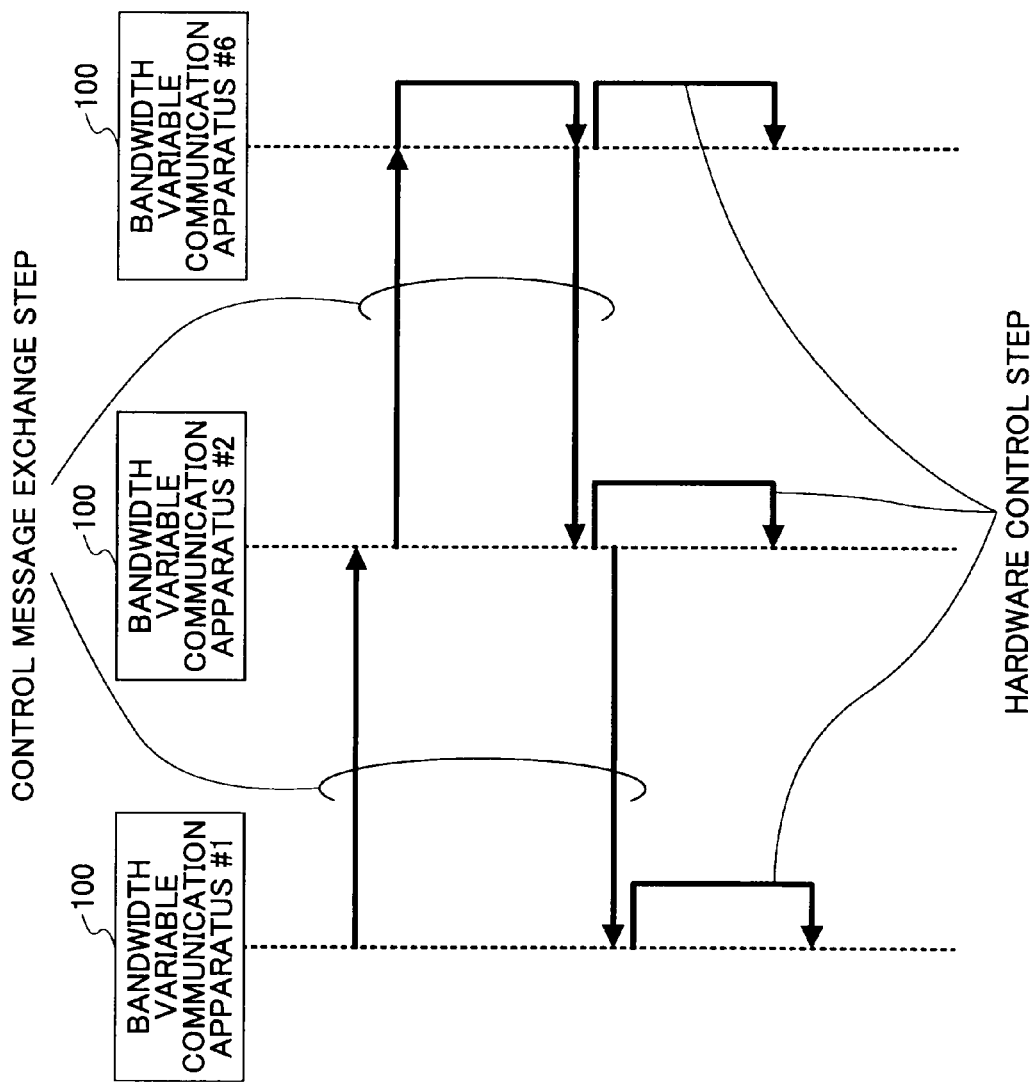
FIG. 45 is an operation sequence example for an example 1 of a bandwidth variable communication method in the fourth embodiment of the present invention.

FIG. 45 shows an example of a message sequence for path setup by GMPLS. The bandwidth variable communication apparatuses collaborate with other bandwidth variable communication apparatus by using signaling of GMPLS, so that controls such as path setup or path deletion becomes possible. Documents 11 and 15 describe routing messages for transferring signaling message on the control plane and for managing network resources such as wavelength of the data plane, and describes an exchanging method of the routing message on the control plane. Documents 13 and 16 describes a method for establishing a control plane between adjacent two bandwidth variable communication apparatuses. However, exchange of information of the passable frequency bandwidth and the number of subcarriers of the signal in the bandwidth variable communication apparatus is not suggested.

Proposed functions of the present embodiment compared to the conventional techniques shown in documents 11-16 are described as follows. By the way, the following functions are also described as proposed functions of the second embodiment.

In the present embodiment, each of FIGS. 33 and 34 show an example of the control information on the route exchange part 120 transmitted and received between the bandwidth variable communication apparatuses 100. The control information includes information of an input port and an output port that are necessary information for route switching between the input port and the output port. In addition, in order to control passable frequency bandwidth between the input port and the output port, the control information includes passband width and the center frequency of the passband width shown in FIG. 33, and in the case of FIG. 34, the control information includes information of lower limit frequency and the upper limit frequency of the passband width shown in FIG. 34.

Messages other than the above-mentioned one shown in FIG. 33 or 34 may be transmitted between the bandwidth variable communication apparatuses 100.

Each of FIGS. 35 and 36 shows an example of the control information on the interface 130 transmitted and received between the bandwidth variable communication apparatuses 100. The control information of FIG. 35 includes information or a part of information of frequency bandwidth per subcarrier, center frequency of the whole subcarriers, the number of subcarriers, time length of guard interval, frequency bandwidth of guard interval, activate or stop of the interface. On the other hand, the control information of FIG. 36 includes information or a part of information of frequency bandwidth per subcarrier, upper limit frequency and lower limit frequency of the whole subcarriers, the number of subcarriers, time length of guard interval, frequency bandwidth of guard interval, activate or stop of the interface.

Messages other than the above-mentioned one shown in FIG. 33 or 34 may be transmitted between the bandwidth variable communication apparatuses 100.

As to passband width, the present embodiment is similar to the before-mentioned second embodiment, and the detailed description is not given.

According to the above-mentioned configuration, it becomes possible that the bandwidth variable communication apparatuses control paths in a distributed manner in the network including the bandwidth variable communication apparatuses.

In the present embodiment, it is assumed that the external collaboration part 180 includes the GMPLS function part. However, the external collaboration part 180 may use similar communication protocols other than GMPLS.

Fifth Embodiment

Next, a bandwidth variable communication apparatus and a bandwidth variable communication method according to the fifth embodiment are described. The fifth embodiment is based on the third embodiment and the fourth embodiment.

The bandwidth variable communication apparatus includes:

a route information exchange step in which the external collaboration parts 180 of the bandwidth variable communication apparatuses exchange the network configuration information;

a route table management step in which the external collaboration part 180 of each bandwidth variable communication apparatus calculates control information and a transfer route of the stream signal based on the route information exchange step, and manages the transfer route in a route table;

a traffic monitoring step in which the flow amount measurement part 170 of the bandwidth variable communication apparatus terminating each of existing paths on the network monitors input traffic, output traffic, or both of these on the existing path in collaboration with the interface;

an increase/decrease determination step in which the change determination part 160 of the bandwidth variable communication apparatus determines to increase or delete a path (parallel path) parallel to the existing path based on the monitoring result in the traffic monitoring step;

an increase/decrease reporting step in which the change induction part 150 of the bandwidth variable communication apparatus transmits, to the control part, an increase request or a delete request of the parallel path based on the increase/decrease determination result of the increase/decrease determination step, and the control part 110 transmits the increase request or the delete request to the external collaboration part 180;

a signaling step in which the external collaboration part 180 of the bandwidth variable communication apparatuses exchanges control information with external collaboration parts 180 of each bandwidth variable communication apparatus on the route of the parallel path based on the increase request or the delete request of the increase/decrease reporting step;

an internal control step in which the external collaboration part 180 of each bandwidth variable communication apparatus exchanges control information received in the signaling step with the control part 110; and a hardware control step in which the control part 110 of the bandwidth variable communication apparatuses controls the route exchange part 120, the interface 130, or the packet transfer part 140 or all of these based on the control information received in the internal control step.

In the present embodiment, similarly to the third embodiment, the bandwidth variable communication apparatus #1 shown in FIG. 30 measures traffic amount of existing paths between the bandwidth variable communication apparatus #1 and the opposed bandwidth variable communication apparatus #6. The bandwidth variable communication apparatus #1 determines increase or decrease of the number of existing paths based on the measurement result. Next, different from the third embodiment, the bandwidth variable communication apparatus #1 controls paths in collaboration with the bandwidth variable communication apparatus #2 and the bandwidth variable communication apparatus #6 in order to add a new path to the existing paths or to delete an excessive path from the existing paths based on the non-patent document 2 and the patent document 1. The basic flow of the control sequence of the present embodiment is the same as that of GMPLS described in the fourth embodiment.

As to passband width, since the present embodiment is similar to the before-mentioned second embodiment, the detailed description is not given.

In the following, configuration examples of the described embodiments are recited focusing attention on various aspects.

Example 1

A bandwidth variable communication apparatus, comprising:

a route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes; and a control unit including a control information transmit-receive function for transmitting and receiving control information for both or a part of the route exchange function and the bandwidth change function of the route exchange unit, and including a control function for controlling the route exchange unit based on the control information, wherein all or a part of input ports and output ports are connected to other communication apparatuses via transmission routes.

Accordingly, it becomes possible to change the passable frequency bandwidth from the input port to the output port in the route exchange unit 120.

Example 2

The bandwidth variable communication apparatus as described in example 1, the route exchange unit including a function for performing route exchange for stream signals of a plurality of subcarriers in which frequency bands are partially overlapping.

Accordingly, it becomes possible to change routes of optical signals in which frequency bands are overlapping, and to change the passable frequency bandwidth between the input port to the output port.

Example 3

The bandwidth variable communication apparatus as described in example 1, comprising interfaces in all or a unit of input ports or output ports, the interface comprising:

a packet transmit-receive unit configured to transmit and receive packets with other communication apparatus connected via a transmission route;

a packet processing unit including a packet processing function for transmitting and receiving packets with the packet transmit-receive unit, and a signal conversion function for performing signal conversion between a packet and a stream signal; and a stream transmit-receive unit configured to transmit and receive the stream signal with the route exchange unit, the control unit further comprising:

a control information transmit-receive function for transmitting and receiving control information for all or a part of the packet transmit-receive unit, the packet processing unit and the stream transmit-receive unit of the interface; and an interface control function for controlling the interface based on the control information.

Accordingly, it becomes possible to convert various client signals into stream signals at the interface.

Example 4

The bandwidth variable communication apparatus as described in example 3, the stream transmit-receive unit comprising a unit configured to transmit and receive an optical orthogonal frequency division multiplexing (OFDM) signal formed by a plurality of subcarriers in which frequency bands are partially overlapping.

Accordingly, it becomes possible to convert various client signals into OFDM signals at the interface.

Example 5

The bandwidth variable communication apparatus as described in example 3, the interface comprising a clock adjustment unit configured to control clocks to be provided to the packet processing unit and the stream transmit-receive unit, the packet processing unit comprising a function for changing a transmit-receive speed of the stream signal being exchanged with the stream transmit-receive unit based on the clock provided from the clock adjustment unit, and the stream transmit-receive unit comprising a unit configured to change a transmit-receive speed of the stream signal being exchanged with the packet processing unit based on the clock provided from the clock adjustment unit.

Accordingly, it becomes possible to perform increase/decrease control for frequency bandwidth of stream signals transmitted and received in the interface.

Example 6

The bandwidth variable communication apparatus as described in example 3, wherein one or more packet processing units are connected to one packet transmit-receive unit of the interface, and the packet transmit-receive unit comprising:

a distribution policy and an aggregation policy of signal processing load between the packet transmit-receive unit and the packet processing units, the distribution policy and the aggregation policy being designed based on difference of signal processing capability between the packet transmit-receive unit and the packet processing unit;

a function for transmitting packets to the packet processing units based on the distribution policy; and a function for receiving packets from the packet processing units based on the aggregation policy.

Accordingly, it becomes possible to reduce the amount of packets transmitted from the packet transmit-receive unit to the packet processing unit by load distribution, and to ease requirements for processing performance of the packet processing unit.

Example 7

The bandwidth variable communication apparatus as described in example 3, wherein one packet processing unit is connected to equal to or greater than two packet transmit-receive units of the interface, and the packet processing unit comprising:

a distribution policy and an aggregation policy of signal processing load between the packet transmit-receive units and the packet processing unit, the distribution policy and the aggregation policy being designed based on difference of signal processing capability between the packet transmit-receive unit and the packet processing unit;

a function for transmitting packets to the packet transmit-receive units based on the distribution policy; and a function for receiving packets from the packet transmit-receive units based on the aggregation policy.

Accordingly, it becomes possible to reduce the amount of packets transmitted from the packet processing unit to the packet transmit-receive unit by load distribution, and to ease requirements for processing performance of the packet transmit-receive unit.

Example 8

The bandwidth variable communication apparatus as described in example 3, wherein one or more packet transmit-receive units are connected to one packet processing unit of the interface, and the packet processing unit comprising:

a distribution policy and an aggregation policy of signal processing load between the packet processing unit and the stream transmit-receive units, the distribution policy and the aggregation policy being designed based on difference of signal processing capability between the stream transmit-receive unit and the packet processing unit;

a function for transmitting stream signals to the stream transmit-receive units based on the distribution policy; and a function for receiving stream signals from the stream transmit-receive units based on the aggregation policy.

Accordingly, it becomes possible to lower the signal rate of the stream signal transmitted from the packet processing unit to the stream transmit-receive unit by load distribution, and to ease requirements for processing performance of the stream transmit-receive unit.

Example 9

The bandwidth variable communication apparatus as described in example 3, wherein one stream transmit-receive unit is connected to equal to or greater than two packet processing units of the interface, and the stream transmit-receive unit comprising:

a distribution policy and an aggregation policy of signal processing load between the packet processing units and the stream transmit-receive unit, the distribution policy and the aggregation policy being designed based on difference of signal processing capability between the stream transmit-receive unit and the packet processing unit;

a function for transmitting stream signals to the packet processing units based on the distribution policy; and a function for receiving stream signals from the packet processing units based on the aggregation policy.

Accordingly, it becomes possible to lower the signal rate of the stream signal transmitted from the stream transmit-receive unit to the packet processing unit by load distribution, and to ease requirements for processing performance of the packet processing unit.

Example 10

The bandwidth variable communication apparatus as described in example 3, further comprising a packet transfer unit configured to transfer packets exchanged between the packet transmit-receive unit and the packet processing unit of the interface to a different transmit-receive unit that is different from the packet transmit-receive unit, or to a different packet processing unit that is different from the packet processing unit, the control unit comprising:

a control information transmit-receive function for transmitting and receiving control information for the packet transfer unit; and a packet transfer control function for controlling the packet transfer unit based on the control information.

Accordingly, it becomes possible to exchange packets between the packet transmit-receive units and the packet processing units based on header information of the packets.

Example 11

The bandwidth variable communication apparatus as described in example 3, comprising:

a flow amount measurement unit configured to measure flow amount of packets input into the packet transmit-receive unit or into the packet processing unit of the interface;

a change determination unit configured to determine necessity for controlling all or a part of the route exchange unit and the interface by using the packet flow amount and an increase/decrease rule; and a change induction unit configured to exchange the control information with the control unit based on the determination result of the change determination unit.

Accordingly, it becomes possible to measure the amount of input/output packets at the interface, and to increase/decrease a path by autonomously controlling the route exchange unit, the interface and the packet transfer unit and the like according to the measurement result.

Example 12

The bandwidth variable communication apparatus as described in example 1 or 3, further comprising an external collaboration unit that comprises:

a configuration exchange function for exchanging network configuration information with other communication apparatus;

a routing function for calculating and managing control information and a transfer route of the stream signal based on the network configuration information;

a signaling function for exchanging control information with the other communication apparatus using the routing function; and an internal control function for exchanging the control information with the control unit.

Accordingly, it becomes possible to perform distributed control among the bandwidth variable communication apparatuses. As a result, scalability of the size of the network including the bandwidth variable communication apparatuses improves.

Example 13

The bandwidth variable communication apparatus as described in example 12, further comprising:

a flow amount measurement unit configured to measure flow amount of packets input into the packet transmit-receive unit or into the packet processing unit of the interface;

a change determination unit configured to determine necessity for controlling all or a part of the route exchange unit and the interface by using the packet flow amount and an increase/decrease rule; and a change induction unit configured to exchange the control information with the control unit based on the determination result of the change determination unit.

Example 14

The bandwidth variable communication apparatus as described in example 4, the stream transmit-receive unit comprising a stream transmission unit that comprises:

a signal distribution unit configured to distribute a stream signal output from the packet processing unit to one or more substream signals;

one or more signal modulation units including a function for modulating each substream signal output by the signal distribution unit;

an inverse Fourier transform unit including a function for collectively transforming substream signals modulated by the signal modulation units and existing on the frequency domain from the frequency domain to the time domain, and a function for outputting the substream signals converted into the time domain as an inverse Fourier transformed stream signal; and an optical transmission unit configured to convert the inverse Fourier transformed signal output from the inverse Fourier transform unit into one or more subcarriers.

Accordingly, it becomes possible to generate decodable substream signals in which each frequency band is overlapping with other frequency band.

Example 15

The bandwidth variable communication apparatus as described in example 4, the stream transmit-receive unit comprising stream transmission unit, the stream transmission unit comprising:

one or more signal modulation units each configured to modulate each stream signal output by the packet processing units to generate a substream signal;

an inverse Fourier transform unit including a function for collectively transforming substream signals modulated by the signal modulation units and existing on the frequency domain from the frequency domain to the time domain, and a function for outputting the substream signals converted into the time domain as an inverse Fourier transformed stream signal; and an optical transmission unit configured to convert the inverse Fourier transformed signal output from the inverse Fourier transform unit into one or more subcarriers.

Accordingly, it becomes possible to generate decodable substream signals in which each frequency band is overlapping with other frequency band.

Example 16

The bandwidth variable communication apparatus as described in example 14 or 15, the optical transmission unit comprising a function for deleting a part of sidebands occurring in subcarriers by using suppressed carrier single-sideband modulation.

Accordingly, it becomes possible to narrow the frequency bandwidth of the generated substream signals.

Example 17

The bandwidth variable communication apparatus as described in example 4, the stream transmit-receive unit comprising a stream transmission unit, the stream transmission unit comprising:

a signal modulation unit configured to modulate a stream signal output by the packet processing unit to generate substream signals;

one or more optical transmission units configured to convert the substream signals output from the signal modulation unit into subcarriers;

a frequency spacing control unit configured to control the optical transmission units for equalizing every optical frequency spacing between subcarriers output from the optical transmission units; and a wavelength multiplexing unit configured to aggregate one or more subcarriers output from the one or more optical transmission units, the frequency spacing control unit comprising a unit configured to set the optical frequency spacing of the subcarriers to be equal to or greater than the bit rate of the substream signal.

Accordingly, it becomes possible to generate decodable substream signals in which each frequency band is overlapping with other frequency band.

Example 18

The bandwidth variable communication apparatus as described in example 4, the stream transmit-receive unit comprising a stream transmission unit, the stream transmission unit comprising:

a signal modulation unit configured to modulates a stream signal output from the packet processing unit to generate substream signals;

a multiple wavelength light generation unit configured to collectively generate equal to or more than two continuous carrier lights in which optical frequency spacing is equal to or greater than the bit rate of the substream signal; and a wavelength demultiplexing unit configured to demultiplex the equal to or greater than two continuous carrier lights;

one or more photoelectric conversion units configured to modulate the continuous carrier lights by using the substream signals output from the signal modulation unit to convert the continuous carrier lights into subcarriers; and a wavelength multiplexing unit configured to aggregate one or more subcarriers output from the one or more photoelectric conversion units.

Accordingly, it becomes possible to generate decodable substream signals in which each frequency band is overlapping with other frequency band.

Example 19

The bandwidth variable communication apparatus as described in example 14, 15, 17 or 18, further comprising a guard interval generation unit that comprises:

a function for generating a guard interval by wholly or partially repeating the inverse Fourier transformed stream signal output from the inverse Fourier transform unit or the substream signal output from the signal modulation unit;

a function for combining the generated guard interval to the inverse Fourier transformed stream signal or the substream signal; and a function for transmitting the inverse Fourier transformed stream signal or the substream signal to which the guard interval is combined to the optical transmission unit or the photoelectric conversion unit.

Accordingly, it becomes possible to compensate for propagation delay difference between substream signals from an entrance of the path end to an exit at an interface in the exit side of the path end.

Example 20

The bandwidth variable communication apparatus as described in example 4, the stream transmit-receive unit comprising a stream receiving unit, the stream receiving unit comprising:

an optical receiving unit configured to receive one or more subcarriers and transforming the subcarriers to the inverse Fourier transformed stream signal;

a Fourier transform unit including a function for collectively transforming the inverse Fourier transformed stream signal output from the optical receiving unit from the time domain to the frequency domain so as to divide the signal to one or more substream signals, and a function for distributing the generated substream signals to each substream signal;

one or more signal demodulation units configured to demodulate each substream signal output from the Fourier transform unit; and a signal aggregation unit configured to aggregate the substream signals output from the signal demodulation units into one stream signal and output it to the packet processing unit.

Accordingly, it becomes possible to decode the substream signals in which each frequency band is overlapping with other frequency band.

Example 21

The bandwidth variable communication apparatus as described in example 4, the stream transmit-receive unit comprising stream receiving unit, the stream receiving unit comprising:

an optical receiving unit configured to receive one or more subcarriers and transform the subcarriers to the inverse Fourier transformed stream signal;

a Fourier transform unit including a function for collectively transforming the inverse Fourier transformed stream signal output from the optical receiving unit from the time domain to the frequency domain so as to divide the signal to one or more substream signals, and a function for distributing the generated substream signals to each substream signal; and one or more signal demodulation units configured to demodulate each substream signal output from the Fourier transform unit to generate stream signals.

Accordingly, it becomes possible to decode the substream signals in which each frequency band is overlapping with other frequency band.

Example 22

The bandwidth variable communication apparatus as described in example 4, the stream transmit-receive unit comprising a guard interval removing unit that comprises:

a function for removing the guard interval from the inverse Fourier transformed signal to which the guard interval is combined so as to extract an inverse Fourier transformed stream signal; and a function for transmitting the extracted inverse Fourier transformed stream signal to the Fourier transform unit.

Accordingly, it becomes possible to remove the guard interval from the inverse Fourier transformed stream signal to which the guard interval is added in the bandwidth variable communication apparatus of the example 18.

Example 23

The bandwidth variable communication apparatus as described in example 4, the stream transmit-receive unit comprising a stream receiving unit, the stream receiving unit comprising:

an optical demultiplexing unit configured to demultiplex one or more incoming subcarriers to each subcarrier;

one or more optical receiving units configured to receive respective subcarriers output from the optical demultiplexing unit and convert the subcarriers to substream signals; and one or more signal demodulation units configured to demodulate substream signals output from the optical receiving units.

Accordingly, it becomes possible to decode the substream signals in which each frequency band is overlapping with other frequency band.

Example 24

The bandwidth variable communication apparatus as described in example 4, the stream transmit-receive unit comprising stream receiving unit, the stream receiving unit comprising:

an optical demultiplexing unit configured to demultiplex one or more incoming subcarriers to each subcarrier;

one or more optical receiving units configured to receive respective subcarriers output from the optical demultiplexing unit and convert the subcarriers to substream signals;

one or more signal demodulation units configured to demodulate substream signals output from the optical receiving units; and a signal aggregation unit configured to aggregate substream signals output from the signal demodulation units into one stream signal, and output the signal to the packet processing unit.

Accordingly, it becomes possible to decode the substream signals in which each frequency band is overlapping with other frequency band.

Example 25

A bandwidth variable communication method in a network in which bandwidth variable communication apparatuses are connected via transmission routes and the network includes a network management apparatus including a function for controlling and managing the bandwidth variable communication apparatuses, the bandwidth variable communication apparatus comprising a route exchange unit, an interface and a control unit, the route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes; and the control unit including a control information transmit-receive function for transmitting and receiving control information for both or a part of the route exchange function and the bandwidth change function of the route exchange unit, and including a control function for controlling the route exchange unit based on the control information, wherein all or a part of input ports and output ports are connected to other communication apparatuses via transmission routes the bandwidth variable communication method comprising:

a control message exchange step in which, when the network management apparatus sets up, deletes or changes a path passing through a plurality of bandwidth variable communication apparatuses, the network management apparatus exchanges control information, with the control unit of each bandwidth variable communication apparatus on the path route, for controlling the route exchange unit, or the interface, or all of these; and a hardware control step in which the control unit of the bandwidth variable communication apparatuses controls the route exchange unit, or the interface, or all of these based on the control information received in the control message exchange step.

Example 26

A bandwidth variable communication method in a network in which bandwidth variable communication apparatuses are connected via transmission routes and the network includes a network management apparatus including a function for controlling and managing the bandwidth variable communication apparatuses, the bandwidth variable communication apparatus comprising a route exchange unit, an interface and a control unit, the route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes;

the interface including a packet transmit-receive unit having a packet transmit-receive function for transmitting and receiving packets with other communication apparatus connected via a transmission route, a packet processing unit including a packet processing function for transmitting and receiving packets with the packet transmit-receive function, and a signal conversion function for performing signal conversion between a packet and a stream signal, and a stream transmit-receive unit including a stream transmit-receive function for transmitting and receiving the stream signal with the route exchange unit;

the control unit including a control information transmit-receive function for transmitting and receiving control information for both or a part of the route exchange function and the bandwidth change function of the route exchange unit, a control function for controlling the route exchange unit based on the control information, a control information transmit-receive function for transmitting and receiving control information for all or a part of the packet transmit-receive function, the packet processing function, the signal conversion function and the stream transmit-receive function of the interface, and including an interface control function for controlling the interface based on the control information;

wherein all or a part of input ports and output ports are connected to other communication apparatuses via transmission routes the bandwidth variable communication method comprising:

a control message exchange step in which, when the network management apparatus sets up, deletes or changes a path passing through a plurality of bandwidth variable communication apparatuses, the network management apparatus exchanges control information, with the control unit of each bandwidth variable communication apparatus on the path route, for controlling the route exchange unit, or the interface, or all of these; and a hardware control step in which the control unit of the bandwidth variable communication apparatuses controls the route exchange unit, or the interface, or all of these based on the control information received in the control message exchange step.

Example 27

A bandwidth variable communication method in a network in which bandwidth variable communication apparatuses are connected via transmission routes and the network includes a network management apparatus including a function for controlling and managing the bandwidth variable communication apparatuses, the bandwidth variable communication apparatus comprising a route exchange unit, an interface and a control unit, the route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes;

the interface including a packet transmit-receive unit having a packet transmit-receive function for transmitting and receiving packets with other communication apparatus connected via a transmission route, a packet processing unit including a packet processing function for transmitting and receiving packets with the packet transmit-receive function, and a signal conversion function for performing signal conversion between a packet and a stream signal, and a stream transmit-receive unit including a stream transmit-receive function for transmitting and receiving the stream signal with the route exchange unit;

the control unit including a control information transmit-receive function for transmitting and receiving control information for both or a part of the route exchange function and the bandwidth change function of the route exchange unit, a control function for controlling the route exchange unit based on the control information, a control information transmit-receive function for transmitting and receiving control information for all or a part of the packet transmit-receive function, the packet processing function, the signal conversion function and the stream transmit-receive function of the interface, including an interface control function for controlling the interface based on the control information, including a packet transfer unit configured to transfer packets exchanged between the packet transmit-receive unit and the packet processing unit of the interface to a different transmit-receive unit that is different from the packet transmit-receive unit, or to a different packet processing unit that is different from the packet processing unit, including a control information transmit-receive unit configured to transmit and receive control information for the packet transfer unit, and including a packet transfer control unit configured to control the packet transfer unit based on the control information;

wherein all or a part of input ports and output ports are connected to other communication apparatuses via transmission routes the bandwidth variable communication method comprising:

a control message exchange step in which, when the network management apparatus sets up, deletes or changes a path passing through a plurality of bandwidth variable communication apparatuses, the network management apparatus exchanges control information, with the control unit of each bandwidth variable communication apparatus on the path route, for controlling the route exchange unit, the interface, or the packet transfer unit or all of these; and a hardware control step in which the control unit of the bandwidth variable communication apparatuses controls the route exchange unit, the interface, or the packet transfer unit or all of these based on the control information received in the control message exchange step.

Example 28

A bandwidth variable communication method in a network in which bandwidth variable communication apparatuses are connected via transmission routes and the network includes a network management apparatus including a function for controlling and managing the bandwidth variable communication apparatuses, the bandwidth variable communication apparatus comprising a route exchange unit, an interface and a control unit, the route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes;

the interface including a packet transmit-receive unit having a packet transmit-receive function for transmitting and receiving packets with other communication apparatus connected via a transmission route, a packet processing unit including a packet processing function for transmitting and receiving packets with the packet transmit-receive function, and a signal conversion function for performing signal conversion between a packet and a stream signal, and a stream transmit-receive unit including a stream transmit-receive function for transmitting and receiving the stream signal with the route exchange unit;

the control unit including a control information transmit-receive function for transmitting and receiving control information for both or a part of the route exchange function and the bandwidth change function of the route exchange unit, a control function for controlling the route exchange unit based on the control information, a control information transmit-receive function for transmitting and receiving control information for all or a part of the packet transmit-receive function, the packet processing function, the signal conversion function and the stream transmit-receive function of the interface, and including an interface control function for controlling the interface based on the control information;

the bandwidth variable communication apparatus further comprising a flow amount measurement unit configured to measure flow amount of packets input into the packet transmit-receive unit or into the packet processing unit of the interface, a change determination unit configured to determine necessity for controlling all or a part of the route exchange unit, the interface and the packet transfer unit by using the packet flow amount and an increase/decrease rule, and a change induction unit configured to exchange the control information with the control unit based on the determination result of the change determination unit;

wherein all or a part of input ports and output ports are connected to other communication apparatuses via transmission routes, the bandwidth variable communication method comprising:

a traffic monitoring step in which the flow amount measurement unit of the bandwidth variable communication apparatus terminating each of existing paths on the network monitors input traffic, output traffic or both of these on the existing path in collaboration with the interface;

an increase/decrease determination step in which the change determination unit of the bandwidth variable communication apparatus determines to increase or decrease a path (parallel path) parallel to the existing path based on the monitoring result in the traffic monitoring step;

an increase/decrease reporting step in which the change induction unit of the bandwidth variable communication apparatus transmits control information, to the network management apparatus, including an increase request or a delete request of the parallel path based on the increase/decrease determination result of the increase/decrease determination step;

a control message exchange step in which the network management apparatus exchanges control information for controlling the route exchange unit, the interface, or the packet transfer unit or all of these, with the control unit of each bandwidth variable communication apparatus on the route of the parallel path based on the increase request or the delete request in the increase/decrease reporting step; and a hardware control step in which the control unit of the bandwidth variable communication apparatuses controls the route exchange unit, the interface, or the packet transfer unit or all of these based on the control information received in the control message exchange step.

There are two kinds of definitions of the path. First one is a carrier for connecting between interfaces of two adjacent bandwidth variable communication apparatuses. Second one is each of subcarriers which form the carrier. But, in either case, the operation is not changed.

Accordingly, it becomes possible that each bandwidth variable communication apparatus determines lack of bandwidth supply or surplus of bandwidth supply by comparing existing paths with the input/output traffic amount, and report the result to the network management apparatus. In addition, it becomes possible that the network management apparatus changes supplied bandwidth by setting up or deleting the parallel path by controlling the bandwidth variable communication apparatuses along the existing paths according to the reported information.

Example 29

A bandwidth variable communication method in a network in which bandwidth variable communication apparatuses are connected via transmission routes and the network includes a network management apparatus including a function for controlling and managing the bandwidth variable communication apparatuses, the bandwidth variable communication apparatus comprising a route exchange unit, an interface, a control unit and an external collaboration unit, the route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes;

the interface including a packet transmit-receive unit having a packet transmit-receive function for transmitting and receiving packets with other communication apparatus connected via a transmission route, a packet processing unit including a packet processing function for transmitting and receiving packets with the packet transmit-receive function, and a signal conversion function for performing signal conversion between a packet and a stream signal, and a stream transmit-receive unit including a stream transmit-receive function for transmitting and receiving the stream signal with the route exchange unit;

the control unit including a control information transmit-receive function for transmitting and receiving control information for both or a part of the route exchange function and the bandwidth change function of the route exchange unit, a control function for controlling the route exchange unit based on the control information, a control information transmit-receive function for transmitting and receiving control information for all or a part of the packet transmit-receive function, the packet processing function, the signal conversion function and the stream transmit-receive function of the interface, and including an interface control function for controlling the interface based on the control information;

the external collaboration unit including a configuration exchange function for exchanging network configuration information with other communication apparatus, a routing function for calculating and managing control information and a transfer route of the stream signal based on the network configuration information, a signaling function for exchanging control information with the other communication apparatus using the routing function, and an internal control function for exchanging the control information with the control unit;

wherein all or a part of input ports and output ports are connected to other communication apparatuses via transmission routes, the bandwidth variable communication method comprising:

a route information exchange step in which the external collaboration units of the bandwidth variable communication apparatuses exchange the network configuration information;

a route table management step in which the external collaboration unit of each bandwidth variable communication apparatus calculates control information and a transfer route of the stream signal based on the route information exchange step, and manages them in a route table;

a signaling step in which, when setting, deleting or changing a path passing through a plurality of bandwidth variable communication apparatuses, one external collaboration unit of the bandwidth variable communication apparatuses exchanges control information with other external collaboration unit of other bandwidth variable communication apparatuses on the path route by using the route table;

an internal control step in which the external collaboration unit of each bandwidth variable communication apparatus exchanges control information received in the signaling step with the control unit; and a hardware control step in which the control unit of the bandwidth variable communication apparatuses controls the route exchange unit, the interface, or the packet transfer unit or all of these based on the control information received in the internal control step.

There are two kinds of definitions of the path. First one is a carrier for connecting between interfaces of two adjacent bandwidth variable communication apparatuses. Second one is each of subcarriers which form the carrier. But, in either case, the operation is not changed.

Accordingly, it becomes possible that each bandwidth variable communication apparatus controls paths in collaboration with other bandwidth variable communication apparatuses in an autonomous-decentralized manner.

Example 30

A bandwidth variable communication method in a network in which bandwidth variable communication apparatuses are connected via transmission routes and the network includes a network management apparatus including a function for controlling and managing the bandwidth variable communication apparatuses, the bandwidth variable communication apparatus comprising a route exchange unit, an interface, a control unit and an external collaboration unit, the route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes;

the interface including a packet transmit-receive unit having a packet transmit-receive function for transmitting and receiving packets with other communication apparatus connected via a transmission route, a packet processing unit including a packet processing function for transmitting and receiving packets with the packet transmit-receive function, and a signal conversion function for performing signal conversion between a packet and a stream signal, and including a stream transmit-receive unit including a stream transmit-receive function for transmitting and receiving the stream signal with the route exchange unit;

the control unit including a control information transmit-receive function for transmitting and receiving control information for both or a part of the route exchange function and the bandwidth change function of the route exchange unit, a control function for controlling the route exchange unit based on the control information, a control information transmit-receive function for transmitting and receiving control information for all or a part of the packet transmit-receive function, the packet processing function, the signal conversion function and the stream transmit-receive function of the interface, and including an interface control function for controlling the interface based on the control information;

the external collaboration unit including a flow amount measurement unit configured to measure flow amount of packets input into the packet transmit-receive function or into the packet processing function of the interface, a change determination unit configured to determine necessity for controlling all or a part of the route exchange unit, the interface and the packet transfer unit by using the packet flow amount and an increase/decrease rule, a change induction unit configured to exchange the control information with the control unit based on the determination result of the change determination unit, a configuration exchange function for exchanging network configuration information with other communication apparatus, a routing function for calculating and managing control information and a transfer route of the stream signal based on the network configuration information, a signaling function for exchanging control information with the other communication apparatus using the routing function, and an internal control function for exchanging the control information with the control unit;

wherein all or a part of input ports and output ports are connected to other communication apparatuses via transmission routes, the bandwidth variable communication method comprising:

a route information exchange step in which the external collaboration units of the bandwidth variable communication apparatuses exchange the network configuration information;

a route table management step in which the external collaboration unit of each bandwidth variable communication apparatus calculates control information and a transfer route of the stream signal based on the route information exchange step, and manages them in a route table;

a traffic monitoring step in which the flow amount measurement unit of the bandwidth variable communication apparatus terminating each of existing paths on the network monitors input traffic, output traffic, or both of these on the existing path in collaboration with the interface;

an increase/decrease determination step in which the change determination unit of the bandwidth variable communication apparatus determines to increase or delete a path (parallel path) parallel to the existing path based on the monitoring result in the traffic monitoring step;

an increase/decrease reporting step in which the change induction unit of the bandwidth variable communication apparatus transmits, to the control unit, an increase request or a delete request of the parallel path based on the increase/decrease determination result of the increase/decrease determination step, and the control unit transmits the increase request or the delete request to the external collaboration unit;

a signaling step in which the external collaboration unit of the bandwidth variable communication apparatuses exchanges control information with external collaboration units of each bandwidth variable communication apparatus on the route of the parallel path based on the increase request or the delete request of the increase/decrease reporting step;

an internal control step in which the external collaboration unit of each bandwidth variable communication apparatus exchanges control information received in the signaling step with the control unit; and a hardware control step in which the control unit of the bandwidth variable communication apparatuses controls the route exchange unit, the interface, or the packet transfer unit or all of these based on the control information received in the internal control step.

There are two kinds of definitions of the path. First one is a carrier for connecting between interfaces of two adjacent bandwidth variable communication apparatuses. Second one is each of subcarriers which form the carrier. But, in either case, the operation is not changed.

Accordingly, it becomes possible that each bandwidth variable communication apparatus determines lack of bandwidth supply or surplus of bandwidth supply by comparing existing paths with the input/output traffic amount, and to change supplied bandwidth by collaborating with bandwidth variable communication apparatuses along the existing paths in an autonomous-decentralized manner based on the determination result.

Example 31

The bandwidth variable communication method as described in any one of examples 25-30, wherein, in the hardware control step, the control unit performs change of passable frequency bandwidth from the input port to the output port in the route exchange unit based on the control information received via the control message exchange step or the internal control step.

Accordingly, it becomes possible to change the passable frequency bandwidth from the input port to the output port in the route exchange unit.

Example 32

The bandwidth variable communication method as described in any one of examples 25-30, wherein, in the hardware control step, the control unit performs activation of the interface, stop of the interface, change of frequency bandwidth of output stream signal from the interface, setting of time length of the guard interval, setting of optical frequency spacing (guard band) between adjacent paths, or all of these based on the control information received via the control message exchange step or the internal control step.

Accordingly, it becomes possible to change the frequency bandwidth output at the interface.

Example 33

The bandwidth variable communication method as described in any one of examples 25-30, wherein, when Bt(bit/s) indicates input traffic capacity of the packet signal at the interface, Bs(bit/s) indicates a basic bit rate per one substream signal, and ΔB(bit/s) indicates a bit rate increase due to codes other than the traffic signal in one substream signal, a bit rate of the stream signal is set to be k·Bs by using k which satisfies $(k-1)\cdot Bs \leq Bt + k \cdot \Delta B \leq k \cdot Bs$ (k is a natural number), an optical path route is set up between the transmission end and the receiving end of the stream signal, the optical path route being able to use an optical frequency region (k·fs+ 2·Bg) including k subcarrier lights (subcarrier light frequency spacing fs) and two guard bands Bg, the guard band Bg is set such that the spacing of adjacent subcarrier lights between an optical path and another optical path becomes equal to or greater than twice as large as fs ($Bg \geq 2 \cdot fs$), a stream signal transmission unit generates the stream signal using k subcarrier lights in an usable optical frequency region, and the route exchange unit sets the passband width of the stream signal so as to include the k subcarrier lights and such that the passband width Bsw satisfies $k \cdot fs \leq Bsw \leq k \cdot fs + Bg$.

Example 34

The bandwidth variable communication method as described in any one of examples 25-30, wherein the time of the guard interval is set to be longer than a propagation time difference ΔT between a substream signal of the shortest wavelength and a substream signal of the longest wavelength in an optical path route to be set up.

Example 35

The bandwidth variable communication method as described in any one of examples 25-30, wherein the time of the guard interval is set to be longer than a propagation time difference ΔT between a substream signal of the shortest wavelength and a substream signal of the longest wavelength in the longest optical path route in the network.

The present invention is not limited to the specifically disclosed embodiments, and variations and modifications may be made without departing from the scope of the present invention.

INDUSTRIAL APPLICABILITY

The present invention can be applied to optical communication systems using a liquid crystal optical switch and the like.

The present international application claims priority based on Japanese patent application No. 2008-241773, filed in the JPO on Sep. 19, 2008, and the entire contents of the application No. 2008-241773 are incorporated herein by reference.

DESCRIPTION OF REFERENCE SIGNS 1, 4 optical amplifier
2, 6 optical coupler
3 optical switch
5 transmission system
8 receiving system
10 transmission route
100 bandwidth variable communication apparatus
101 signal distribution part
102 signal modulation part
103 inverse Fourier transform part
104 optical transmission part
105 optical transmission part with SSB filter
106 synchronization frequency spacing control part
107 wavelength multiplexing part
108 photoelectric conversion part
109 common light source (multiple wavelength light generation part)
110 control unit, control part
111 wavelength demultiplexing part
120 route exchange unit, route exchange part
130 interface
131 packet transmit-receive part
132 packet processing part
133 stream transmit-receive part
140 packet transfer part
150 change induction part
160 change determination part
170 flow amount measurement part
180 external collaboration part
201 guard interval generation part
301 optical receiving part
302 Fourier transform part
303 signal demodulation part 303
304 signal aggregation part 304
401 optical receiving part
402 guard interval removing part
403 Fourier transform part
404 wavelength demultiplexing part
405 signal demodulation part 406 signal aggregation part
500 network management apparatus
1331 stream transmission part
1332 stream receiving part

The invention claimed is:

1. A bandwidth variable communication apparatus, comprising:
   a route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes;
   an interface in all or a part of input ports or output ports, the interface comprising:
   a packet transmit-receive unit configured to transmit and receive packets with another communication apparatus connected via a transmission route;
   a packet processing unit including a packet processing function for transmitting and receiving packets with the packet transmit-receive unit, and a signal conversion function for performing signal conversion between a packet and a stream signal; and
   a stream transmit-receive unit configured to transmit and receive the stream signal with the route exchange unit,
   a control unit including a control information transmit-receive function for transmitting and receiving control information including passable frequency bandwidth information such as a center frequency and a passband width or a lower limit frequency and an upper limit frequency in a section from an input port to an output port for both or a part of the route exchange function and the bandwidth change function of the route exchange unit, and control information including subcarrier frequency interval information for all or a part of the packet transmit-receive unit, the packet processing unit, and the stream transmit-receive unit of the interface, and including a control function for controlling the route exchange unit based on the control information for both or a part of the route exchange function and the bandwidth change function of the route exchange unit,
   and including an interface control function for controlling the interface based on the control information for all or a part of the packet transmit-receive unit, the packet processing unit, and the stream transmit-receive unit of the interface,
   wherein the all or a part of input ports and output ports are connected to other communication apparatuses via the interface and via transmission routes, and the route exchange unit includes a function for performing route exchange for stream signals of a plurality of subcarriers.

2. The bandwidth variable communication apparatus as claimed in claim 1, wherein one or more packet processing units are connected to one packet transmit-receive unit of the interface, and
   the packet transmit-receive unit comprising:
   a distribution policy and an aggregation policy of signal processing load between the packet transmit-receive unit and the packet processing units, the distribution policy and the aggregation policy being designed based on difference of signal processing capability between the packet transmit-receive unit and the packet processing unit;
   a function for transmitting packets to the packet processing units based on the distribution policy; and
   a function for receiving packets from the packet processing units based on the aggregation policy.

3. The bandwidth variable communication apparatus as claimed in claim 1, wherein one packet processing unit is connected to equal to or greater than two packet transmit-receive units of the interface, and
   the packet processing unit comprising:
   a distribution policy and an aggregation policy of signal processing load between the packet transmit-receive units and the packet processing unit, the distribution policy and the aggregation policy being designed based on difference of signal processing capability between the packet transmit-receive unit and the packet processing unit;
   a function for transmitting packets to the packet transmit-receive units based on the distribution policy; and
   a function for receiving packets from the packet transmit-receive units based on the aggregation policy.

4. The bandwidth variable communication apparatus as claimed in claim 1, wherein one or more packet transmit-receive units are connected to one packet processing unit of the interface, and
   the packet processing unit comprising:
   a distribution policy and an aggregation policy of signal processing load between the packet processing unit and the stream transmit-receive unit, the distribution policy and the aggregation policy being designed based on difference of signal processing capability between the stream transmit-receive unit and the packet processing unit;
   a function for transmitting stream signals to the stream transmit-receive unit based on the distribution policy; and
   a function for receiving stream signals from the stream transmit-receive unit based on the aggregation policy.

5. The bandwidth variable communication apparatus as claimed in claim 1, wherein one stream transmit-receive unit is connected to equal to or greater than two packet processing units of the interface, and
   the stream transmit-receive unit comprising:
   a distribution policy and an aggregation policy of signal processing load between the packet processing units and the stream transmit-receive unit, the distribution policy and the aggregation policy being designed based on difference of signal processing capability between the stream transmit-receive unit and the packet processing unit;
   a function for transmitting stream signals to the packet processing units based on the distribution policy; and
   a function for receiving stream signals from the packet processing units based on the aggregation policy.

6. The bandwidth variable communication apparatus as claimed in claim 1, further comprising a packet transfer unit configured to transfer packets exchanged between the packet transmit-receive unit and the packet processing unit of the interface to a different transmit-receive unit that is different from the packet transmit-receive unit, or to a different packet processing unit that is different from the packet processing unit,
   the control unit comprising:
   a control information transmit-receive function for transmitting and receiving control information for the packet transfer unit; and
   a packet transfer control function for controlling the packet transfer unit based on the control information.

7. The bandwidth variable communication apparatus as claimed in claim 1, comprising:
- a flow amount measurement unit configured to measure flow amount of packets input into the packet transmit-receive unit or into the packet processing unit of the interface;
- a change determination unit configured to determine necessity for controlling all or a part of the route exchange unit and the interface by using the packet flow amount and an increase/decrease rule; and
- a change induction unit configured to exchange the control information with the control unit based on the determination result of the change determination unit.

8. The bandwidth variable communication apparatus as claimed in claim 1, further comprising an external collaboration unit that comprises:
- a configuration exchange function for exchanging network configuration information with the other communication apparatus;
- a routing function for calculating and managing the control information and a transfer route of the stream signal based on the network configuration information;
- a signaling function for exchanging control information with the other communication apparatus using the routing function; and
- an internal control function for exchanging the control information with the control unit.

9. The bandwidth variable communication apparatus as claimed in claim 8, further comprising:
- a flow amount measurement unit configured to measure flow amount of packets input into the packet transmit-receive unit or into the packet processing unit of the interface;
- a change determination unit configured to determine necessity for controlling all or a part of the route exchange unit and the interface by using the packet flow amount and an increase/decrease rule; and
- a change induction unit configured to exchange the control information with the control unit based on the determination result of the change determination unit.

10. The bandwidth variable communication apparatus as claimed in claim 1, the stream transmit-receive unit comprising a stream transmission unit that comprises:
- a signal distribution unit configured to distribute a stream signal output from the packet processing unit to one or more substream signals;
- one or more signal modulation units including a function for modulating each substream signal output by the signal distribution unit;
- an inverse Fourier transform unit including a function for collectively transforming substream signals modulated by the signal modulation units and existing on the frequency domain from the frequency domain to the time domain, and a function for outputting the substream signals converted into the time domain as an inverse Fourier transformed stream signal; and
- an optical transmission unit configured to convert the inverse Fourier transformed signal output from the inverse Fourier transform unit into one or more subcarriers.

11. The bandwidth variable communication apparatus as claimed in claim 1, the stream transmit-receive unit comprising stream transmission unit, the stream transmission unit comprising:
- one or more signal modulation units each configured to modulate each stream signal output by the packet processing units to generate a substream signal;
- an inverse Fourier transform unit including a function for collectively transforming substream signals modulated by the signal modulation units and existing on the frequency domain from the frequency domain to the time domain, and a function for outputting the substream signals converted into the time domain as an inverse Fourier transformed stream signal; and
- an optical transmission unit configured to convert the inverse Fourier transformed signal output from the inverse Fourier transform unit into one or more subcarriers.

12. The bandwidth variable communication apparatus as claimed in claim 10 or 11, the optical transmission unit comprising a function for deleting a part of sidebands occurring in the subcarriers by using suppressed carrier single-sideband modulation.

13. The bandwidth variable communication apparatus as claimed in claim 1, the stream transmit-receive unit comprising a stream transmission unit, the stream transmission unit comprising:
- a signal modulation unit configured to modulate a stream signal output by the packet processing unit to generate substream signals;
- one or more optical transmission units configured to convert the substream signals output from the signal modulation unit into the subcarriers;
- a frequency spacing control unit configured to control the optical transmission units for equalizing every optical frequency spacing between subcarriers output from the optical transmission units; and
- a wavelength multiplexing unit configured to aggregate one or more subcarriers output from the one or more optical transmission units,
- the frequency spacing control unit comprising a unit configured to set the optical frequency spacing of the subcarriers to be equal to or greater than the bit rate of the substream signal.

14. The bandwidth variable communication apparatus as claimed in claim 1, the stream transmit-receive unit comprising a stream transmission unit, the stream transmission unit comprising:
- a signal modulation unit configured to modulate a stream signal output from the packet processing unit to generate substream signals;
- a multiple wavelength light generation unit configured to collectively generate equal to or more than two continuous carrier lights in which optical frequency spacing is equal to or greater than the bit rate of the substream signal; and
- a wavelength demultiplexing unit configured to demultiplex the equal to or greater than two continuous carrier lights;
- one or more photoelectric conversion units configured to modulate the continuous carrier lights by using the substream signals output from the signal modulation unit to convert the continuous carrier lights into subcarriers; and
- a wavelength multiplexing unit configured to aggregate one or more subcarriers output from the one or more photoelectric conversion units.

15. The bandwidth variable communication apparatus as claimed in claim 10, 11, 13 or 14, further comprising a guard interval generation unit that comprises:
- a function for generating a guard interval by wholly or partially repeating the inverse Fourier transformed stream signal output from the inverse Fourier transform unit or the substream signal output from the signal modulation unit;

a function for combining the generated guard interval to the inverse Fourier transformed stream signal or the substream signal; and a function for transmitting the inverse Fourier transformed stream signal or the substream signal to which the guard interval is combined to the optical transmission unit or the photoelectric conversion unit.

16. The bandwidth variable communication apparatus as claimed in claim 1, the stream transmit-receive unit comprising a stream receiving unit, the stream receiving unit comprising:

an optical receiving unit configured to receive one or more subcarriers and transforming the subcarriers to an inverse Fourier transformed stream signal;

a Fourier transform unit including a function for collectively transforming the inverse Fourier transformed stream signal output from the optical receiving unit from the time domain to the frequency domain so as to divide the signal to one or more substream signals, and a function for distributing the generated substream signals to each substream signal;

one or more signal demodulation units configured to demodulate each substream signal output from the Fourier transform unit; and a signal aggregation unit configured to aggregate the substream signals output from the signal demodulation units into one stream signal and output it to the packet processing unit.

17. The bandwidth variable communication apparatus as claimed in claim 1, the stream transmit-receive unit comprising stream receiving unit, the stream receiving unit comprising:

an optical receiving unit configured to receive one or more subcarriers and transform the subcarriers to an inverse Fourier transformed stream signal;

a Fourier transform unit including a function for collectively transforming the inverse Fourier transformed stream signal output from the optical receiving unit from the time domain to the frequency domain so as to divide the signal to one or more substream signals, and a function for distributing the generated substream signals to each substream signal; and one or more signal demodulation units configured to demodulate each substream signal output from the Fourier transform unit to generate stream signals.

18. The bandwidth variable communication apparatus as claimed in claim 1, the stream transmit-receive unit comprising a guard interval removing unit that comprises:

a function for removing the guard interval from an inverse Fourier transformed signal to which the guard interval is combined so as to extract an inverse Fourier transformed stream signal; and a function for transmitting the extracted inverse Fourier transformed stream signal to a Fourier transform unit.

19. The bandwidth variable communication apparatus as claimed in claim 1, the stream transmit-receive unit comprising a stream receiving unit, the stream receiving unit comprising:

an optical demultiplexing unit configured to demultiplex one or more incoming subcarriers to each subcarrier;

one or more optical receiving units configured to receive respective subcarriers output from the optical demultiplexing unit and convert the subcarriers to substream signals; and one or more signal demodulation units configured to demodulate substream signals output from the optical receiving units.

20. The bandwidth variable communication apparatus as claimed in claim 1, the stream transmit-receive unit comprising stream receiving unit, the stream receiving unit comprising:

an optical demultiplexing unit configured to demultiplex one or more incoming subcarriers to each subcarrier;

one or more optical receiving units configured to receive respective subcarriers output from the optical demultiplexing unit and convert the subcarriers to substream signals;

one or more signal demodulation units configured to demodulate substream signals output from the optical receiving units; and a signal aggregation unit configured to aggregate substream signals output from the signal demodulation units into one stream signal, and output the signal to the packet processing unit.

21. A bandwidth variable communication method in a network in which bandwidth variable communication apparatuses are connected via transmission routes and the network includes a network management apparatus including a function for controlling and managing the bandwidth variable communication apparatuses, the bandwidth variable communication apparatus comprising a route exchange unit, an interface and a control unit, the route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes;

an interface in all or a part of input ports or output ports, the interface including:

a packet transmit-receive unit configured to transmit and receive packets with another communication apparatus connected via a transmission route;

a packet processing unit including a packet processing function for transmitting and receiving packets with the packet transmit-receive unit, and a signal conversion function for performing signal conversion between a packet and a stream signal; and a stream transmit-receive unit configured to transmit and receive the stream signal with the route exchange unit, a control unit including a control information transmit-receive function for transmitting and receiving control information including passable frequency bandwidth information such as a center frequency and a passband width or a lower limit frequency and an upper limit frequency in a section from an input port to an output port for both or a part of the route exchange function and the bandwidth change function of the route exchange unit, and control information including subcarrier frequency interval information for all or a part of the packet transmit-receive unit, the packet processing unit, and the stream transmit-receive unit of the interface, and including a control function for controlling the route exchange unit based on the control information for both or a part of the route exchange function and the bandwidth change function of the route exchange unit, and including an interface control function for controlling the interface based on the control information for all or a part of the packet transmit-receive unit, the packet processing unit, and the stream transmit-receive unit of the interface, wherein the all or a part of input ports and output ports are connected to other communication apparatuses via the interface and via transmission routes, and the route exchange unit includes a function for performing route exchange for stream signals of a plurality of subcarriers, the bandwidth variable communication method comprising:

a control message exchange step in which, when the network management apparatus sets up, deletes or changes a path passing through a plurality of bandwidth variable communication apparatuses, the network management apparatus exchanges control information, with the control unit of each bandwidth variable communication apparatus on a path route, for controlling the route exchange unit, or the interface, or all of these; and a hardware control step in which the control unit of the bandwidth variable communication apparatuses controls the route exchange unit, or the interface, or all of these based on the control information received in the control message exchange step.

22. A bandwidth variable communication method in a network in which bandwidth variable communication apparatuses are connected via transmission routes and the network includes a network management apparatus including a function for controlling and managing the bandwidth variable communication apparatuses, the bandwidth variable communication apparatus comprising a route exchange unit, an interface and a control unit, the route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes;

the interface including a packet transmit-receive unit having a packet transmit-receive function for transmitting and receiving packets with other communication apparatus connected via a transmission route, a packet processing unit including a packet processing function for transmitting and receiving packets with the packet transmit-receive function, and a signal conversion function for performing signal conversion between a packet and a stream signal, and a stream transmit-receive unit including a stream transmit-receive function for transmitting and receiving the stream signal with the route exchange unit;

the control unit including a control information transmit-receive function for transmitting and receiving control information including passable frequency bandwidth information such as a center frequency and a passband width or a lower limit frequency and an upper limit frequency in a section from an input port to an output port for both or a part of the route exchange function and the bandwidth change function of the route exchange unit, and control information including subcarrier frequency interval information for all or a part of the packet transmit-receive unit, the packet processing unit, and the stream transmit-receive unit of the interface, a control function for controlling the route exchange unit based on the control information, for both or a part of the route exchange function and the bandwidth change function of the route exchange unit, a control information transmit-receive function for transmitting and receiving control information for all or a part of the packet transmit-receive function, the packet processing function, the signal conversion function and the stream transmit-receive function of the interface, including an interface control function for controlling the interface based on the control information, including a packet transfer unit configured to transfer packets exchanged between the packet transmit-receive unit and the packet processing unit of the interface to a different transmit-receive unit that is different from the packet transmit-receive unit, or to a different packet processing unit that is different from the packet processing unit, including a control information transmit-receive unit configured to transmit and receive control information for the packet transfer unit, and including a packet transfer control unit configured to control the packet transfer unit based on the control information;

wherein all or a part of input ports and output ports are connected to other communication apparatuses via the interface and via transmission routes, and the route exchange unit includes a function for performing route exchange for stream signals of a plurality of subcarriers, the bandwidth variable communication method comprising:

a control message exchange step in which, when the network management apparatus sets up, deletes or changes a path passing through a plurality of bandwidth variable communication apparatuses, the network management apparatus exchanges control information, with the control unit of each bandwidth variable communication apparatus on a path route, for controlling the route exchange unit, the interface, or the packet transfer unit or all of these; and a hardware control step in which the control unit of the bandwidth variable communication apparatuses controls the route exchange unit, the interface, or the packet transfer unit or all of these based on the control information received in the control message exchange step.

23. A bandwidth variable communication method in a network in which bandwidth variable communication apparatuses are connected via transmission routes and the network includes a network management apparatus including a function for controlling and managing the bandwidth variable communication apparatuses, the bandwidth variable communication apparatus comprising a route exchange unit, an interface and a control unit, the route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes;

the interface including a packet transmit-receive unit having a packet transmit-receive function for transmitting and receiving packets with other communication apparatus connected via a transmission route, a packet processing unit including a packet processing function for transmitting and receiving packets with the packet transmit-receive function, and a signal conversion function for performing signal conversion between a packet and a stream signal, and a stream transmit-receive unit including a stream transmit-receive function for transmitting and receiving the stream signal with the route exchange unit;

the control unit including a control information transmit-receive function for transmitting and receiving control information including passable frequency bandwidth information such as a center frequency and a passband width or a lower limit frequency and an upper limit frequency in a section from an input port to an output port for both or a part of the route exchange function and the bandwidth change function of the route exchange unit, and control information including subcarrier frequency interval information for all or a part of the packet transmit-receive unit, the packet processing unit, and the stream transmit-receive unit of the interface, a control function for controlling the route exchange unit based on the control information for both or a part of the route exchange function and the bandwidth change function of the route exchange unit, a control information transmit-receive function for transmitting and receiving control information for all or a part of the packet transmit-receive function, the packet processing function, the signal conversion function and the stream transmit-receive function of the interface, and including an interface control function for controlling the interface based on the control information;

the bandwidth variable communication apparatus further comprising a flow amount measurement unit configured to measure flow amount of packets input into the packet transmit-receive unit or into the packet processing unit of the interface, a change determination unit configured to determine necessity for controlling all or a part of the route exchange unit, the interface and the packet transfer unit by using the packet flow amount and an increase/decrease rule, and a change induction unit configured to exchange the control information with the control unit based on the determination result of the change determination unit;

wherein all or a part of input ports and output ports are connected to other communication apparatuses via the interface and via transmission routes, and the route exchange unit includes a function for performing route exchange for stream signals of a plurality of subcarriers, the bandwidth variable communication method comprising:

a traffic monitoring step in which the flow amount measurement unit of the bandwidth variable communication apparatus terminating each of existing paths on the network monitors input traffic, output traffic or both of these on the existing path in collaboration with the interface;

an increase/decrease determination step in which the change determination unit of the bandwidth variable communication apparatus determines to increase or decrease a path (parallel path) parallel to the existing path based on the monitoring result in the traffic monitoring step;

an increase/decrease reporting step in which the change induction unit of the bandwidth variable communication apparatus transmits control information, to the network management apparatus, including an increase request or a delete request of the parallel path based on the increase/decrease determination result of the increase/decrease determination step;

a control message exchange step in which the network management apparatus exchanges control information for controlling the route exchange unit, the interface, or the packet transfer unit or all of these, with the control unit of each bandwidth variable communication apparatus on the route of the parallel path based on the increase request or the delete request in the increase/decrease reporting step; and a hardware control step in which the control unit of the bandwidth variable communication apparatuses controls the route exchange unit, the interface, or the packet transfer unit or all of these based on the control information received in the control message exchange step.

24. A bandwidth variable communication method in a network in which bandwidth variable communication apparatuses are connected via transmission routes and the network includes a network management apparatus including a function for controlling and managing the bandwidth variable communication apparatuses, the bandwidth variable communication apparatus comprising a route exchange unit, an interface, a control unit and an external collaboration unit, the route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes;

the interface including a packet transmit-receive unit having a packet transmit-receive function for transmitting and receiving packets with other communication apparatus connected via a transmission route, a packet processing unit including a packet processing function for transmitting and receiving packets with the packet transmit-receive function, and a signal conversion function for performing signal conversion between a packet and a stream signal, and a stream transmit-receive unit including a stream transmit-receive function for transmitting and receiving the stream signal with the route exchange unit;

the control unit including a control information transmit-receive function for transmitting and receiving control information including passable frequency bandwidth information such as a center frequency and a passband width or a lower limit frequency and an upper limit frequency in a section from an input port to an output port for both or a part of the route exchange function and the bandwidth change function of the route exchange unit, and control information including subcarrier frequency interval information for all or a part of the packet transmit-receive unit, the packet processing unit, and the stream transmit-receive unit of the interface, a control function for controlling the route exchange unit based on the control information for both or a part of the route exchange function and the bandwidth change function of the route exchange unit, a control information transmit-receive function for transmitting and receiving control information for all or a part of the packet transmit-receive function, the packet processing function, the signal conversion function and the stream transmit-receive function of the interface, and including an interface control function for controlling the interface based on the control information;

the external collaboration unit including a configuration exchange function for exchanging network configuration information with other communication apparatus, a routing function for calculating and managing control information and a transfer route of the stream signal based on the network configuration information, a signaling function for exchanging control information with the other communication apparatus using the routing function, and an internal control function for exchanging the control information with the control unit;

wherein all or a part of input ports and output ports are connected to other communication apparatuses via the interface and via transmission routes, and the route exchange unit includes a function for performing route exchange for stream signals of a plurality of subcarriers, the bandwidth variable communication method comprising:
a route information exchange step in which the external collaboration units of the bandwidth variable communication apparatuses exchange the network configuration information;
a route table management step in which the external collaboration unit of each bandwidth variable communication apparatus calculates control information and a transfer route of the stream signal based on the route information exchange step, and manages them in a route table;
a signaling step in which, when setting, deleting or changing a path passing through a plurality of bandwidth variable communication apparatuses, one external collaboration unit of the bandwidth variable communication apparatuses exchanges control information with other external collaboration unit of other bandwidth variable communication apparatuses on a path route by using the route table;
an internal control step in which the external collaboration unit of each bandwidth variable communication apparatus exchanges control information received in the signaling step with the control unit; and
a hardware control step in which the control unit of the bandwidth variable communication apparatuses controls the route exchange unit, the interface, or the packet transfer unit or all of these based on the control information received in the internal control step.

25. A bandwidth variable communication method in a network in which bandwidth variable communication apparatuses are connected via transmission routes and the network includes a network management apparatus including a function for controlling and managing the bandwidth variable communication apparatuses, the bandwidth variable communication apparatus comprising a route exchange unit, an interface, a control unit and an external collaboration unit,
the route exchange unit including a route exchange function for switching an output port of a stream signal of one or more wavelengths input from an input port based on both or a part of wavelength and time, and including a bandwidth change function for changing passable frequency bandwidth in a section from the input port to the output port through which the stream signal passes;
the interface including a packet transmit-receive unit having a packet transmit-receive function for transmitting and receiving packets with other communication apparatus connected via a transmission route, a packet processing unit including a packet processing function for transmitting and receiving packets with the packet transmit-receive function, and a signal conversion function for performing signal conversion between a packet and a stream signal, and including a stream transmit-receive unit including a stream transmit-receive function for transmitting and receiving the stream signal with the route exchange unit;
the control unit including a control information transmit-receive function for transmitting and receiving control information including passable frequency bandwidth information such as a center frequency and a passband width or a lower limit frequency and an upper limit frequency in a section from an input port to an output port for both or a part of the route exchange function and the bandwidth change function of the route exchange unit, and control information including subcarrier frequency interval information for all or a part of the packet transmit-receive unit, the packet processing unit, and the stream transmit-receive unit of the interface, a control function for controlling the route exchange unit based on the control information for both or a part of the route exchange function and the bandwidth change function of the route exchange unit,
a control information transmit-receive function for transmitting and receiving control information for all or a part of the packet transmit-receive function, the packet processing function, the signal conversion function and the stream transmit-receive function of the interface, and including an interface control function for controlling the interface based on the control information;
the external collaboration unit including a flow amount measurement unit configured to measure flow amount of packets input into the packet transmit-receive function or into the packet processing function of the interface, a change determination unit configured to determine necessity for controlling all or a part of the route exchange unit, the interface and the packet transfer unit by using the packet flow amount and an increase/decrease rule, a change induction unit configured to exchange the control information with the control unit based on the determination result of the change determination unit, a configuration exchange function for exchanging network configuration information with other communication apparatus, a routing function for calculating and managing control information and a transfer route of the stream signal based on the network configuration information, a signaling function for exchanging control information with the other communication apparatus using the routing function, and an internal control function for exchanging the control information with the control unit;
wherein all or a part of input ports and output ports are connected to other communication apparatuses via the interface and via transmission routes, and the route exchange unit includes a function for performing route exchange for stream signals of a plurality of subcarriers,
the bandwidth variable communication method comprising:
a route information exchange step in which the external collaboration units of the bandwidth variable communication apparatuses exchange the network configuration information;
a route table management step in which the external collaboration unit of each bandwidth variable communication apparatus calculates control information and a transfer route of the stream signal based on the route information exchange step, and manages them in a route table;
a traffic monitoring step in which the flow amount measurement unit of the bandwidth variable communication apparatus terminating each of existing paths on the network monitors input traffic, output traffic, or both of these on the existing path in collaboration with the interface;
an increase/decrease determination step in which the change determination unit of the bandwidth variable communication apparatus determines to increase or delete a path (parallel path) parallel to the existing path based on the monitoring result in the traffic monitoring step;
an increase/decrease reporting step in which the change induction unit of the bandwidth variable communication apparatus transmits, to the control unit, an increase request or a delete request of the parallel path based on the increase/decrease determination result of the increase/decrease determination step, and the control unit transmits the increase request or the delete request to the external collaboration unit;

a signaling step in which the external collaboration unit of the bandwidth variable communication apparatuses exchanges control information with external collaboration units of each bandwidth variable communication apparatus on the route of the parallel path based on the increase request or the delete request of the increase/decrease reporting step;

an internal control step in which the external collaboration unit of each bandwidth variable communication apparatus exchanges control information received in the signaling step with the control unit; and a hardware control step in which the control unit of the bandwidth variable communication apparatuses controls the route exchange unit, the interface, or the packet transfer unit or all of these based on the control information received in the internal control step.

26. The bandwidth variable communication method as claimed in any one of claims 21 and 22-25, wherein, in the hardware control step, the control unit performs change of passable frequency bandwidth from the input port to the output port in the route exchange unit based on the control information received via the control message exchange step or the internal control step.

27. The bandwidth variable communication method as claimed in any one of claims 21 and 22-25, wherein, in the hardware control step, the control unit performs activation of the interface, stop of the interface, change of frequency bandwidth of output stream signal from the interface, setting of time length of a guard interval, setting of optical frequency spacing between adjacent paths, or all of these based on the control information received via the control message exchange step or the internal control step.

28. The bandwidth variable communication method as claimed in any one of claims 21 and 22-25, wherein, when Bt(bit/s) indicates input traffic capacity of the packet signal at the interface, Bs(bit/s) indicates a basic bit rate per one substream signal, and $\Delta B$(bit/s) indicates a bit rate increase due to codes other than the traffic signal in one substream signal, a bit rate of the stream signal is set to be $k \cdot Bs$ by using k which satisfies $(k-1) \cdot Bs \leqq Bt + k \cdot \Delta B \leqq k \cdot Bs$ (k is a natural number), an optical path route is set up between the transmission end and the receiving end of the stream signal, the optical path route being able to use an optical frequency region $(k \cdot fs + 2 \cdot Bg)$ including k subcarrier lights (subcarrier light frequency spacing fs) and two guard bands Bg, the guard band Bg is set such that the spacing of adjacent subcarrier lights between an optical path and another optical path becomes equal to or greater than twice as large as fs $(Bg \geqq 2 \cdot fs)$, a stream signal transmission unit generates the stream signal using k subcarrier lights in an usable optical frequency region, and the route exchange unit sets the passband width of the stream signal so as to include the k subcarrier lights and such that the passband width Bsw satisfies $k \cdot fs \leqq Bsw \leqq k \cdot fs + Bg$.

29. The bandwidth variable communication method as claimed in any one of claims 21 and 22-25, wherein the time of the guard interval is set to be longer than a propagation time difference $\Delta T$ between a substream signal of the shortest wavelength and a substream signal of the longest wavelength in an optical path route to be set up.

30. The bandwidth variable communication method as claimed in any one of claims 21 and 22-25, wherein the time of the guard interval is set to be longer than a propagation time difference $\Delta T$ between a substream signal of the shortest wavelength and a substream signal of the longest wavelength in the longest optical path route in the network.

* * * * *